United States Patent
Ramshaw et al.

[11] Patent Number: 5,791,907
[45] Date of Patent: Aug. 11, 1998

[54] INTERACTIVE MEDICAL TRAINING SYSTEM

[76] Inventors: Bruce J. Ramshaw, 5102 Trolley Sq. Crossing, Atlanta, Ga. 30306; Iqbal Garcha, 530 Bridgewater Dr., Atlanta, Ga. 30328; Robert Naum, 3982 Admiral Dr., Chamblee, Ga. 30341; Ken Franklin, 2940 Abbotts Pointe Dr., Duluth, Ga. 30136

[21] Appl. No.: 612,784

[22] Filed: Mar. 8, 1996

[51] Int. Cl.$^6$ .............................. G09B 23/28; G09B 7/00
[52] U.S. Cl. ................................... 434/262; 434/323
[58] Field of Search .......................... 434/262, 263, 434/265, 267, 307 R, 308, 322, 323, 362

[56] References Cited

U.S. PATENT DOCUMENTS 5,454,722  10/1995  Holland et al. ..................... 434/271

OTHER PUBLICATIONS

Durrani A F; Preminger G M; "Three-Dimensional Video Imaging for Endoscopic Surgery"; Computers in Biology and Medicine (abstract) Mar. 1995.

*Primary Examiner*—Richard J. Apley
*Assistant Examiner*—John E. Rovnak
*Attorney, Agent, or Firm*—Troutman Sanders LLP; Gerald R. Boss, Esq.

[57] ABSTRACT

An interactive medical training device includes a computer system having a display, wherein the computer system is programmed to provide education and training in medical procedures, including laparoscopic surgical procedures. This aspect is achieved by configuring the system to display, on a portion of the display, a video window. The video window displays a prerecorded video segment illustrating a portion of a laparoscopic surgical procedure. The system requests a user to input information relating to a next step in the surgical procedure, which advantageously keeps the user engaged in the training session. This "next step" information may include, for example, selecting an appropriate medical instrument or selecting a location for operating. The user inputs the requested information through an input device, such as a mouse, a keyboard, a touch-sensitive screen, or other input device. The system then receives and interprets the user input and informs the user as to whether the input is correct. Preferable, if the input is correct the system will display a prerecorded video segment illustrating the next step of the surgical procedure.

16 Claims, 34 Drawing Sheets

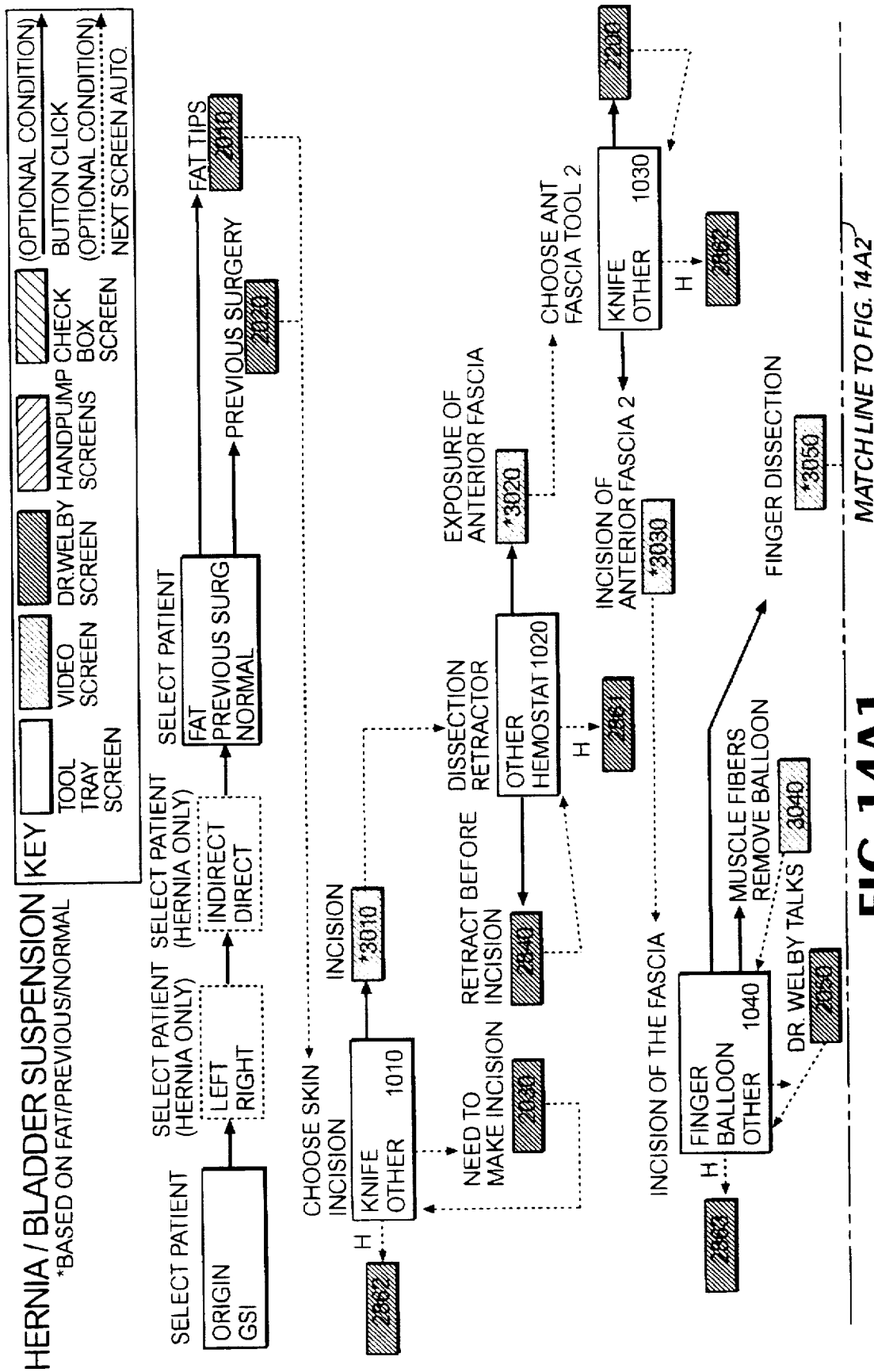
FIG. 14A1

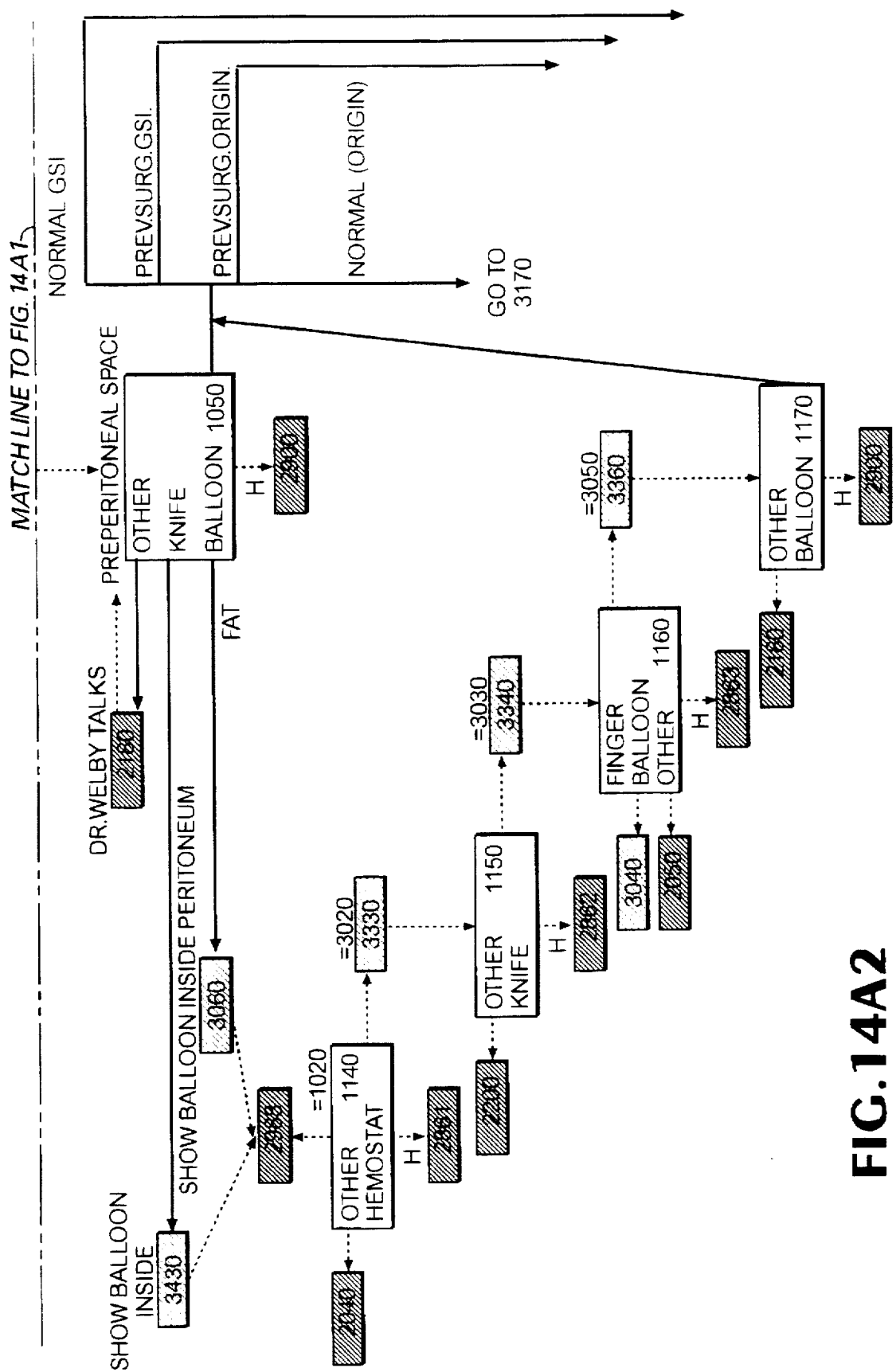
FIG. 14A2

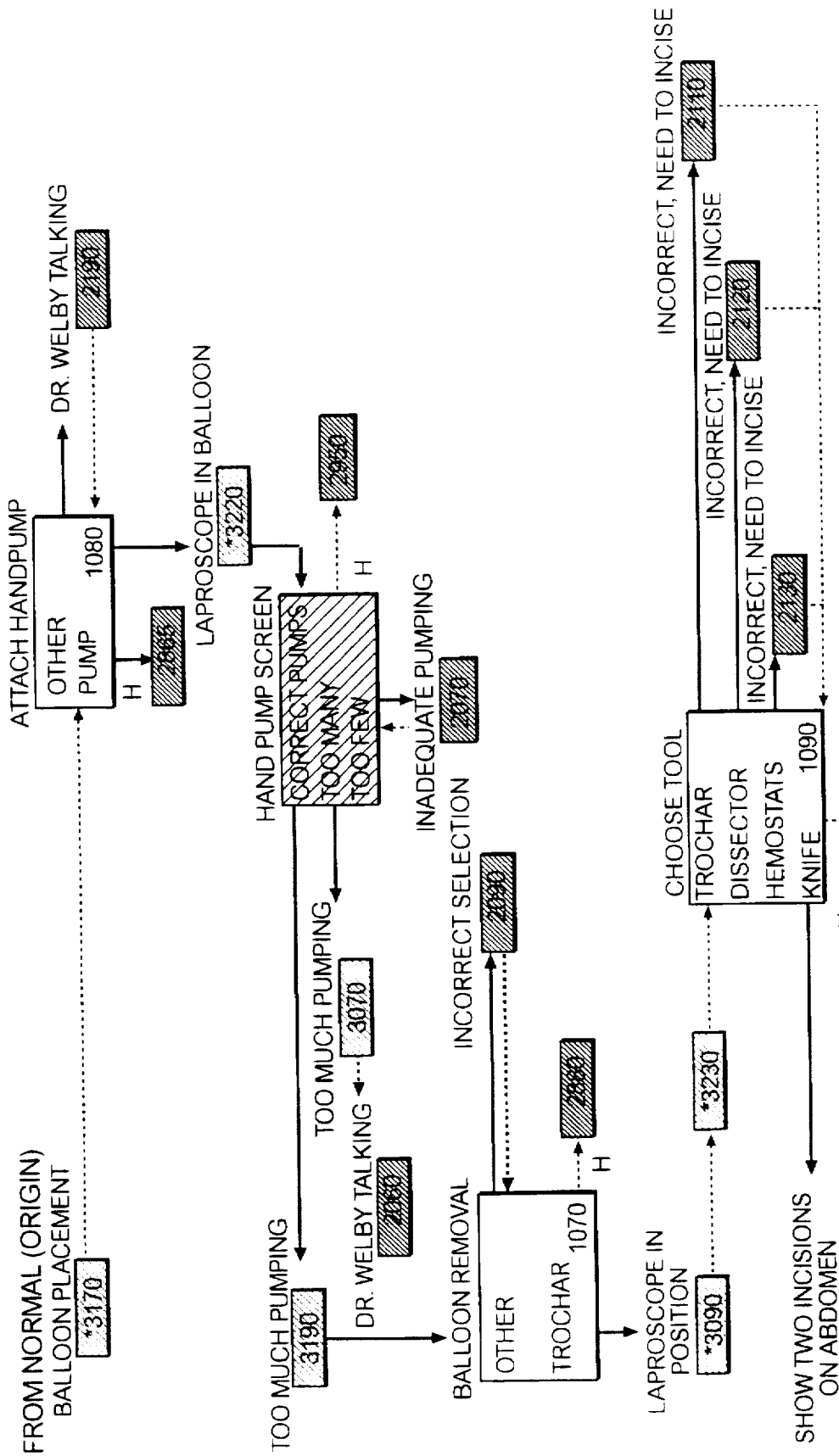

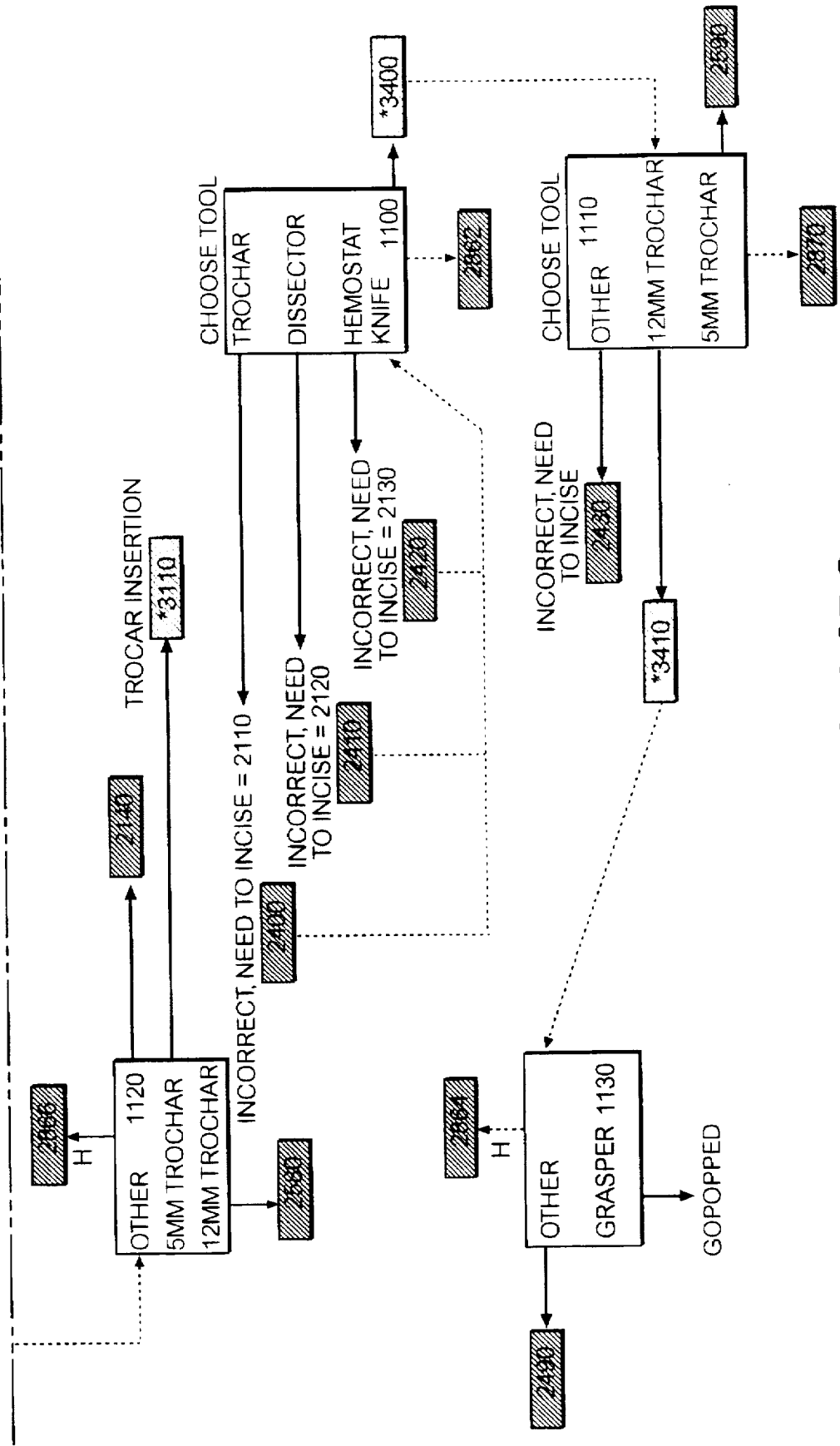
FIG. 14B2

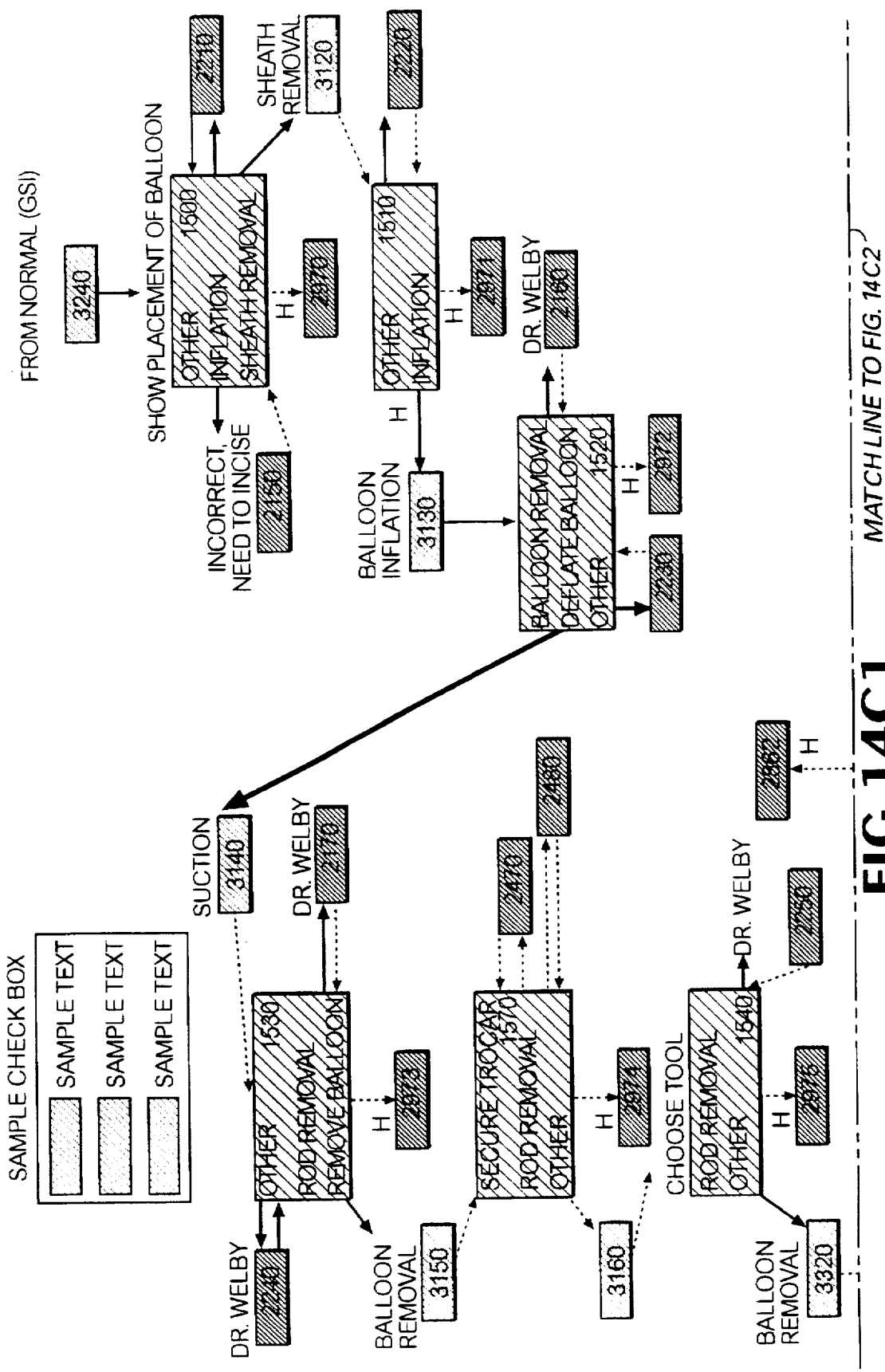
FIG. 14C1

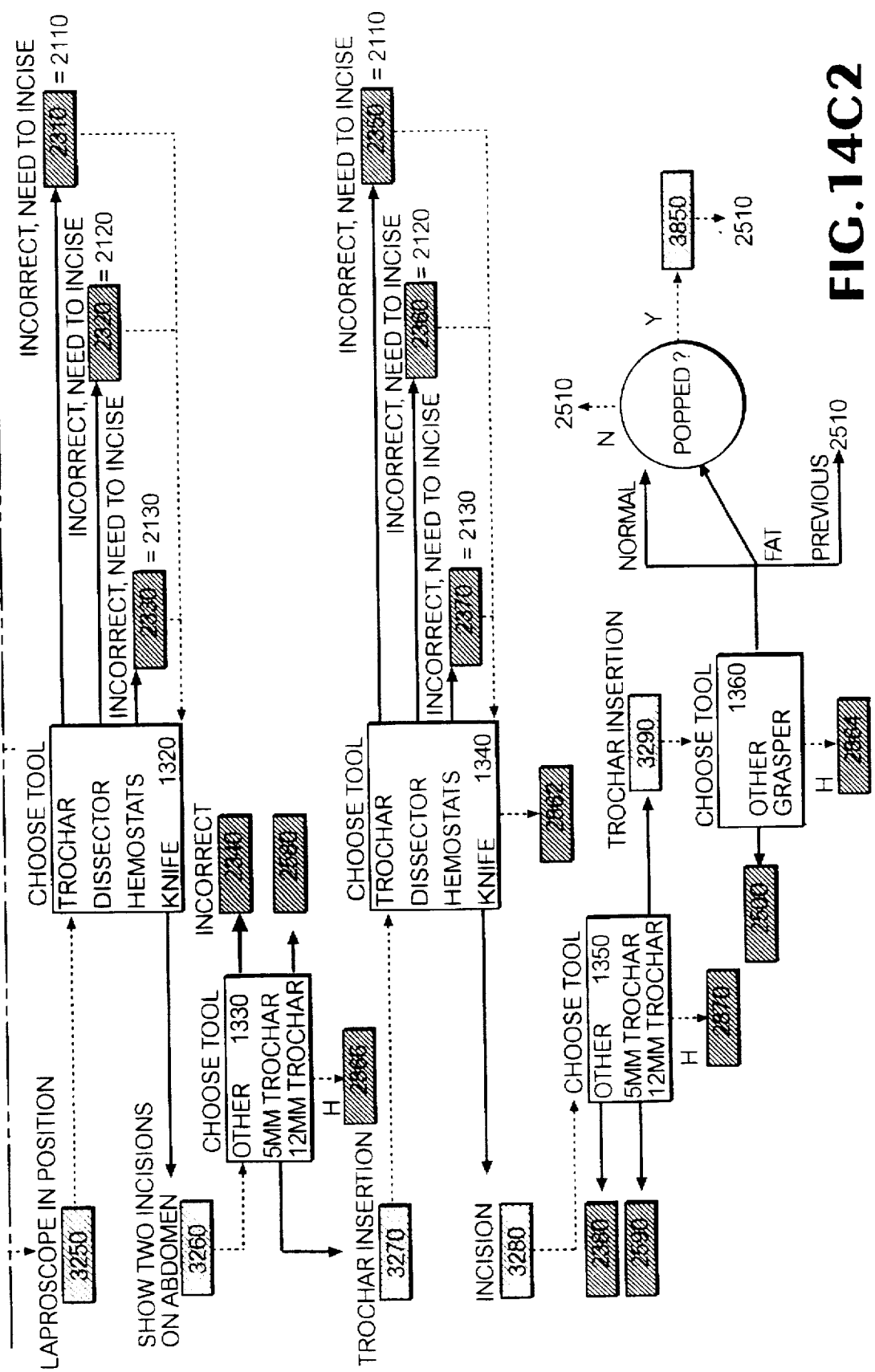
FIG. 14C2

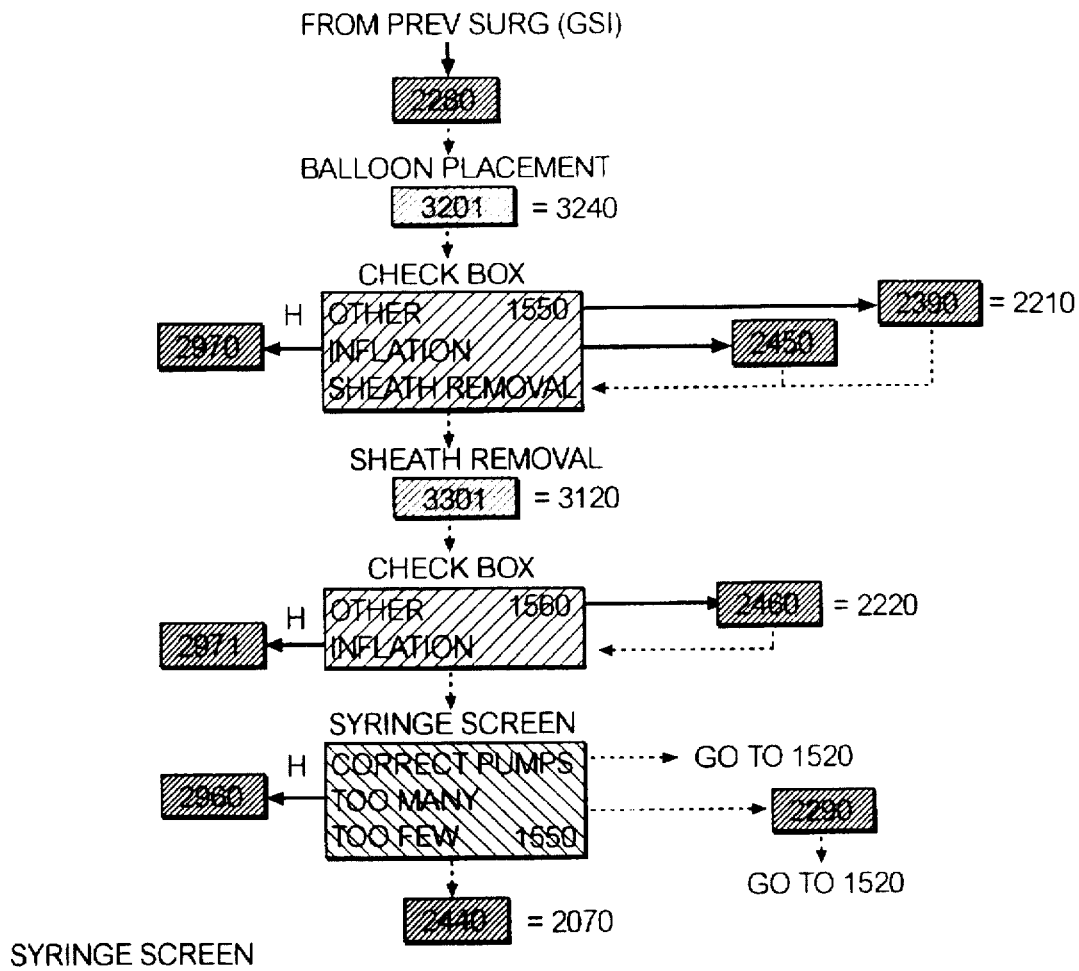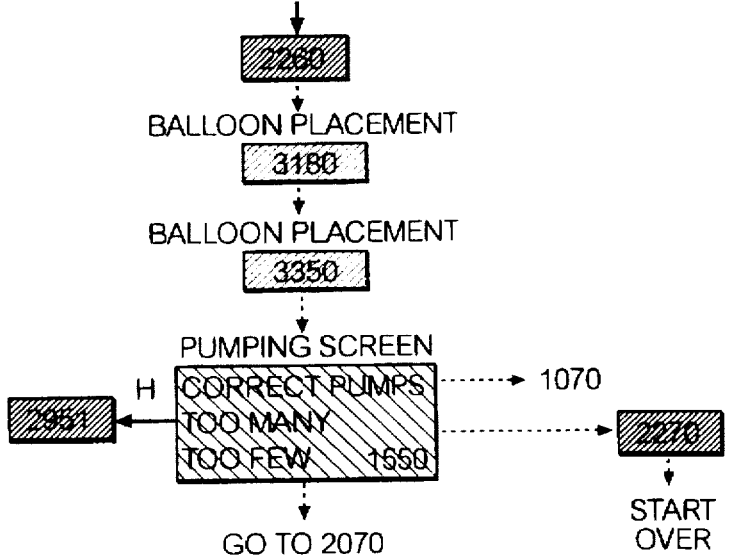
FIG.14D

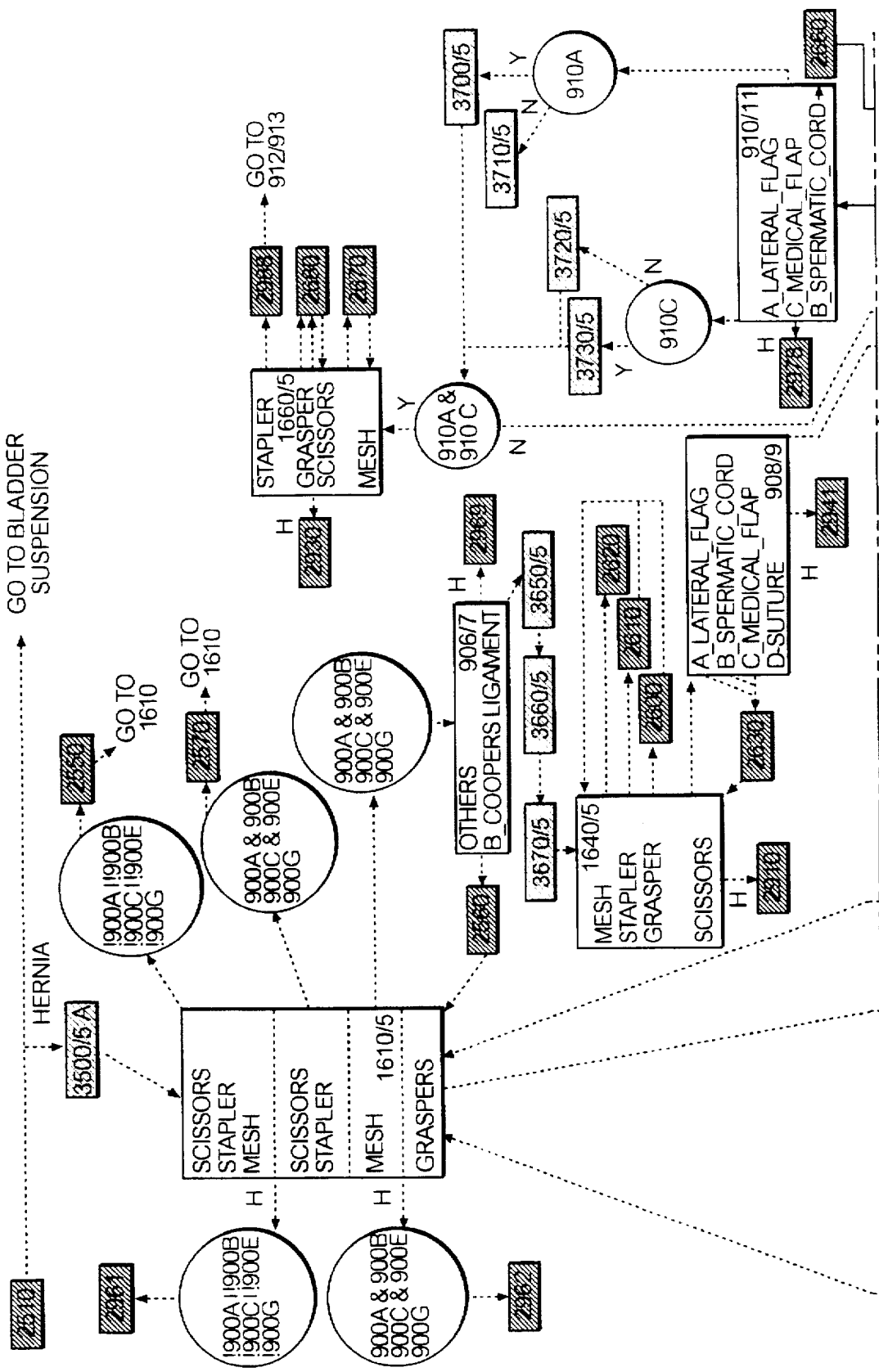
FIG. 14E1   MATCH LINE TO FIG. 14E2

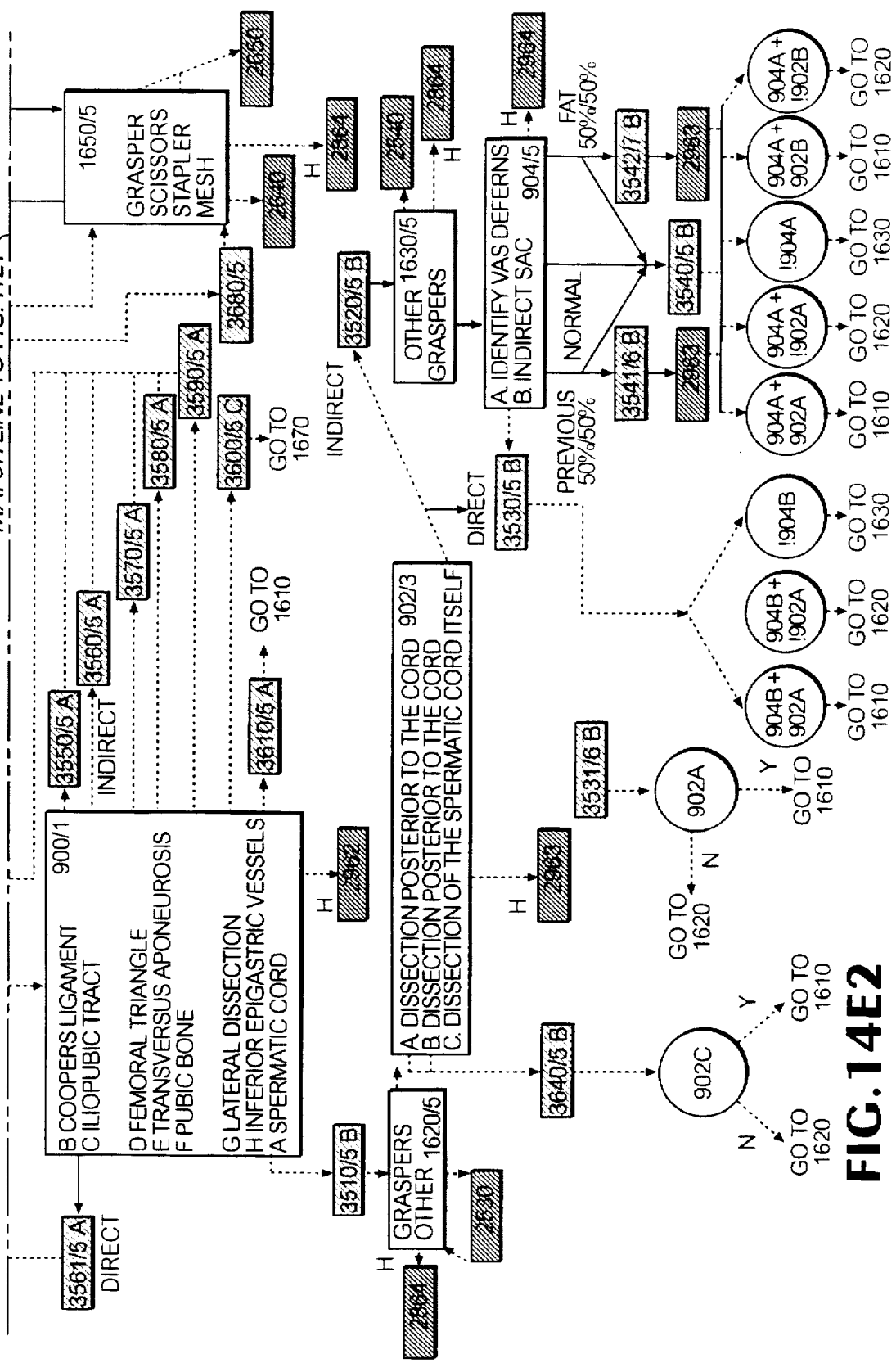
FIG. 14E2

INTERACTIVE MEDICAL TRAINING SYSTEM

BACKGROUND OF THE INVENTION

1. Field of the Invention

The present invention generally relates to medical training devices, and more particularly to a system that provides interactive medical training for laparoscopic surgical procedures.

2. Discussion of the Related Art

In recent years, there has been an ever-growing increase in the expense of proper medical education and training. This recent trend spans the entire spectrum of medical disciplines, from podiatry to neurology. The high cost of a qualified instructor or proctor is responsible for a significant component of these costs. Minimizing, or at least reducing this cost, will reduce the overall cost of medical education and training. Therefore, various devices have been employed to reduce this "live" instructional cost component. To better illustrate the problem and devices employed to alleviate the problem, more specific reference will be made to the medical field involving laparoscopic surgical procedures.

As is known, laparoscopic surgery involves the use of a rigid fiberoptic instrument, passed through a small incision in the abdominal wall and equipped with a surgical instrument (e.g., biopsy forceps, obturator, scissors, etc.) to observe the abdominal cavity or perform minor surgery. In the late 1980s, the first laparoscopic procedure (a Laparoscopic Cholecystectomy) was presented at a nation forum, and initial reviews ranged from very cautious to highly critical and sarcastic. Nevertheless, within a very short period of time, the Laparoscopic Cholecystectomy has become the preferred method for treating the majority of gallbladder pathology. Other laparoscopic procedures are now known and implemented as well.

This recent advance to the forefront of surgical procedures, however, has not occurred without concern. Indeed, the debate over adequate training and appropriate credentialing of this entirely new approach to surgery has been well documented. Relatively little investment has gone into the training of surgeons for the proper and safe performance of these procedures, notwithstanding the progress in the development of technology and equipment for advanced laparoscopic surgery, such as intraabdominal and extraperitoneal pathology.

Certainly, one effective method for training advanced laparoscopic procedures is the traditional instructional/practicum method. While this method may provide a viable option for medical students, interns, or resident practitioners, it is generally not a feasible option for most licensed general surgeons, due to the time and expense involved. Alternatively, a one or two day short course comprising lecture, video, and/or observation does not provide adequate training for more advanced laparoscopic procedures. It has been found that the learning curve for some advanced laparoscopic procedures, such as the total extraperitoneal approach to laparoscopic herniorrhaphy, may range as high as 20 to 30 cases. While some surgeons, particularly in urban areas, may be fortunate enough to establish proctorships with a laparoscopic instructor at a training center, these proctorships are often cost prohibitive and fail to reach enough surgeons.

Another method of training includes the extensive use of videotapes, which present both lecture and video recordings of actual laparoscopic procedures. While the use of videotapes effectively reduces the cost associated with a live instructor or proctor, the limitations of video include the lack of interaction. In this regard, the video may, for example, demonstrate procedures only from certain views, or otherwise may illustrate only certain portions of the procedures. Furthermore, videos often show a procedure in a step-by-step fashion, cleanly edited of many difficulties and problems that may be encountered in a particular procedure, and which are invaluable in the learning process. In short, training exclusive by way of video fails to permit the free exchange of question and answer, and avoids the "hands-on" training that is essential to any quality educational/training program.

In order to achieve this "hands-on" training, animal models are often used to supplement an alternative training program, such as a video program. Although the use of animal models provides an effective method of achieving the coordinative skills of two-handed laparoscopy, the anatomical divergence between humans and animal models generally dampens the learning curve. Moreover, the use of live animal models is often very expensive, since veterinarians, operating rooms and equipment, anesthesia, animal housing and USDA certification are all required to properly run an animal training facility.

Therefore, methods of educating and training persons in laparoscopic surgical procedures, that avoid the problems described above, are desired. Indeed, although the foregoing discussion has focused upon laparoscopic surgical training, it can be appreciated that improved methods of medical training, that provide a cost-effective yet qualitative educational/training regimen, are broadly desired. In this regard, a training regimen that minimizes the cost associated with live instructive/proctored training component is desired.

SUMMARY OF THE INVENTION

Accordingly, a primary object of the present invention is to provide an improved device for educating and training personnel in various medical procedures.

Another object of the present invention is to provide an improved educational/training device for laparoscopic surgical procedures.

Still another object of the present invention is to provide an educational/training device that realizes lower cost in the educational and training of laparoscopic surgical procedures.

Yet another object of the present invention is to provide a low-cost medical educational and training device providing an interactive user environment.

Still another object of the present invention is to an educational/training tool for laparoscopic surgical procedures that reduces the time for direct, live instructional or proctored involvement.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to an interactive medical training device. In accordance with one aspect of the present invention, the training device includes a computer system having a display, wherein the computer system is programmed to provide education and training in laparoscopic surgical procedures. This aspect is achieved by configuring the system to display, on a portion of the display, a video window. The video window displays a prerecorded video segment illustrating a laparoscopic surgical procedure. Means are provided for requesting a user to input information relating to a next step in the surgical procedure, which advantageously keeps the user engaged in the training session. Corresponding means are provided for receiving user input, and may be provided in the form of a keyboard, a mouse, a touch-sensitive screen, or any number of other input/output devices used in connection with a typical computer system. Responsive to the information input by the user, additional means are provided for interpreting the information and informing the user as to whether the input is correct.

In accordance with yet another aspect of the present invention, the system may display, in the video window, a portion of a laparoscopic surgical procedure. At some point, the system may freeze the video and request the user to input information regarding the next medical instrument to be used in the procedure. In this regard, the system may provide the user with a list of potential medical instruments, wherein the user may highlight any one of the instruments provided in the list for selection. The system may provide digitized photographic images of each of the medical instruments provided in the list of instruments to assist the user's selection. The system may further be configured to sequentially display these digital images, coincident with a given instrument being highlighted in the list.

Once the user has input a selection, the system informs the user if that selection is incorrect. This may be achieved by, for example, instructing the user by way of a prerecorded speech segment. Consistent with the concepts of the present invention, the system may be configured to either instruct the user on the proper answer requested, or may alternatively rerequest the information until the user enters the appropriate answer. A correct entry may be acknowledged by simply proceeding with the display of the next video segment of the surgical procedure.

In yet another embodiment, the information requested from the training system may relate to the size and/or location, for example, of a surgical incision to be made. It will be appreciated, that a variety of instructive requests may be posited to a user to enhance and facilitate the educational and learning process.

In accordance with another aspect of the present invention, the educational/training system may be configured to allow a user to select from a wide variety of medical procedures in which he or she wishes to view. In this regard, the invention may provide education training on a variety of laparoscopic surgical procedures, including extraperitoneal herniorrhaphy and bladder suspension procedures. Moreover, within any given procedure, the system may be configured to provide interactive video instruction that covers the entire medical procedure or, alternatively, allow the user to select a particular portion of a procedure for which training is desired. It will be appreciated that certain users may require or desire additional training only on certain aspects of a particular surgical procedure. The present invention recognizes and responds to this desire by providing the aforementioned feature.

In accordance with yet another embodiment of the present invention, multiple video windows may be provided showing differing, yet simultaneous, views of a laparoscopic surgical procedure. In this regard, a video window may be provided showing the external view of a laparoscopic procedure, while a second video window may illustrate the procedure as viewed internally through an optical lens. Yet a third window may be provided to graphically illustrate a cross-sectional side view of the tissue in the area where the laparoscopic procedure is to be performed. It will be appreciated that other similar video or visual windows may be provided on the display to facilitate the education and training consistent with the concepts of the present invention.

In accordance with yet another aspect of the present invention, a method is provided for interactively training a user in medical procedures. In accordance with this method, a user is requested to input information relating to a next step in a surgical procedure. As mentioned above, this information may relate to the selection of a medical instrument, the size or location of an incision to be made, or a variety of other questions. The system includes the steps of receiving the requested input and interpreting the requested input to determine whether it is correct. Finally, the method includes the steps of displaying a video segment illustrating the next step of the procedure, if the user input is correct, or otherwise informing the user that the input was incorrect.

DESCRIPTION OF THE DRAWINGS

The accompanying drawings incorporated in and forming a part of the specification, illustrate several aspects of the present invention, and together with the description serve to explain the principles of the invention. In the drawings:

FIGS. 14A–14G comprise a state diagram illustrating the software states during the operation of the preferred embodiment.

Figure 1A:
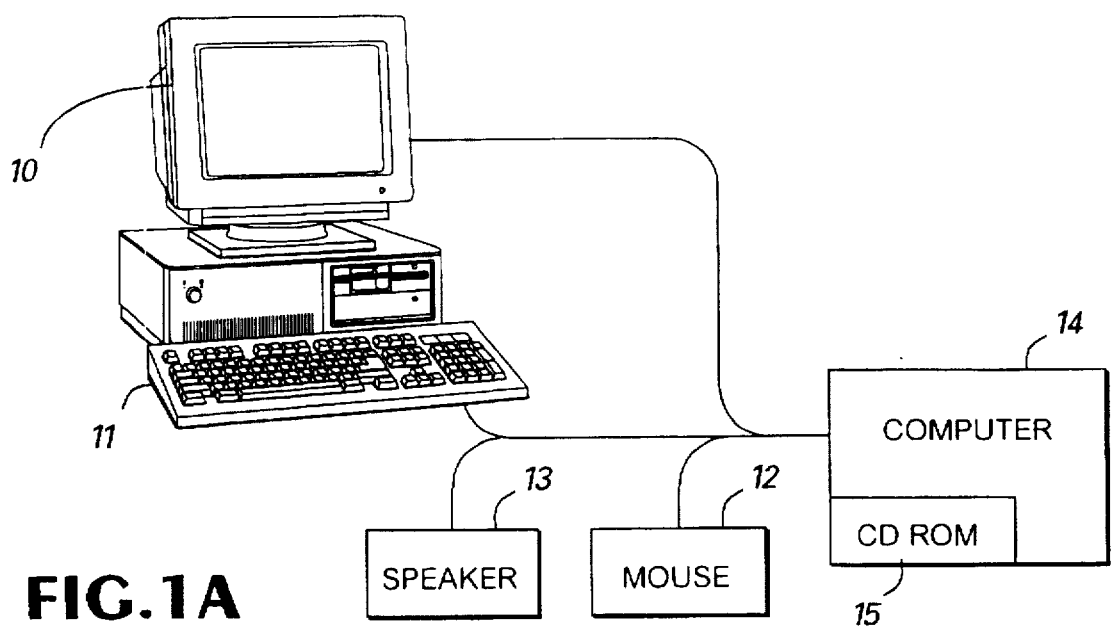
FIG. 1A is a diagram illustrating a stand-alone computer system.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

I. Environment

Figure 1B:
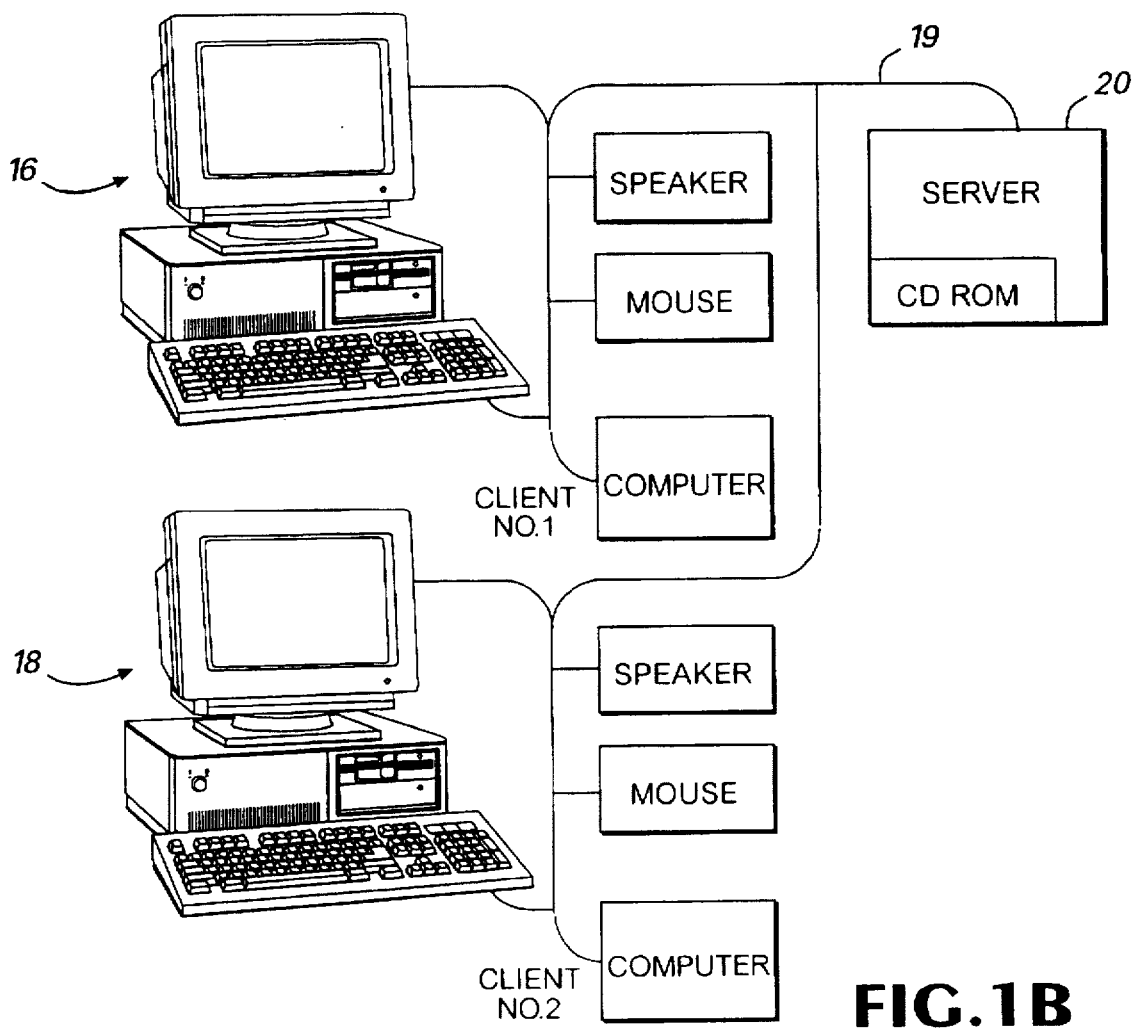
FIG. 1B is is a diagram illustrating a client/server, multiple user computer system.

Before describing the functions and features of the present invention, reference will first be made to the preferred environment of the invention. Broadly, the present invention is directed for execution on a computer system. In this regard, it is contemplated that a wide variety of computing systems provide an appropriate environment for carrying out the broad aspects of the invention discussed herein. FIGS. 1A and 1B illustrate only two such embodiments. FIG. 1A illustrates a stand-alone computer system, while FIG. 1B illustrates a computer in a client/server computer network environment.

A shown in FIG. 1A, a stand-alone computer system is illustrated, wherein the system includes a display 10, a keyboard 11, a mouse 12, a speaker 13, a computer 14, and a storage device 15. As is well known, the display 10 provides a visible output to a user and may be realized by a cathode ray tube (CRT), a liquid crystal display (LCD) panel, as well as any other display technology capable of providing sufficiently high resolution for accommodating video output. Furthermore, the display 10 may include a touch-sensitive screen as a further means of providing user input to the present invention. As will become apparent from the ensuing discussion, interactivity is a central element of the present invention. Therefore, it will be appreciate that various mechanisms for both input and output will advance the concepts and teachings of the present invention.

In this regard, the keyboard 11 and mouse 12 illustrate well known devices for facilitating user input to the illustrated computer system. Light pens, track balls, microphones (for voice interaction), as well as a number of other devices may be utilized for facilitating user input into the computer 14 as well. Likewise, speaker 13 provide an audible output for the user.

The computer 14 is illustrated as a stand-alone device and, indeed, may be a conventional personal computer. To this end, the software of the present invention has been encoded to operate on both IBM compatible personal computers, as well as Macintosh personal computers, since these two brands collectively comprise the substantial majority of the personal computer market. As will be described in further detail below, the present invention displays photographic as well as video images on the display 10. These images, along with other information, are stored on a storage device 15. Since high-resolution photographic and video images typically require a substantial amount of storage space, the presently preferred storage device 15 is a CD ROM. However, other forms of storage, including magnetic and semiconductor storage, may be utilized consistent with the concepts and teachings of the present invention.

In addition to the stand-alone system of FIG. 1A, the present invention may also be practiced in a multi-user environment, as illustrated in FIG. 1B. FIG. 1B illustrates a multi-user, client-server network computing environment. In this regard, multiple computing workstations 16 and 18 may be provided. While only two such workstations are illustrated in FIG. 1B, it is appreciated that practically any number of workstations may be provided. In regard to hardware components, each of these workstations includes the input/output devices described in connection with FIG. 1A. However, rather than each workstation being exclusively connected (i.e., stand alone) to a computer, the workstations 16 and 18 are collectively connected via a network link 19, to a server 20.

Client-server networked systems are well known and will not be described herein, since the present invention is independent of the particular computer system upon which it is executed. Suffice it to say that the server 20 may be comprised of the same type of personal computer as the client stations 16 and 18—the difference residing in the software platform. It will be appreciated that a layered approach to software will be implemented. Those skilled in the art will recognize that, in any networked operating environment, the software is structured in layers, from the lowlevel inter-communication and transport layers, to the high-level application layers. In this regard, the International Organization for Standardization (ISO) has developed a reference model with the express purpose of providing a common basis for communication systems standards. This model is called the Open Systems Interconnection (OSI) system, and comprises a hierarchical layered structure, consisting of seven layers (Physical, Data Link Control, Network, Transport, Session, Presentation, and Application).

In addition to the systems illustrated in FIGS. 1A and 1B, the present invention may be incorporated into a variety of other systems as well. For example, the present invention may be utilized in a larger distributed processing environment, comprising a wide area network (WAN), having many clients and servers. In such a system, the storage may be distributed among the various servers. Moreover, the present invention may be supported by other network environments (e.g., host-end user systems) as well.

To illustrate one application of the present invention, and in keeping with the distributed processing example, a plurality of servers may be distributed at a number of medical institutions and interconnected across a wide area network. As the medical institutions develop new medical or surgical procedures, these procedures may be encoded in software operating in accordance with the invention described herein. These newly encoded procedures may be placed on a server at that institution, where they will then become accessible to students at other institutions, and indeed to persons all across the network. It will be appreciated that such a distributed processing environment will substantially increase the available medical training and educational resources, and significantly advance the presently known educational and training process.

II. The Preferred Embodiment of the Invention

Having described the general computer environment of the present invention, the description will now focus upon the inventive aspects achieved by the software of the present invention. In short, the present invention relates to a computer system programmed to provide education and training in various medical procedures through an interactive process. Indeed, a central feature of the present invention includes the utilization of interactivity to facilitate the learning process. Not only is this interactivity provided by means of various input devices, permitting the user to input information into the system, but the interactivity is also facilitated by providing highresolution video displays with prerecorded video segments and photographic images to illustrate the various medical procedures of a particular embodiment. Preferably, the video segments and photographic images are displayed in windows, each window comprising a portion of the video display.

In a manner that is known by those of ordinary skill in the art, video segments may be prerecorded, and stored on a storage device for future retrieval. As is known, such prerecorded video are stored by digitizing a plurality of sequential video frames, separated by a short time duration. These individual frames may be later read from memory and sequentially displayed to provide the video appearance. In similar fashion, sound segments, or clips, may be digitized and stored on the storage medium as well. The recorded sound may be exclusive or, alternatively, stored in connection with a particular photographic image or video clip.

Figure 2:
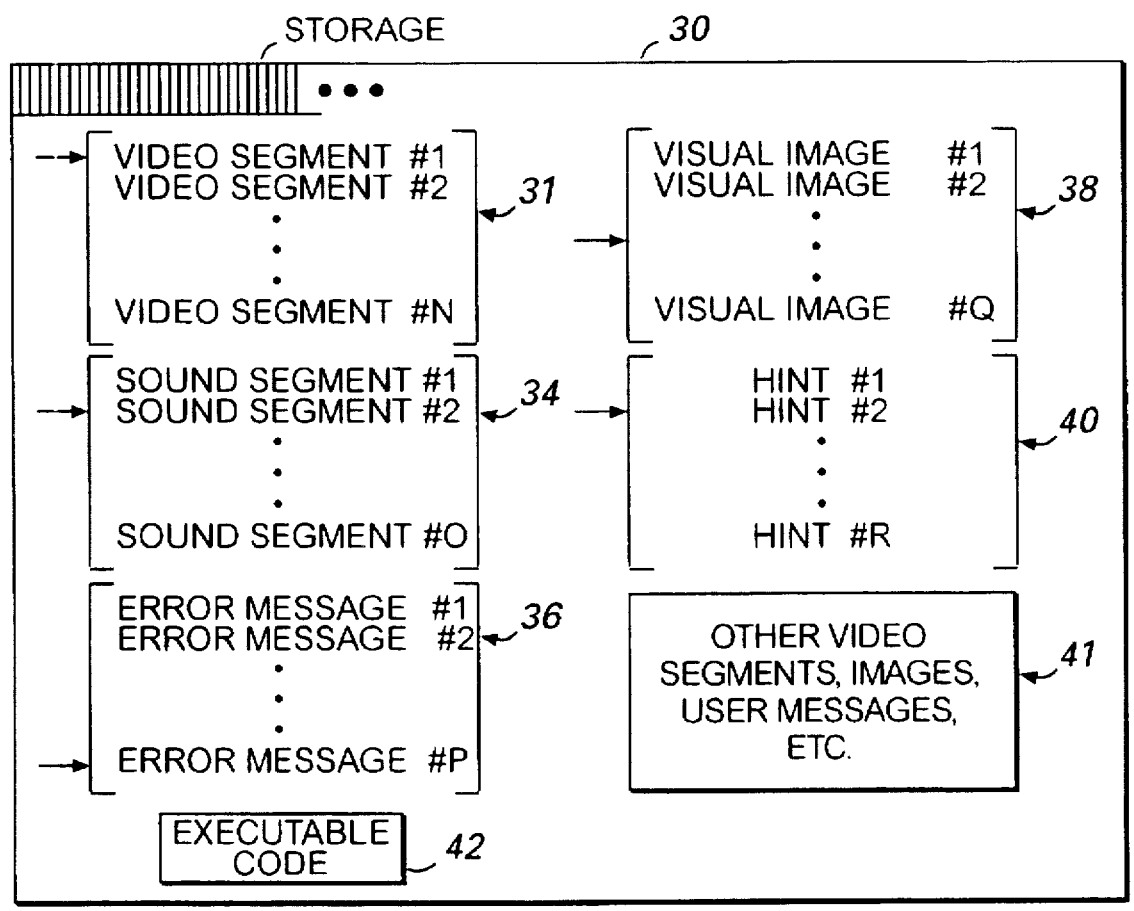
FIG. 2 is a diagram of a computer storage area illustrating area partitions for storing prerecorded video segments, photographic images, and other storage.

Reference is now made to FIG. 2, which illustrates a memory storage scheme that may be utilized for storage of various video, audio, and program segments of the present invention. In this regard, a memory storage area 30 is illustrated. As previously described, the storage area 30 may be magnetic, CD ROM, semiconductor, or any other type of storage medium. Within the storage area 30 of the memory storage device 15, are a plurality of memory storage blocks or subareas. A first such block 31 is provided for storing various video segments. Video segments 1 through n are illustrated. A pointer 32, which points to the presently active video segment, may be used for the retrieval of video segments. In accordance with the digitizing and recording procedure described above, it will be appreciated that each individual segment is comprised of a plurality of stored video frames. When displaying a video segment, a first frame is retrieved and displayed on the display 10. A short, predetermined time thereafter, the next stored video frame is retrieved and output onto the display 10. This process is repeated until all video frames associated with a given video segment have been output to the display 10.

In a similar fashion, areas of memory storage may be set aside for sound segments 34, error messages 36, visual images 38, and hints 40. As will be described in further detail below, the presently preferred embodiment of the invention utilizes sound and other visual images in achieving the interactive aspects of the invention. Various user and error messages as well as hints, are also provided to the user. Like the video segments, the various segments of each of these memory storage areas will be preferably stored sequentially and may be accessed by a pointer. Additional memory storage areas may be partitioned for other video segments, images, messages, or the like, as denoted by block 41. Furthermore, executable program code will be stored in memory at 42.

It will be appreciated that the storage area 30 described in FIG. 2, is consistent with that utilized in a stand-alone computer system, as described in FIG. 1A. In a network computer environment, however, the various storage areas may be distributed across two or more storage devices along the network. For example, in a client/server system, as shown in FIG. 1B, the executable code segment may be stored on a client station, whereas the remaining storage areas may be stored on the server, remote from the client. In an environment having multiple servers, the various video, image, or sound segments may be divided and stored on different servers (i.e., distributed).

Figure 3A:
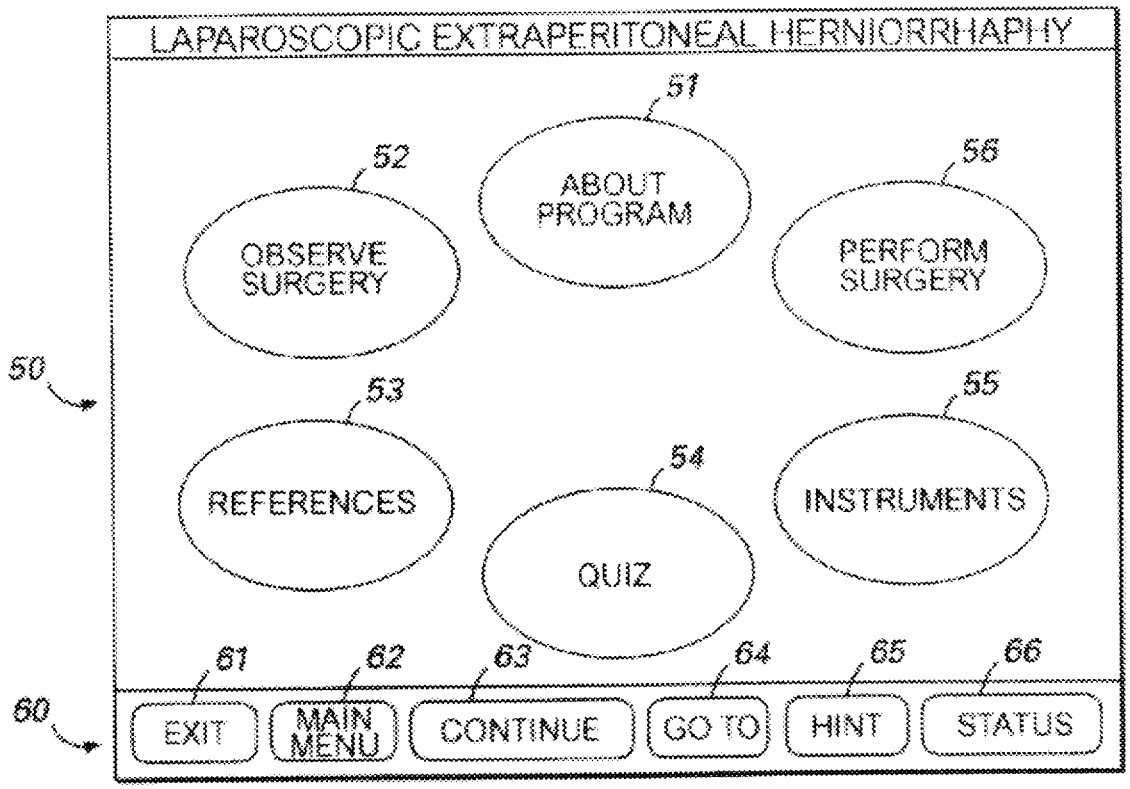
FIG. 3A is a diagram illustrating a computer screen display, in accordance with a main menu of the preferred embodiment.
Figure 3B:
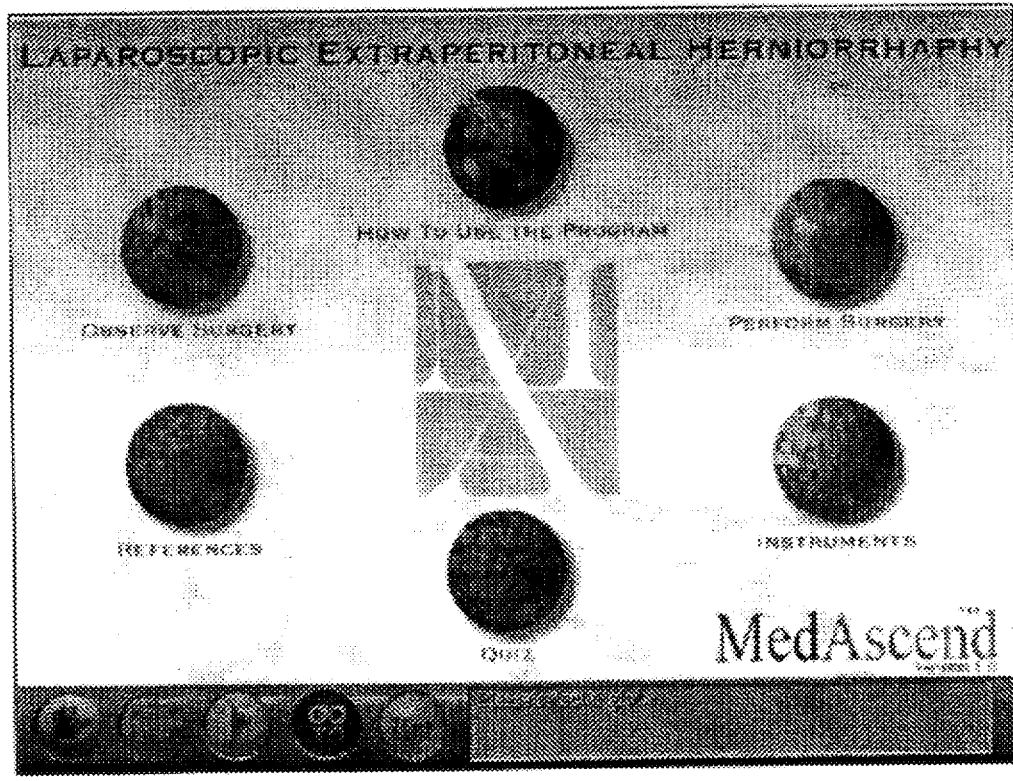
FIG. 3B is a facsimile of an actual computer screen display showing the main menu in accordance with the preferred embodiment.

Turning now to the graphical and functional aspects of the present invention, FIGS. 3A and 3B illustrate the computer display of a main menu of options provided by the present invention. More specifically, FIG. 3A illustrates the principal components of a main menu display, while FIG. 3B is a facsimile of the actual main menu screen display of a preferred embodiment. In this regard, a preferred embodiment of the present invention provides medical education and training in connection with laproscopic surgical procedures. Indeed, one procedure involves a laproscopic extraperitoneal herniorrhaphy, the main menu of which is illustrated in FIGS. 3A and 3B. In accordance with the preferred embodiment, a main menu screen 50 is presented on the display 10, which presents various options for the user. More particularly, the user may select from any one of six options including an "About Program" option 51, an "Observe Surgery" option 52, a "References" option 53, a "Quiz" option 54, an "Instruments" option 55, and a "Perform Surgery" option 56.

To briefly describe these options, the "About Program" option 51 is similar to a top-level help system, which provides fundamental insights and information about the program. The "Observe Surgery" option 52 allows a user to observe a video demonstration of a particular surgical procedure. The video preferably provides not only external video views, but also internal video views, as taken through a laparoscope. The "References" option 53 presents a list of reference materials which may be consulted in connection with the medical procedures of a particular program (the laparoscopic extraperitoneal herniorrhaphy in the previous example). The "Quiz" option 54 is an interactive module that presents various questions to the user to test the user's knowledge on certain topics or procedures. The "Instruments" option 55 provides information about various medical instruments for use in the medical procedure. Finally, the "Perform Surgery" option 56 is an interactive module which takes a user through an entire laparoscopic surgical procedure, displaying video of the procedure and prompting the user with questions throughout. This module or option is a significant feature of the present invention and will be described along with several other options in more detail below.

Before continuing with the description of the various user options, the remainder of the video display will first be described. A video control panel 60 is provided at the bottom of the screen 50 to provide various user options. This video control panel 60 is common to substantially all screen displays to lend a uniform screen appearance throughout all modes of software operation. That is, the video control panel as presented in connection with the main menu screen of FIG. 3A is also presented in connection with each of the various program options (i.e., "Observe Surgery", "References", "Quiz", etc.) The options provided in the control panel are Exit, Main Menu, Continue, Go To and Hint options. A status segment or area is also displayed.

More particularly, the Exit option 61 terminates the program, allowing the user to exit therefrom. The Main Menu option 62 returns a user to the display shown in FIGS. 3A and 3B, from wherever the program presently is at that time. The Continue option 63 instructs the software to continue on to the next group, segment, or step in the present procedure. In many regards, the Continue option 63 is synonymous with the Enter or Return key on the keyboard. The menu driven operation in the present invention, however, permits a user to control the operation of the software substantially from an input device such as a mouse, rather than having to input from the keyboard. The Go To option 64 is used in connection with the Perform Surgery option 56 to allow a user to proceed directly to a particular step in a broader medical procedure. This is useful when, for example, a user needs additional training on a particular aspect of a surgical procedure. The Hint option 65 is similar to a help feature, and allows a user to request help or insight at a particular point in the surgical procedure. It should be appreciated, that this option is sensitive to the current state of the software, whereby the information relayed to the user is dependent upon the present status of the software. For instance, if the user is prompted to select the next medical instrument to use in a given procedure and the user selects the Hint option at that time, the output displayed to the user may relate to the medical instrument to use in the next step of the procedure.

In addition to the user selected options just described, the Status Bar 66 is also provided. The status bar is a dedicated window to the user to provide various text and messages in connection with the operation of the software. For example, hints, error messages, and status messages may be displayed through this window to the user. Examples of such will be seen in connection with the ensuing figures, which illustrate the operation of the presently preferred embodiment. As can be seen by reference to FIG. 3B, the preferred embodiment of the invention utilizes icons to display the options of the video control panels previously described.

To better illustrate the principal features of the present invention, reference is made to FIGS. 4 through 10. FIG. 4A illustrates video display in accordance with the Observe Surgery option 52, while FIG. 4B presents a facsimile of an actual screen display of the preferred embodiment operating in accordance with the Observe Surgery option. As illustrated, a video window 70 is presented on video display 50. A prerecorded, digitized segment of video of an actual laparoscopic surgical procedure is presented in the video window 70. The video window 70 itself may be resized or moved, under the control of the user to any other portion of the video display 50, and therefore the illustrated embodiment should not be viewed as limiting in this respect. A control bar 69 is provided on the lower portion of the video window to permit user control of the video segment, in much the same way as a user can control a video cassette recorder. More specifically, a play icon 71 is provided to begin the presentation or animation of the video segment. Pause icon 72 may be selected to halt the video display. Rewind 75 and forward 76 icons are also provided to facilitate these purposes. Finally, a video duration bar 73 in connection with a video slide bar 74 cooperate to illustrate the present state or position of the video display in relation with the entirety of the video segment. That is, at the beginning of the video segment, video slide bar 74 is located at the left-most end of video duration bar 73. The video slide bar 74 progressively moves to the right as the video segment is displayed, and the video segment terminates as the slide bar 74 reaches the right-most side of the video duration bar 73. In addition to the pause and rewind control features just described, the user may also, by using the mouse, click on slide bar 74 and drag it in either direction along duration bar 73 to advance or rewind the video segment to a particular location, and the video display will continue from that location.

Returning briefly to FIG. 2, it will be appreciated that with a slide bar 74 along with duration bar 73 may serve to increment or decorate a counter in connection with pointer 32. Thereafter, selecting the play button 71 with the mouse to continue video display, will result in software retrieving the image at the location pointed to by pointer 32.

Figure 5A:
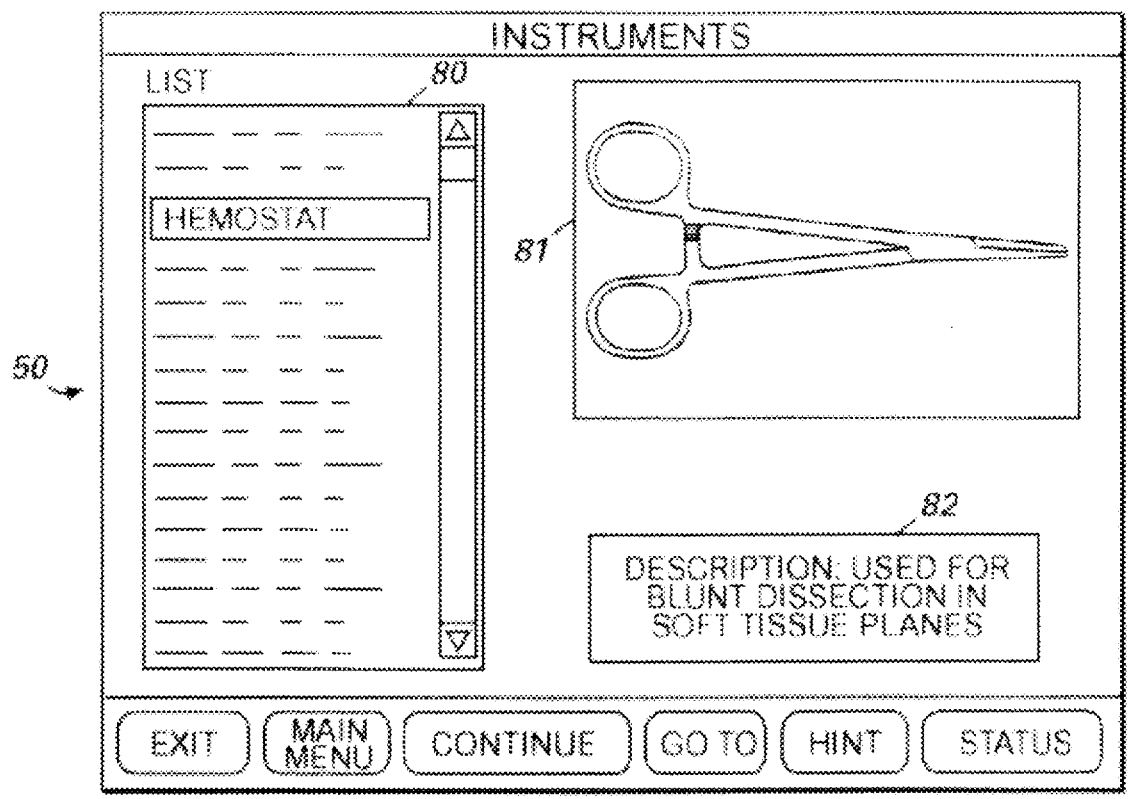
FIG. 5A is a diagram illustrating a computer screen display, in accordance with an instruments option of the preferred embodiment.
Figure 5B:
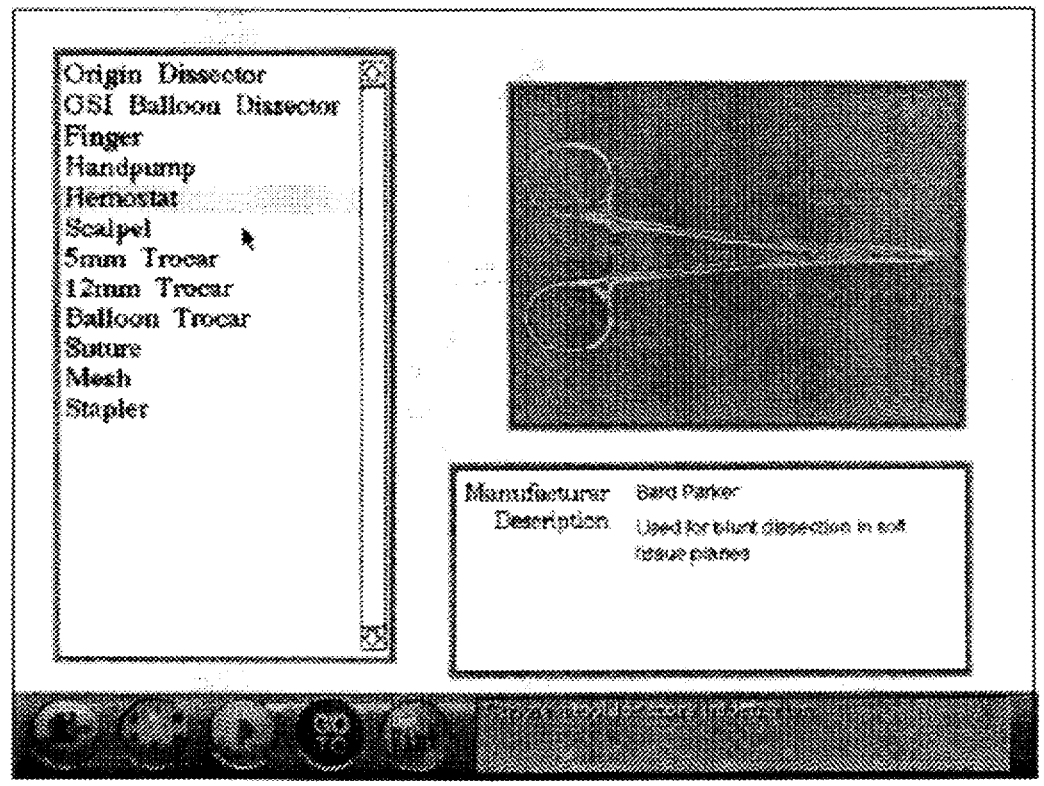
FIG. 5B is a facsimile of an actual computer screen display during the execution of an instruments option in accordance with the preferred embodiment.

Referring now to FIGS. 5A and 5B, FIG. 5A illustrates a video screen 50 in accordance with the Instruments option 55, selected from the main menu of options illustrated in FIGS. 3A and 3B. In accordance with such option, the presently preferred embodiment displays three windows on the display screen 50. A first window or a medical instruments window 80 displays a list of medical instruments. Preferably, the instruments displayed on the list will be associated with a particular medical procedure. A second window or a graphic display window 81 presents a visual display of a medical instrument, preferably from a pre-recorded digitized photograph. Finally, a description window 82 provides a brief description of the instrument. In operation, the user may select or highlight any instrument within the list. The software then serves to retrieve a corresponding photographic image of that instrument to display in window 81. A related description is retrieved and presented in window 82. In the illustrated embodiment of both FIGS. 5A and 5B, a hemostat has been highlighted in window 80. A corresponding image of a hemostat has been displayed in window 81 and a description of the hemostat as an instrument used for blunt dissection and soft tissue planes has been presented in window 82. Indeed, as illustrated in FIG. 5B, a designation of manufacturer may also be presented. It will be appreciated that, consistent with the teachings of the invention, additional windows or variations of those described may also be provided in connection with the Instruments option 55 described above. For example, a video window may be provided to illustrate the operation of the instrument during a surgical procedure.

Figure 6A:
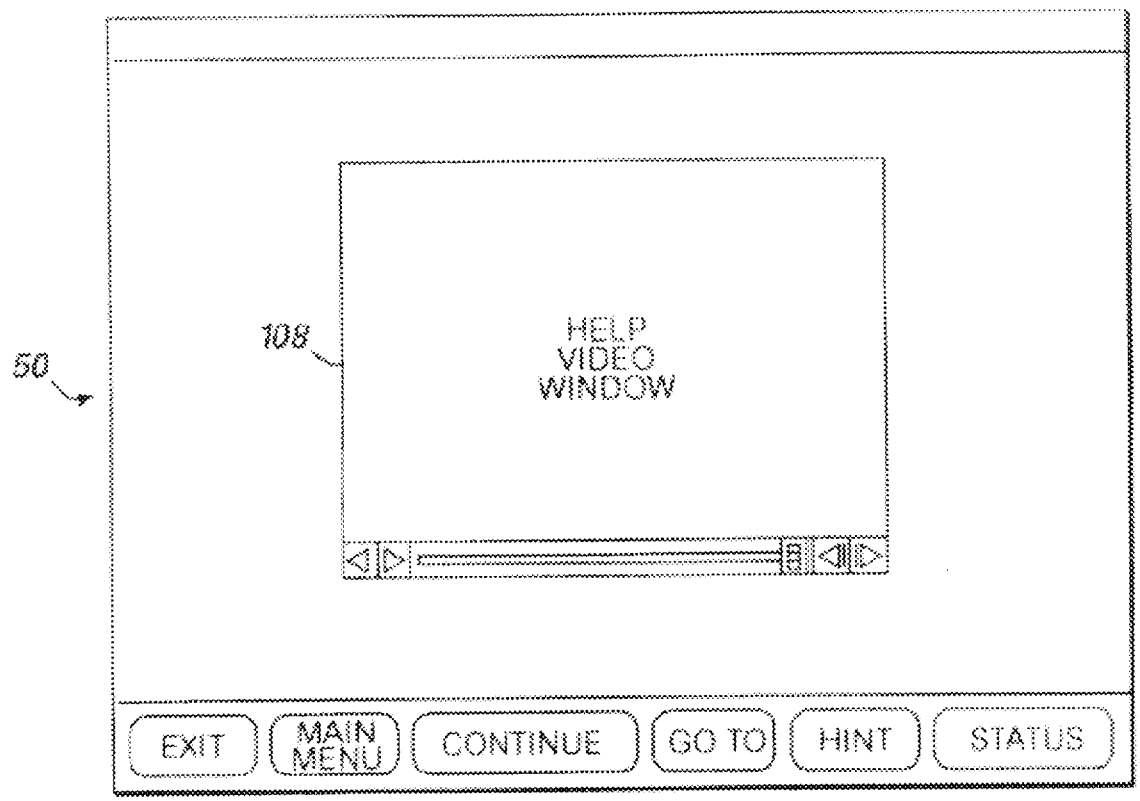
FIG. 6A is a diagram illustrating a computer screen display, in accordance with a help/error option of the preferred embodiment.
Figure 6B:
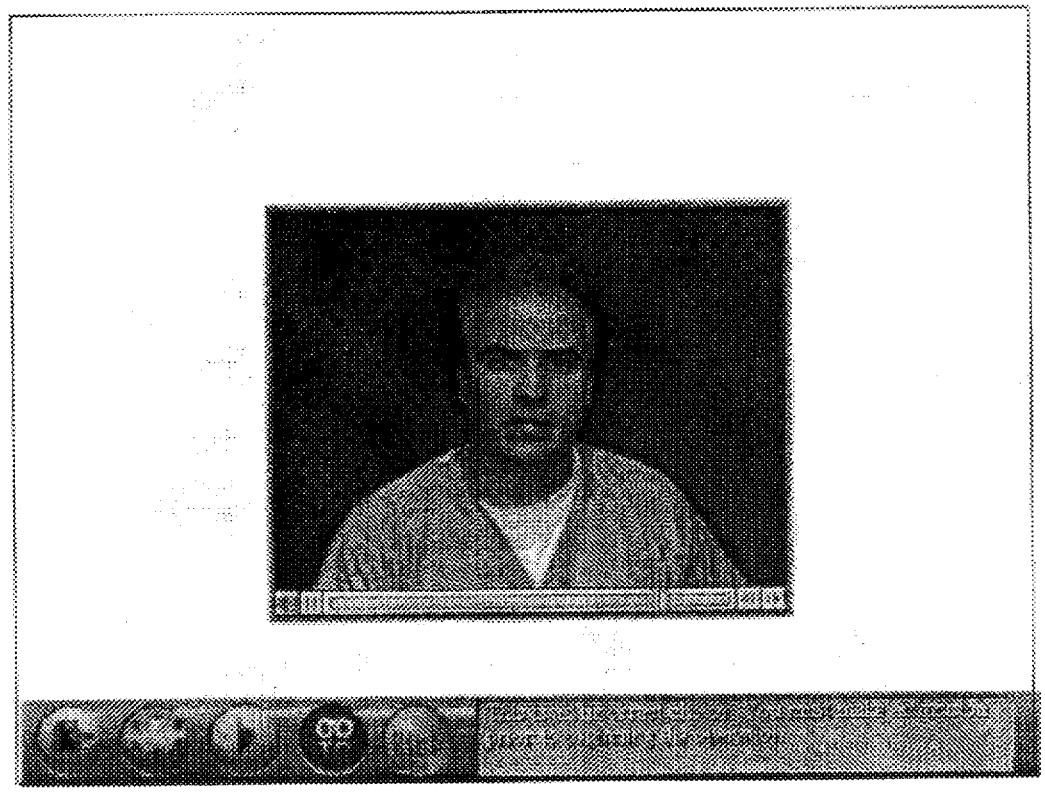
FIG. 6B is a facsimile of an actual computer screen display during the execution of a help/error option in accordance with the preferred embodiment.

Referring to FIGS. 6A and 6B, the present invention also provides a help/error video window 108. This window is invoked, for example, if the user makes an improper selection in response to a question posited by the invention. For instance, if the user is requested to identify the appropriate medical instrument for use in the next step of a surgical procedure, and in response the user selects an improper instrument, an error window 108 is presented which so instructs the user. Alternatively, if the user is requested to input certain information and the user requests help from the Hint icon 65, then a similar help window 108 is presented to provide insight to the user for carrying out the next step. Preferably, this help/error window 108 displays prerecorded video segments of a doctor instructing the user. In this regard, both video and sound preferably are output to the user.

Figure 4A:
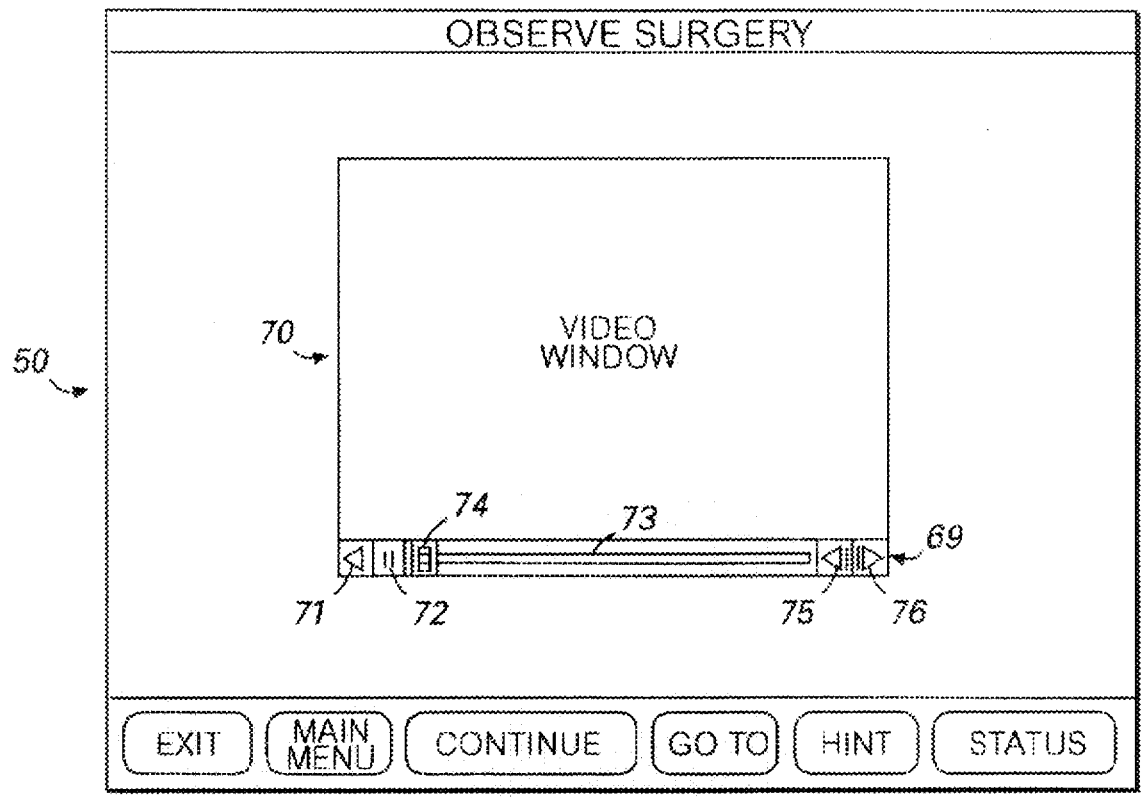
FIG. 4A is a diagram illustrating a computer screen display, in accordance with an observe surgery option of the preferred embodiment.
Figure 4B:
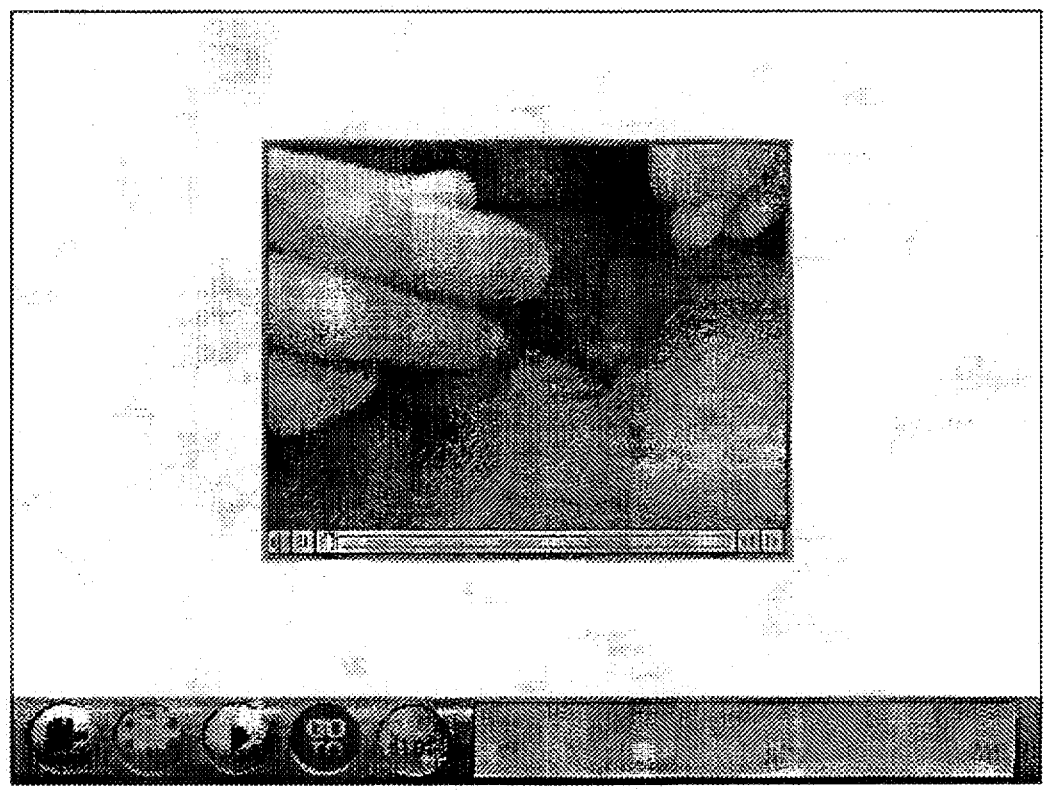
FIG. 4B is a facsimile of an actual computer screen display during the execution of an observe surgery option in accordance with the preferred embodiment.
Figure 7A:
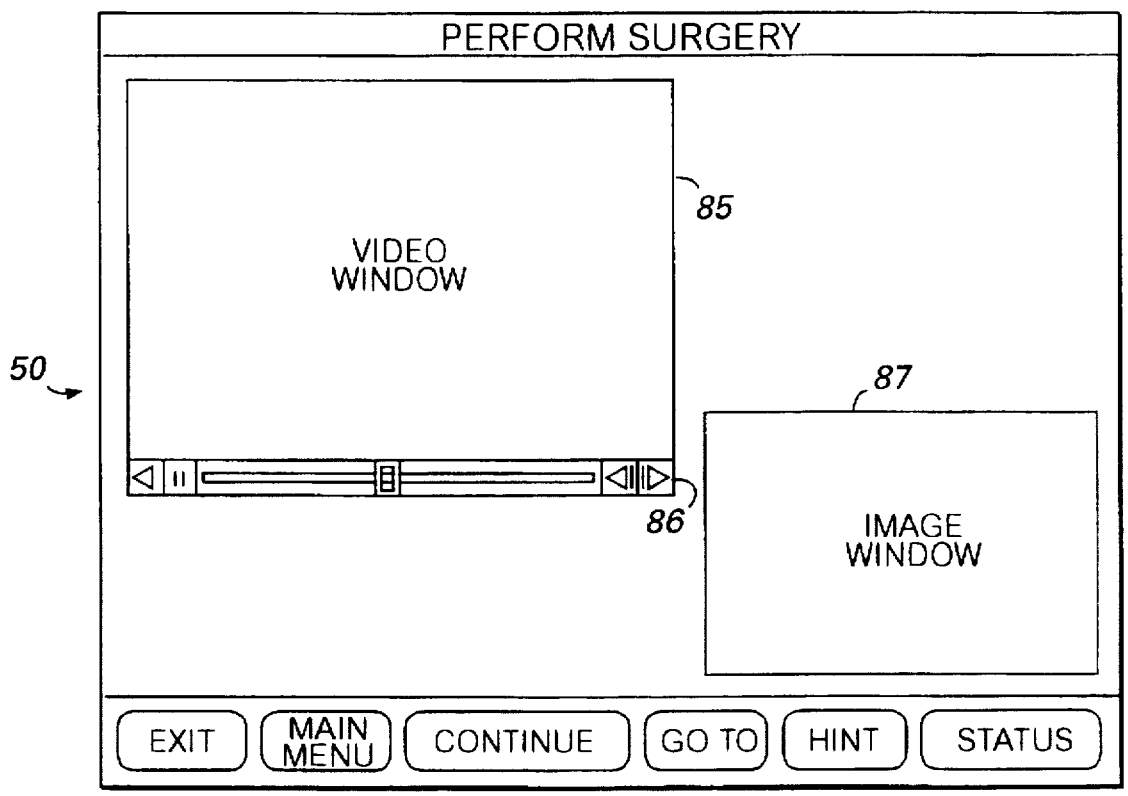
FIG. 7A is a diagram illustrating a computer screen display, in accordance with a perform surgery option of the preferred embodiment.
Figure 7B:
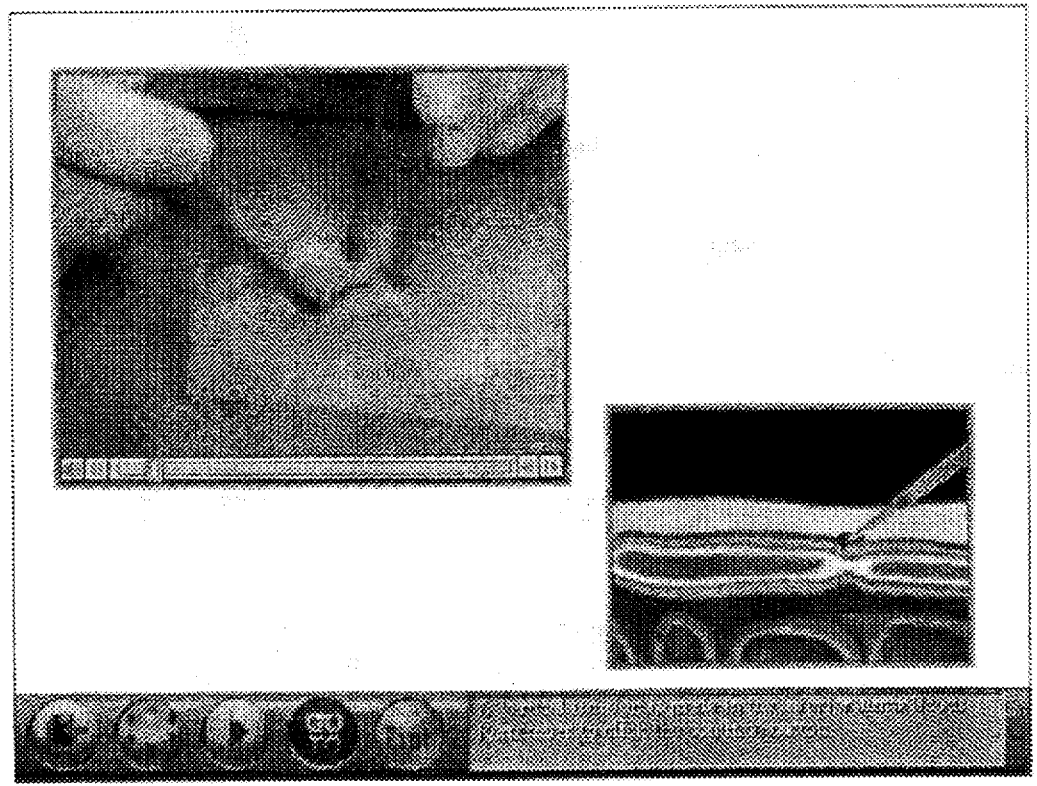
FIGS. 7B and 7C are facsimiles of actual computer screen displays during the execution of a perform surgery option in accordance with the preferred embodiment.

In keeping with the description of the various options of the preferred embodiment, the Perform Surgery option 56 is illustrated in FIGS. 7A and 7B. As illustrated in FIG. 7A, the perform surgery option preferably operates to present two windows onto the video display 50. A first window or a video window 85, like the video window 70 described in FIG. 4A, presents a video segment of a particular medical or surgical procedure. A control panel 86, like that described in FIG. 4A, is provided to control the display of the video within window 85. In connection with video window 85, an image window 87 provides a second graphical presentation of the surgical procedure. In the preferred embodiment, the image window 87 provides a graphic illustration of a cross-sectional side view of a tissue area that is to be operated upon. For example, as illustrated in FIG. 7B, while the video window 85 illustrates a vertical incision being made using a scalpel, the image window 87 may (by showing a cross-sectional view) illustrate the depth at which the incision should be made, using the scalpel.

Figure 7C:
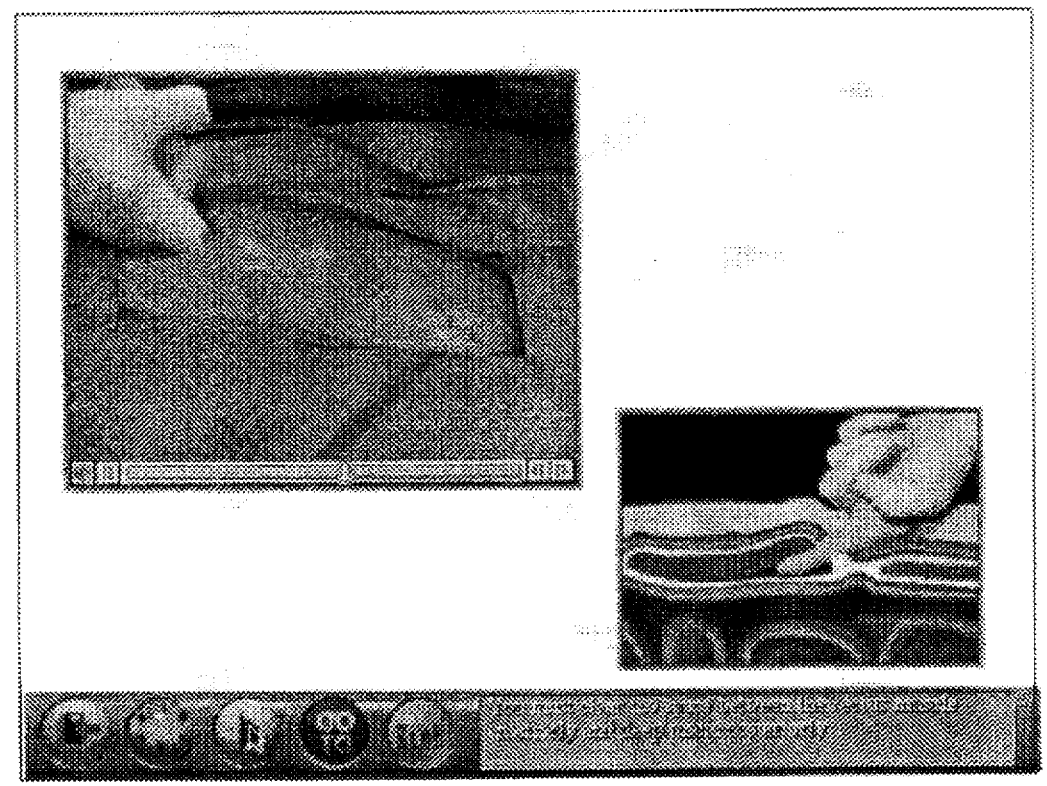

To further illustrate the use of the image window 87, FIG. 7C presents a facsimile of a computer display screen, illustrating a finger dissection, in accordance with the Perform Surgery option. Again, the cross-sectional view shown in image window 87 illustrates the proper placement of the finger within the tissue.

Consistent with the broader aspects of the present invention, additional or different window may be displayed in connection with the Perform Surgery option of the present invention. For example, a second video window (not shown) may be presented to display an alternative view of the surgical procedure shown in video window 85. Indeed, as described in further detail below, during a laparoscopic procedure, video window 85 often presents internal views as obtained through a laparoscope. It may be desired to present similar views simultaneous with an external view. For such a purpose, an additional video window may be desired.

Figure 8A:
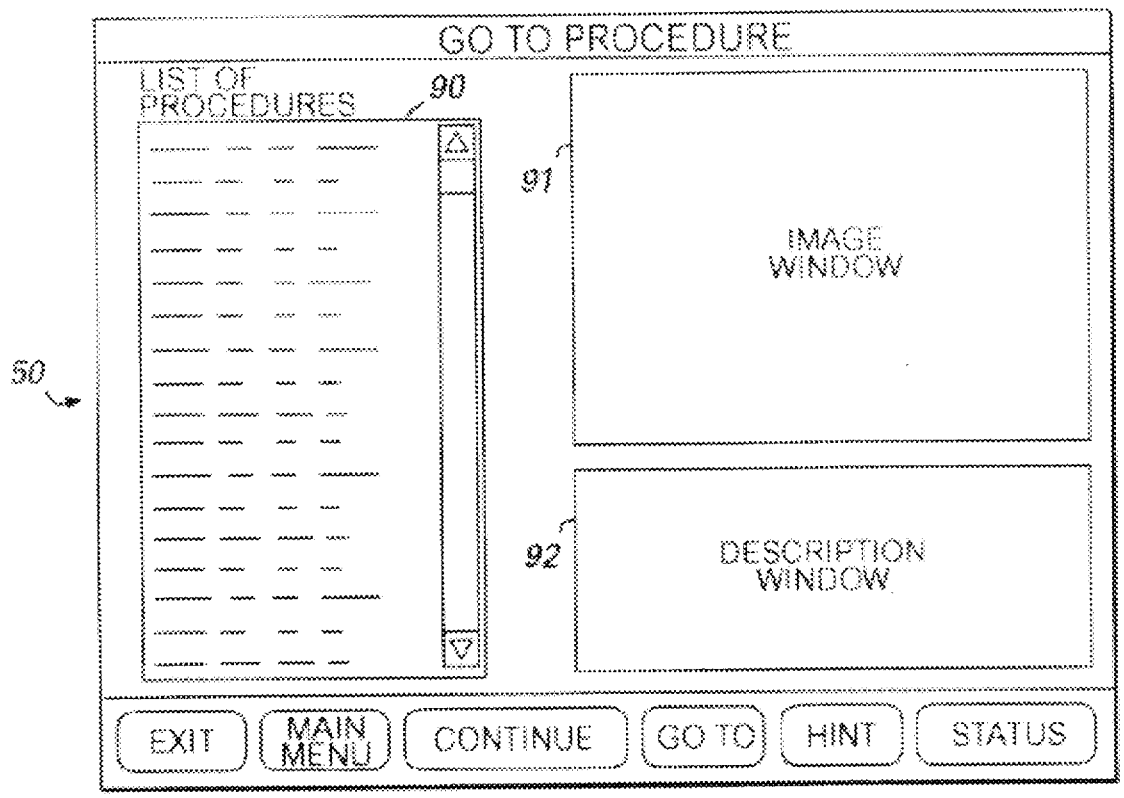
FIG. 8A is a diagram illustrating a computer screen display, in accordance with a goto option of the preferred embodiment.
Figure 8B:
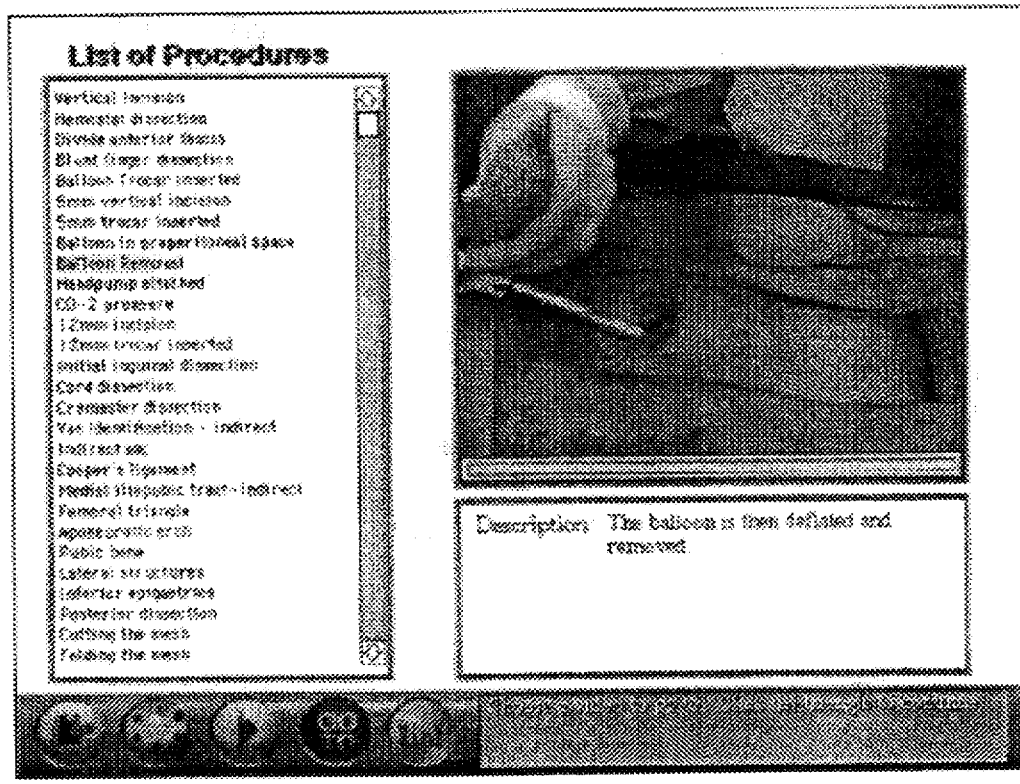
FIG. 8B is a facsimile of an actual computer screen display during the execution of a goto surgery option in accordance with the preferred embodiment.

Referring now to FIGS. 8A and 8B, the Go To option 64 is illustrated. As previously mentioned, the Go To option is a subset of the Perform Surgery option. In accordance with the Go To option, a user may select a particular step within a broader medical procedure, and the software directly advances to that step, rather than requiring the user to proceed sequentially through the preceding steps. As illustrated in FIG. 8A, three windows are preferably displayed on the display screen 50. A procedures window 90 presents a list of steps within a given surgical procedure. At the same time, an image window 91 is provided to present a graphical image (preferably a digitized photograph), relating to the procedure or step presently highlighted in window 90. Alternatively, a video segment may be displayed in window 91, relating to the highlighted step or procedure. Finally, a description window 92 presents a brief factual description of the step or procedure highlighted in window 90 and illustrated in window 91. For example, a facsimile of an actual screen display is provided in FIG. 8B. The list of procedures or steps within the broader surgical procedure of a laparoscopic extraperitoneal herniorrhaphy are listed in the list of procedures. These include the initial vertical incision, hemostat dissection, divide anterior fascia, blunt finger dissection, insertion of balloon, etc. In the figure, the step of balloon removal is highlighted. Accordingly, the image window shows a photographic image of the step of balloon removal, and the description window provides that "the balloon is deflated and removed," to present a brief description of the procedure.

Figure 9A:
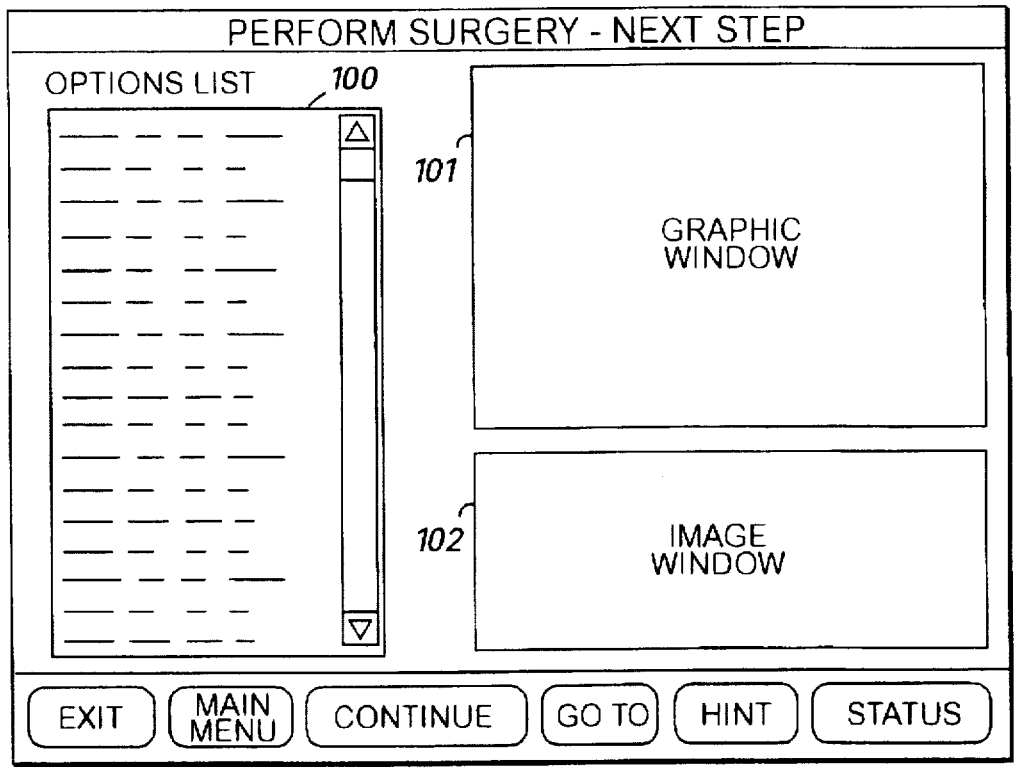
FIG. 9A is a diagram illustrating a computer screen display, in accordance with a perform surgery—next step feature of the preferred embodiment.
Figure 9B:
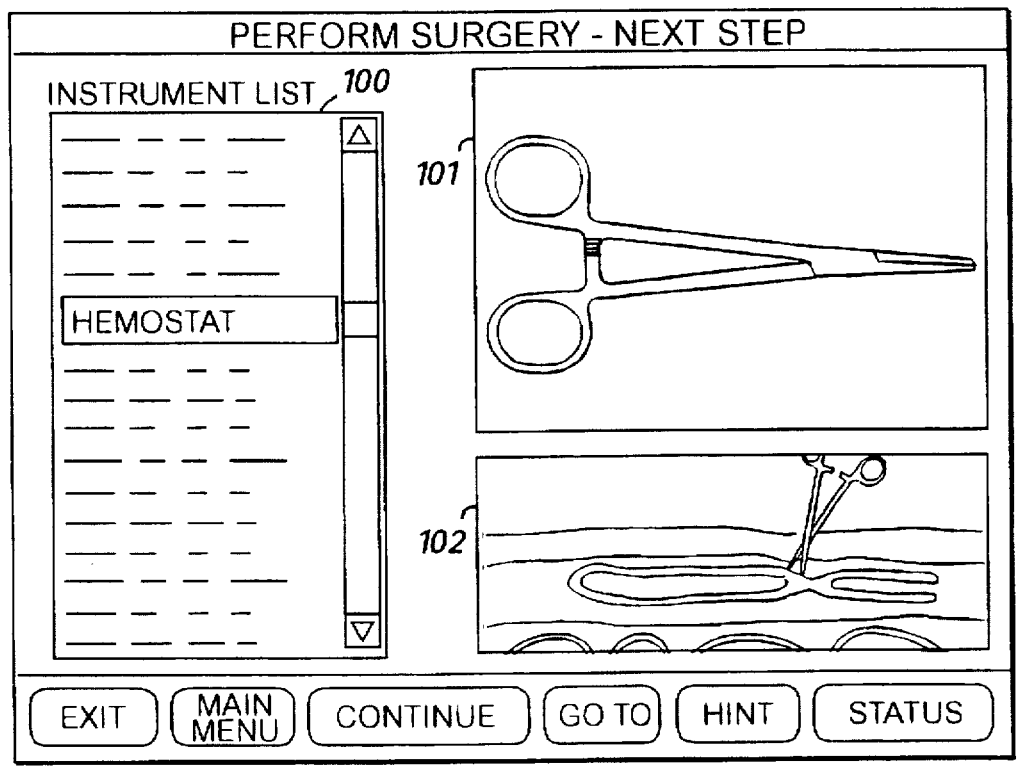
FIG. 9B is a diagram illustrating a computer screen display, in accordance with a perform surgery—next step (select instrument) feature of the preferred embodiment.
Figure 9C:
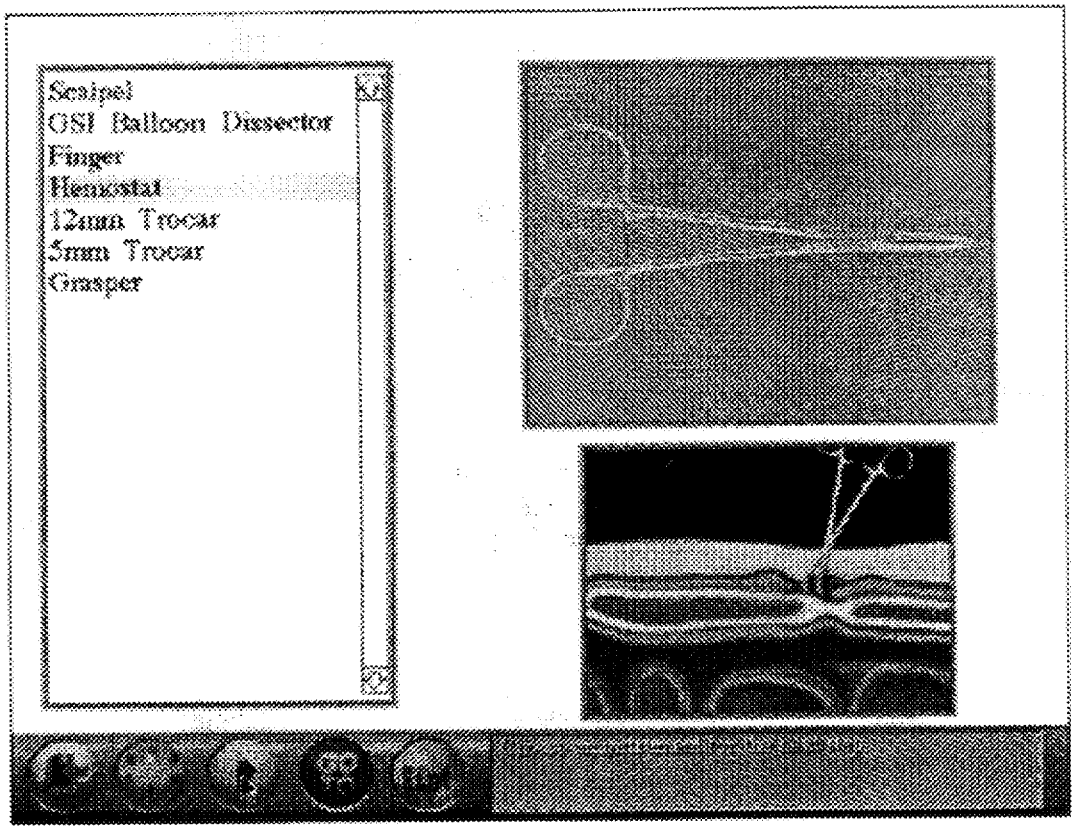
FIG. 9C is a facsimile of an actual computer screen display during the execution of a perform surgery—next step feature of the preferred embodiment.

Turning now to FIGS. 9A, 9B, and 9C, a significant aspect of the present invention, in connection with the Perform Surgery option 56, is illustrated. This aspect of the invention relates to user interaction in connection with the surgical procedure being presently displayed. As previously described in connection with FIGS. 7A–7C, the Perform Surgery option 56 provides a video window that illustrates a surgical procedure, by displaying prerecorded video segments of that procedure. In accordance with the aspect of FIGS. 9A–9C, at the end of certain video segments, the present invention posits a question to the user relating to the next step in the surgical procedure. In one example, the system prompts the user to select the appropriate medical instrument for use in carrying out the next step of the procedure. In connection with this feature, an options list window 100 is provided, which lists a plurality of user-selectable options relating to the next step of the surgical procedure. A graphic window 101 is provided to display a video or photographic illustration relating to a selected or highlighted option within the options list 100. An auxiliary image window 102 provides a secondary graphic display in connection with the option highlighted from the list 100. As illustrated in FIGS. 9B and 9C, a hemostat is highlighted in list 100 and a digitized photograph of a hemostat is displayed in graphic window 101. Similarly, the image window 102 may display an illustration of the use of a hemostat or other instruments selected from the options list, in connection with the performance of the next step in the surgical procedure.

A related aspect of the present invention (in connection with the Perform Surgery option 56) relates to the selection of surgical locations. For example, rather than prompting a user to select a particular medical instrument from a list of instruments, the present invention may request the user to identify surgical locations to be operated upon. In accordance with the preferred embodiment, during the performance of an extraperitoneal herniorrhaphy, a window 105 is presented on the display screen 50. A prerecorded video or photographic image, as taken through a laparoscope, may be displayed in window 105 and the user may be asked to identify locations of various surgical bisections to be performed in connection with the procedure. The user selects these locations by moving the mouse, for example, to the appropriate location and depressing a mouse button to select that location. As an aid to the user, "hot spots" may be provided wherein a user may depress a help key to illuminate rectangular windows 106 that highlight the various potential locations in which a surgical operation may be performed. As will be further described herein, selection of an improper location for such a surgical dissection will be identified by the software and the user will be so instructed.

Figure 11:
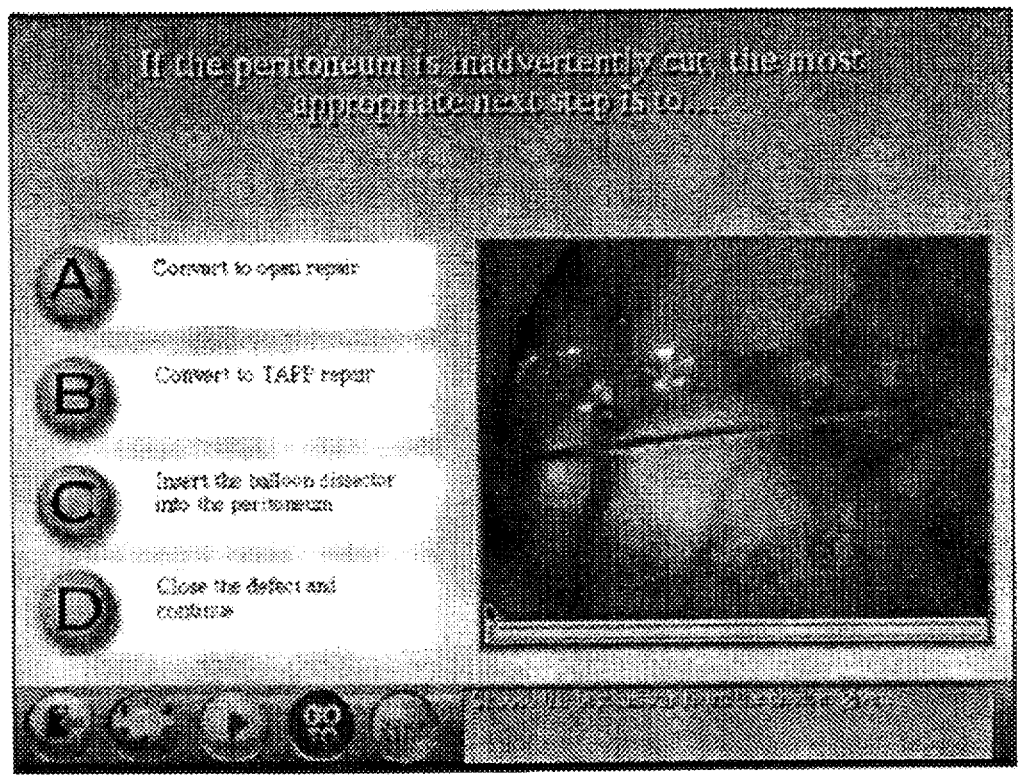
FIG. 11 is a facsimile of an actual computer screen display during the execution of a quiz option of the preferred embodiment.

Finally, FIG. 11 is a facsimile of a display screen and illustrates the Quiz option 54 of the presently preferred embodiment. When a user selects the quiz option 54, the invention then posits questions to the user in connection with a medical procedure. For example, the screen display illustrated in FIG. 11 posits the question "If the peritoneum is inadvertently cut, the most appropriate next step is to . . ."
In connection with the question, a video window is displayed to illustrate the question, or alternatively the appropriate response. Several options are presented for the user's selection. In the illustrated example, four options are presented: Option A "convert to open repair"; Option B "convert to TAPP repair"; Option C "insert the balloon dissection into the peritoneum"; and Option D "close the defect and continue." Upon selection an Option A, B, C, or D, the user is then instructed whether his selection is correct or incorrect. Indeed, in connection with the broader aspects of this feature of the present invention, a number of questions may be sequentially posited to the user, with the total number of correct and incorrect answers tallied and presented to the user after all questions have been answered.

III. An Example

Having described the various screen displays and principal functional components of the present invention, reference will now be made to various software flowcharts that illustrate the operation of the preferred embodiment in connection with a particular surgical procedure. Namely, an extraperitoneal herniorrhaphy. It is believed that the foregoing description is sufficient to enable a person of ordinary skill in the art to practice the present invention, and the ensuing description is provided merely to highlight certain aspects of a preferred embodiment.

Figure 12:
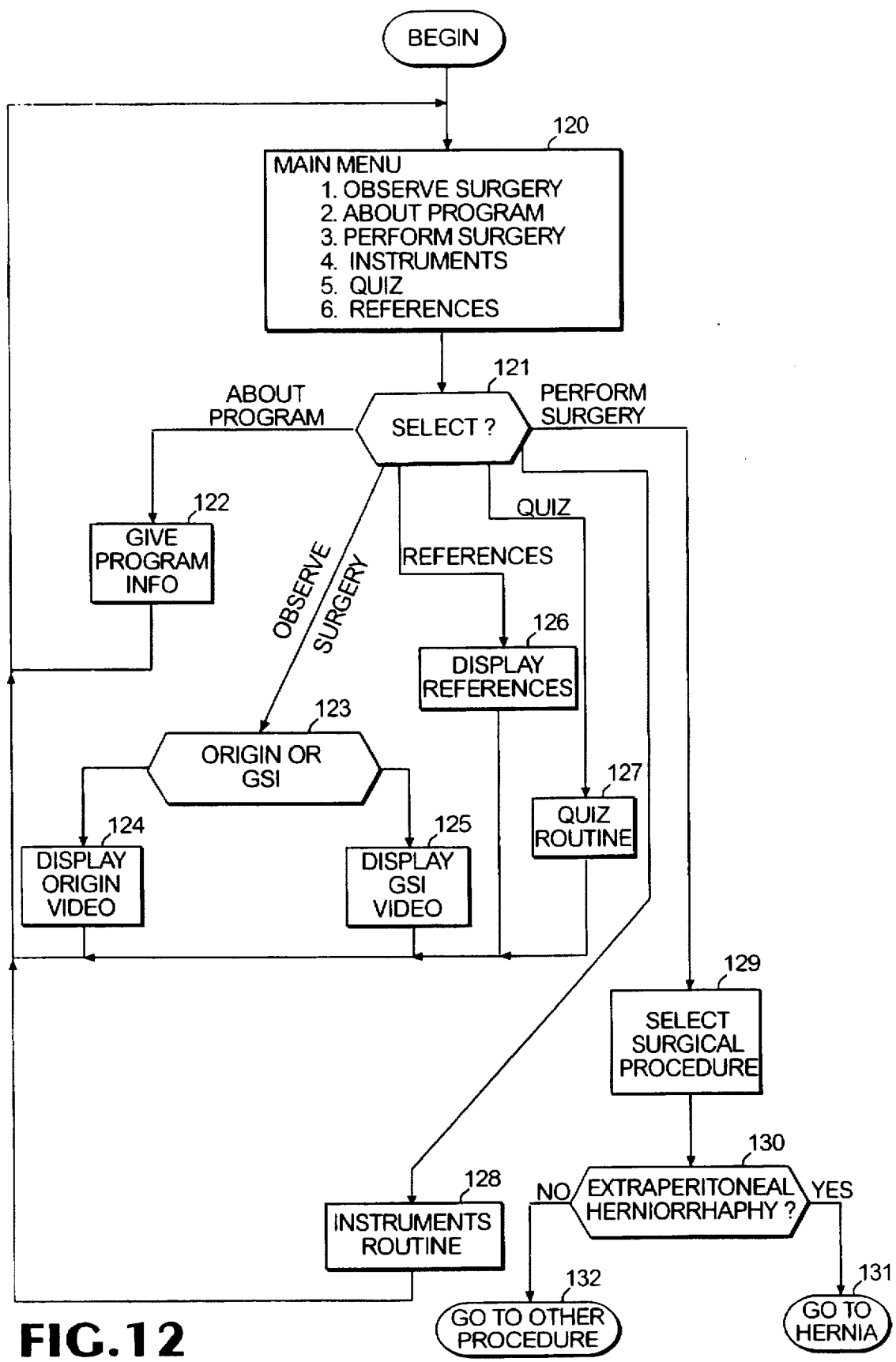
FIG. 12 is a software flowchart illustrating the top-level software operation in accordance with the preferred embodiment.

In this regard, reference is made to FIG. 12, which illustrates the principal functional operation of a preferred embodiment of the present invention. At step 120, the Main Menu screen illustrated in FIGS. 3A and 3B is displayed, presenting the user with options of: (1) Observe Surgery, (2) About Program, (3) Perform Surgery, (4) Instruments, (5) Quiz, and (6) References. The system then waits for user to select one of the foregoing options (step 121) before proceeding on to the appropriate routines. If the user selects the About Program option, then program information is displayed at step 122 and the system again returns to the main menu at step 120.

If the observe surgery option is chosen, the user is then further prompted to select between choices of Origin or GSI surgical procedures, at step 123. If the user selects Origin, then the system displays a first video procedure in step 124, thereafter returning to the main menu at step 120. Alternatively, the system displays a video of a GSI procedure at step 125, before returning to the main menu at step 120.

If the user's selection at step 121 is to view references associated with a particular surgical procedure, then a list of such references is displayed at step 126, and control is thereafter returned to step 120. Likewise, if the quiz option is selected at step 121, then a routine, denoted as step 127, is executed and control is returned to step 120. As previously described, this routine presents the user with various questions regarding medical or surgical procedures and evaluates the responses given by the user. In one embodiment, a number of questions are asked, and the responses given by the user are tallied to arrive at an overall effectiveness score or grade. Based upon the overall effectiveness, the user may be instructed upon his or her relative proficiency in the particular medical procedure tested upon. As will be appreciated, this will provide some measure or basis for a user to determine whether further studies and training in a particular area are necessary.

In similar fashion, if the user selects the instrument option, presented at step 120, then an instruments routine, denoted as step 128, is executed. Having been previously described, this routine presents a list of instruments to the user, which may be associated with particular medical procedures. By highlighting, or otherwise selecting, a particular instrument, the system displays a visual image of the instrument and also a brief description on the use or operation of the instrument. Exiting from this routine returns the user to the main menu at step 120.

Finally, the last option presented at the main menu of step 120 is the Perform Surgery option. If the user selects this option, the system enters an interactive mode of operation, whereby video segments of a medical procedure are fragmentarily displayed to the user. Between fragments of video, the system may prompt the user for information relating to the next step in the medical procedure. Advantageously, this interactivity keeps the user engaged in the activity and facilitates the educational and training process. In accordance with one embodiment of the invention, a variety of different medical procedures may be presented to the user at step 129. To illustrate the operation of the present invention in connection with a preferred embodiment, the ensuing description will present the system operation in connection with an extraperitoneal herniorrhaphy. Therefore, the flowchart of FIG. 12 is illustrated to include decisional step 130, which transfers the program flow to a procedure called Hernia at step 131, if the extraperitoneal herniorrhaphy choice was selected. Otherwise program control is transferred at step 132 to another procedure. While no other procedure is presented for illustration herein, it will be understood that numerous other procedures may be provided in a manner similar to the extraperitoneal herniorrhaphy described below. Indeed, other laparoscopic surgical procedures may be provided, and even more broadly medical procedures outside the area of laparoscopic surgery may be provided entirely consistent with the concepts and teachings of the present invention.

FIGS. 13A–13J, collectively, illustrate the operation of the preferred embodiment in connection with the Perform Surgery option, wherein the surgical procedure selected by the user at step 130 is the extraperitoneal herniorrhaphy. Before describing the substance of the flowchart of FIGS. 13A–13J, it should be appreciated that the flowchart segments presented in each separate figure sheet, collectively, represent one continuous flowchart. In this regard, circular elements are utilized to provide connectors between different figure sheets, whereby circular elements containing like letters indicate connectivity. For example, the circular elements at the bottom of FIG. 13A and the top of FIG. 13B both contain the letter "A." Therefore, these elements indicate a continuum of the flowchart between the bottom of FIG. 13A and the top of FIG. 13B. It is believed that this nomenclature will be readily understood by persons of ordinary skill in the art.

Figure 13A:
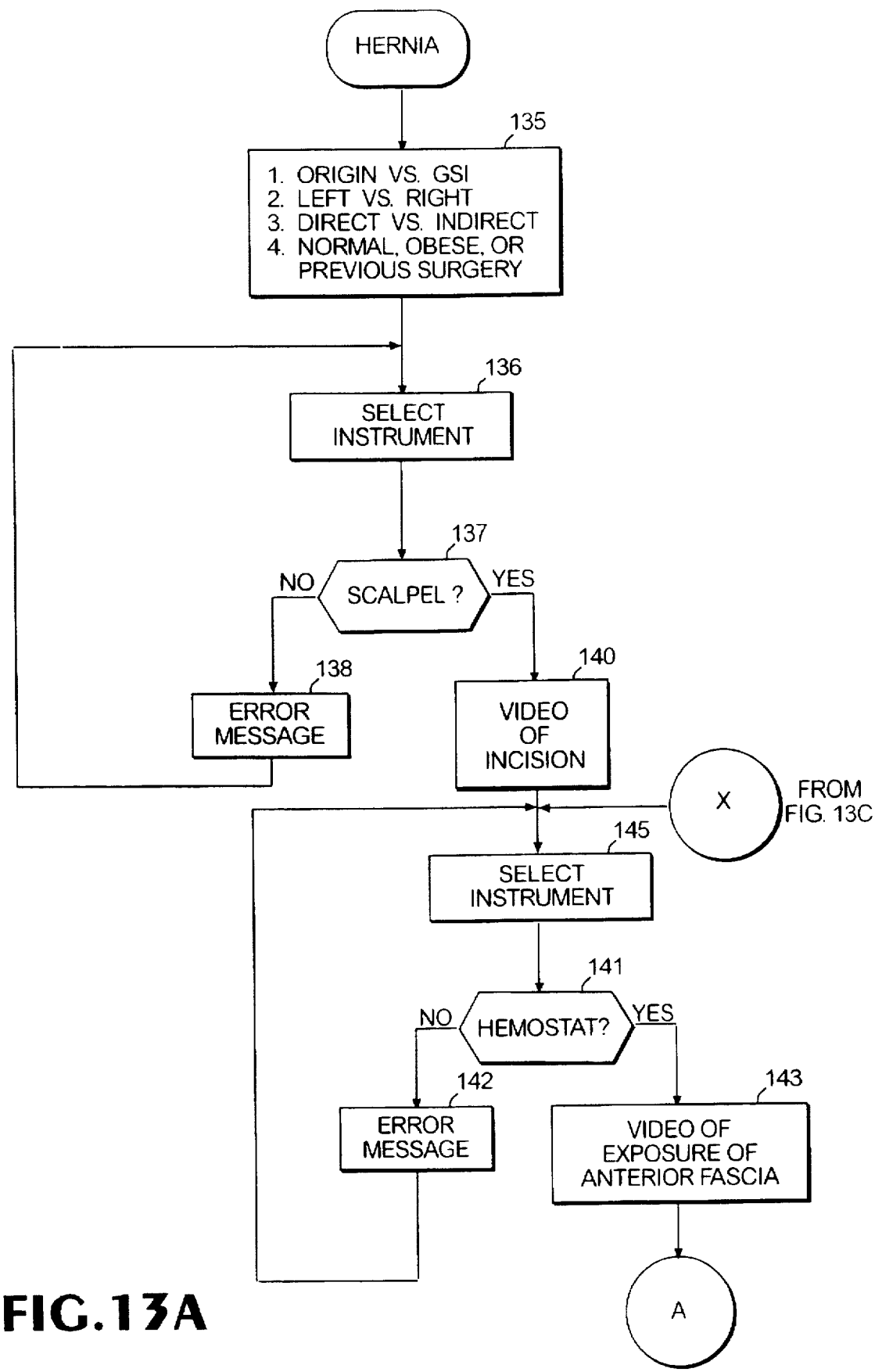
FIGS. 13A–13I comprise a software flowchart illustrating the operation of an example illustrating the preferred embodiment.
Figure 13B:
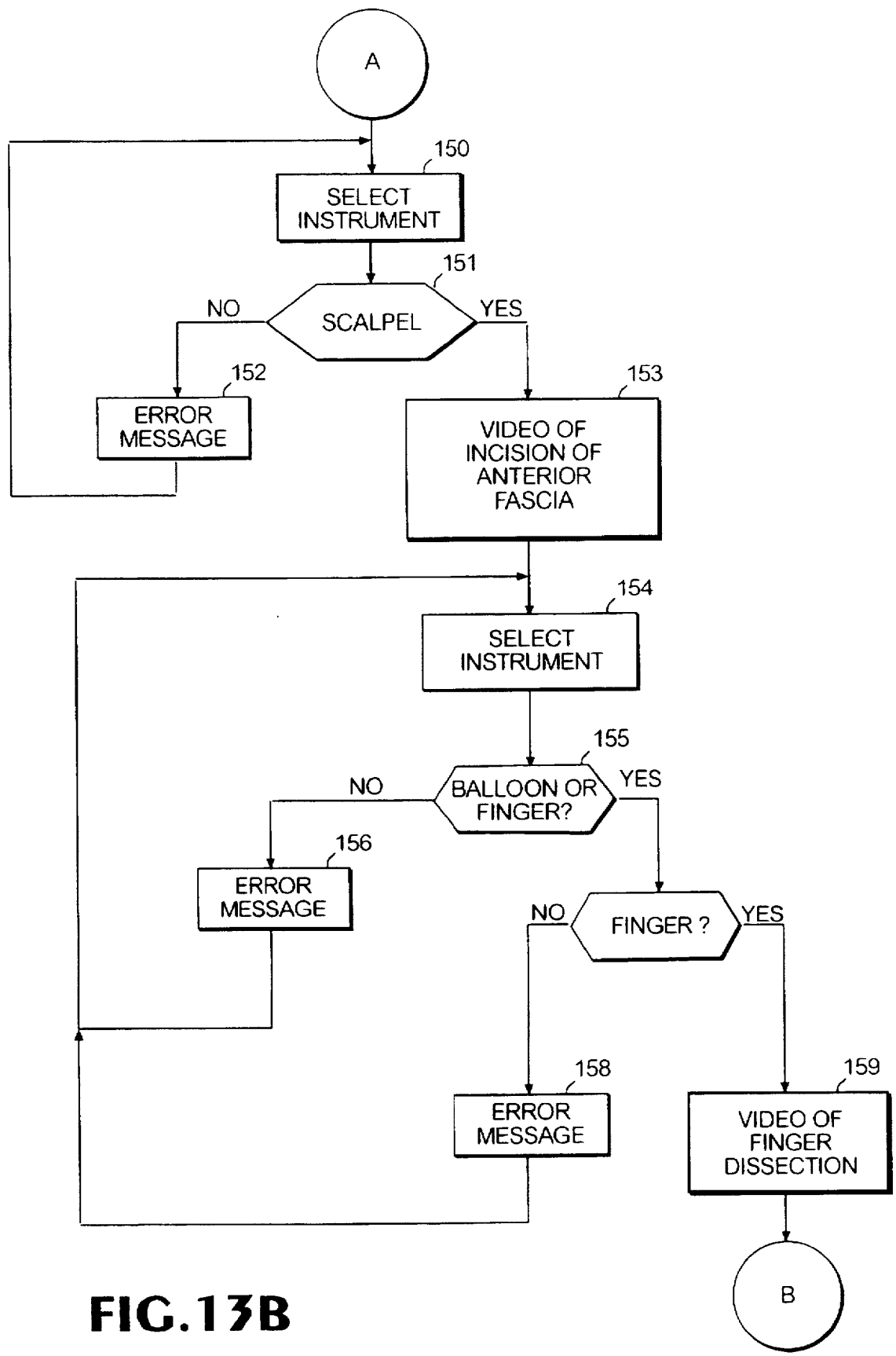
Figure 13C:
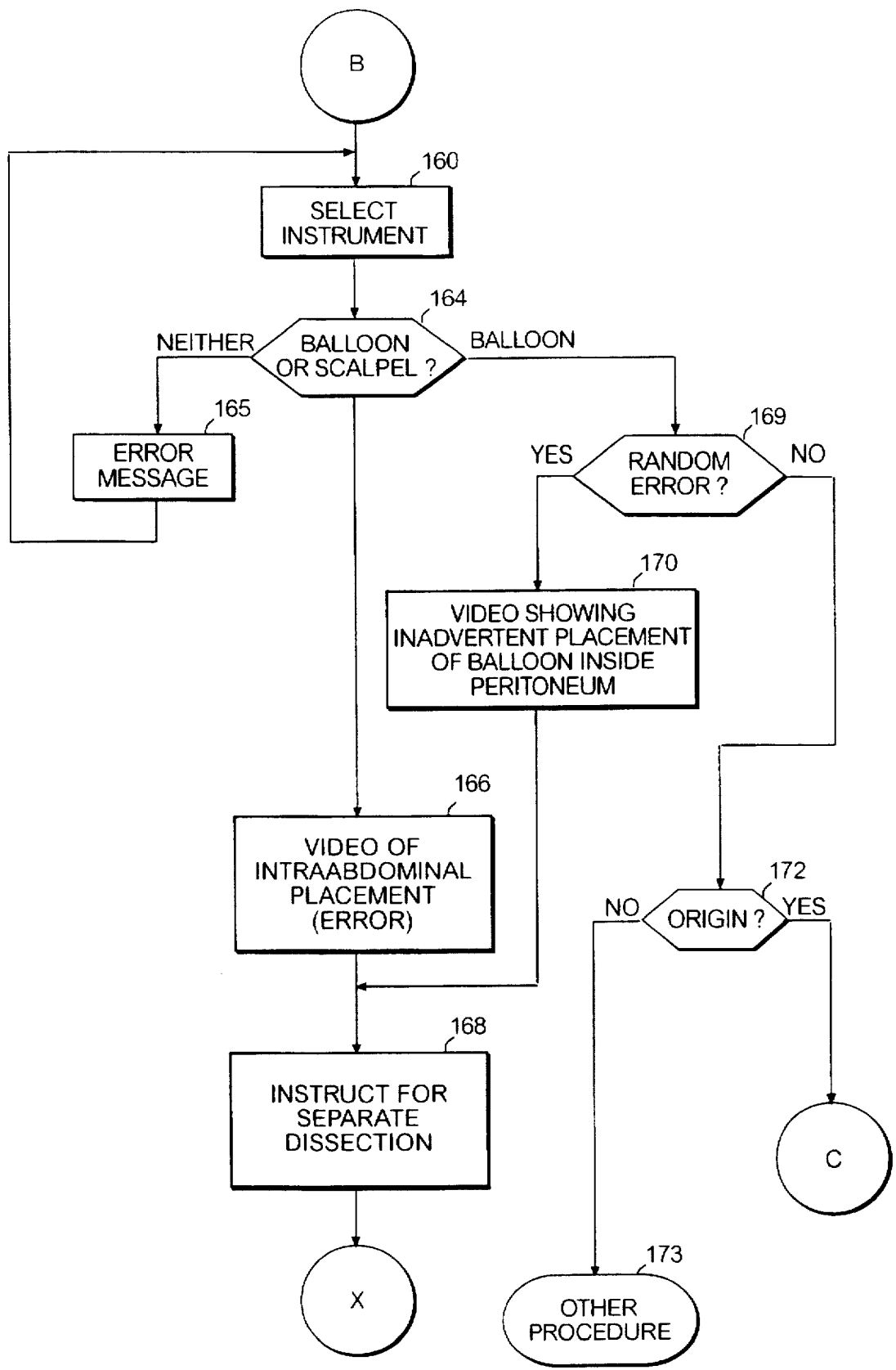
Figure 13D:
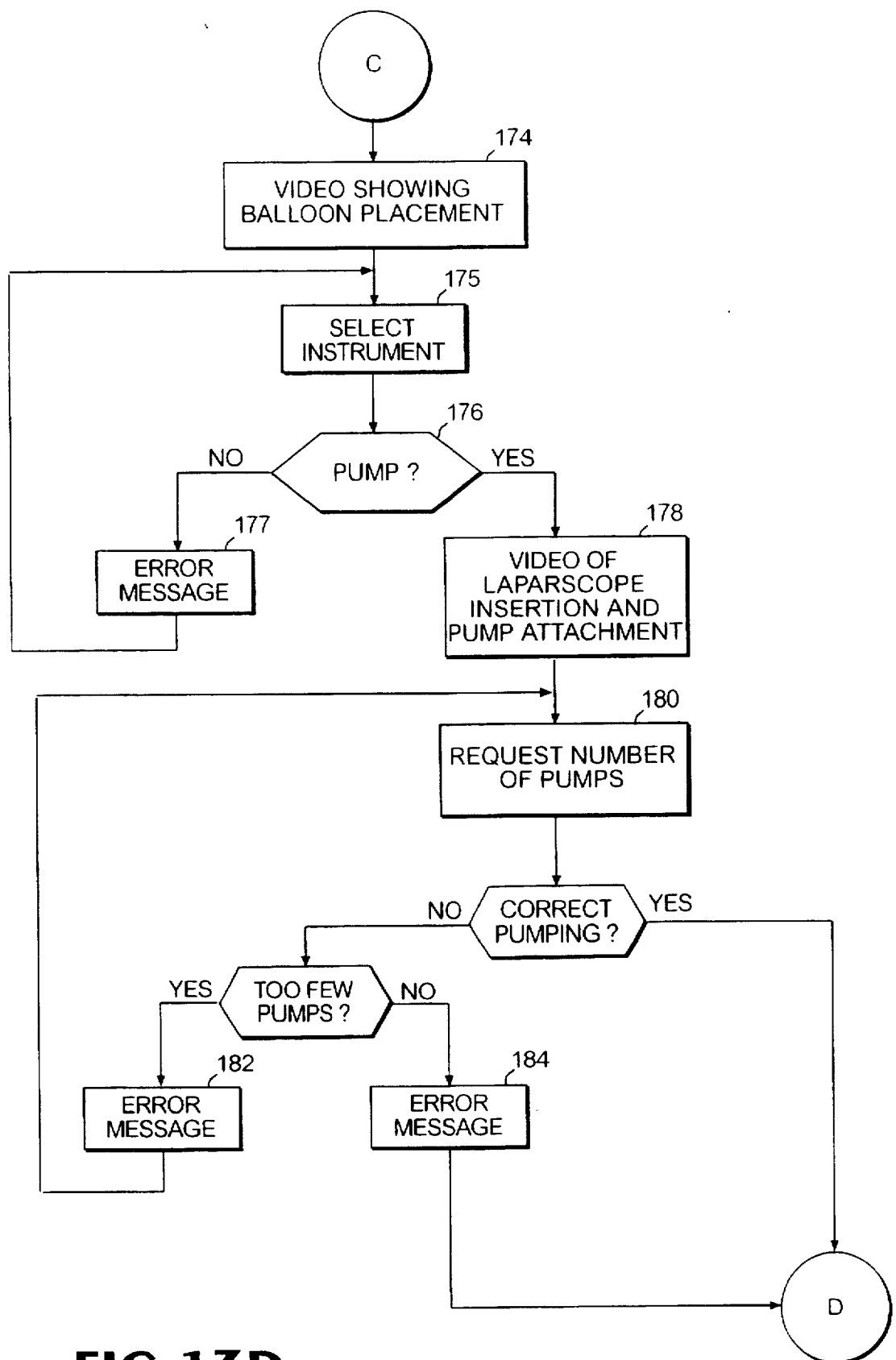
Figure 13E:
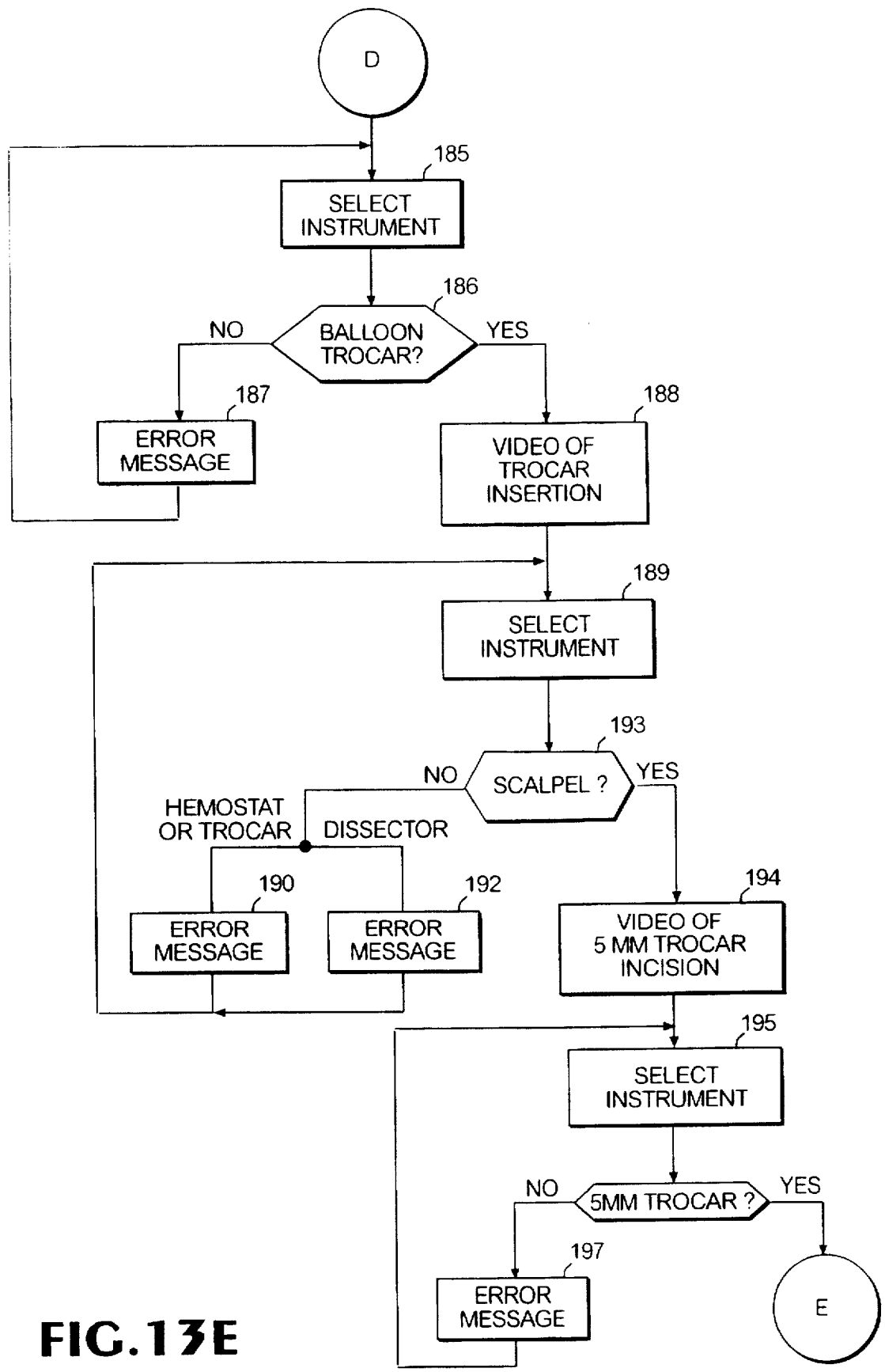
Figure 13F:
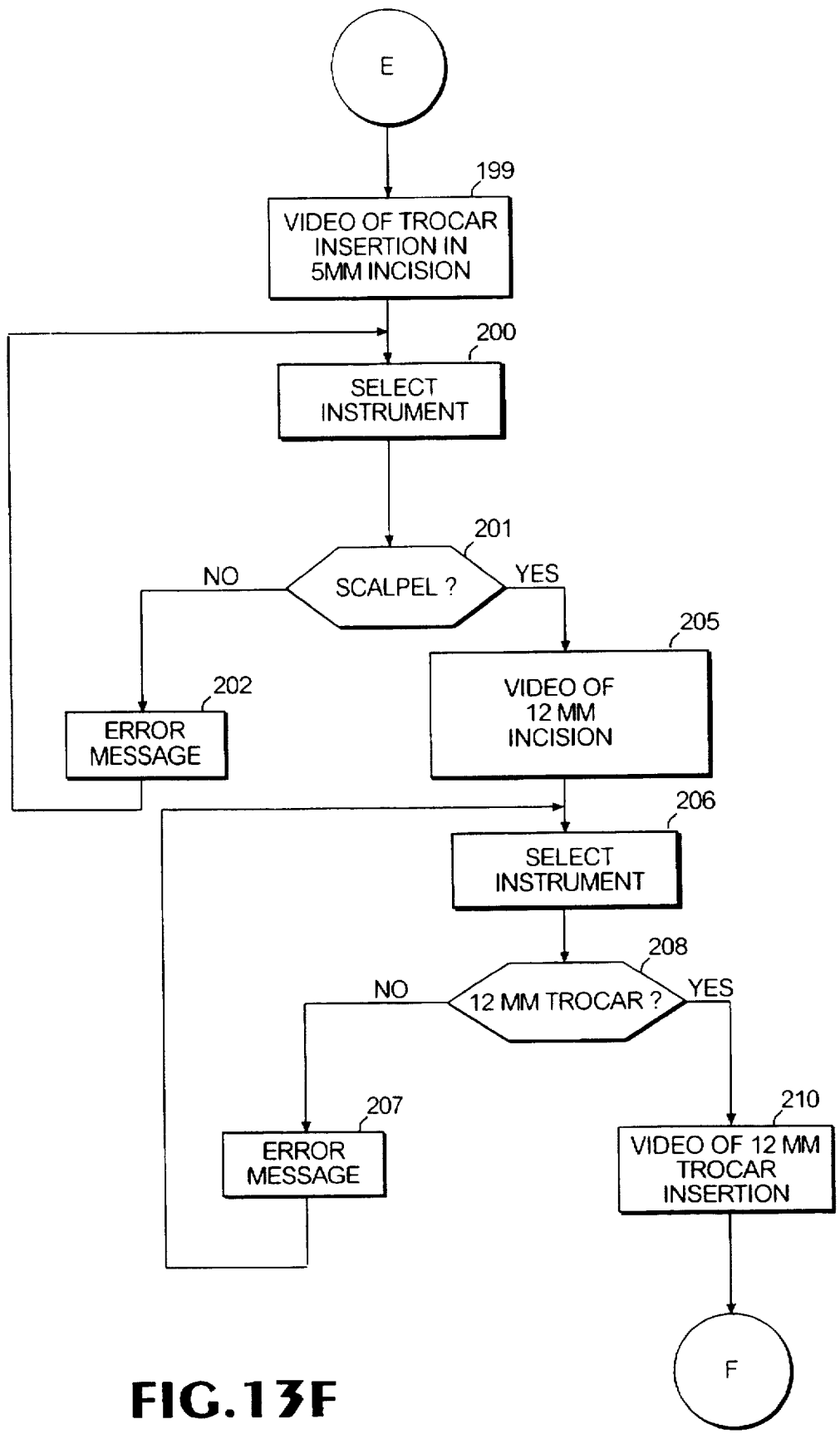
Figure 13G:
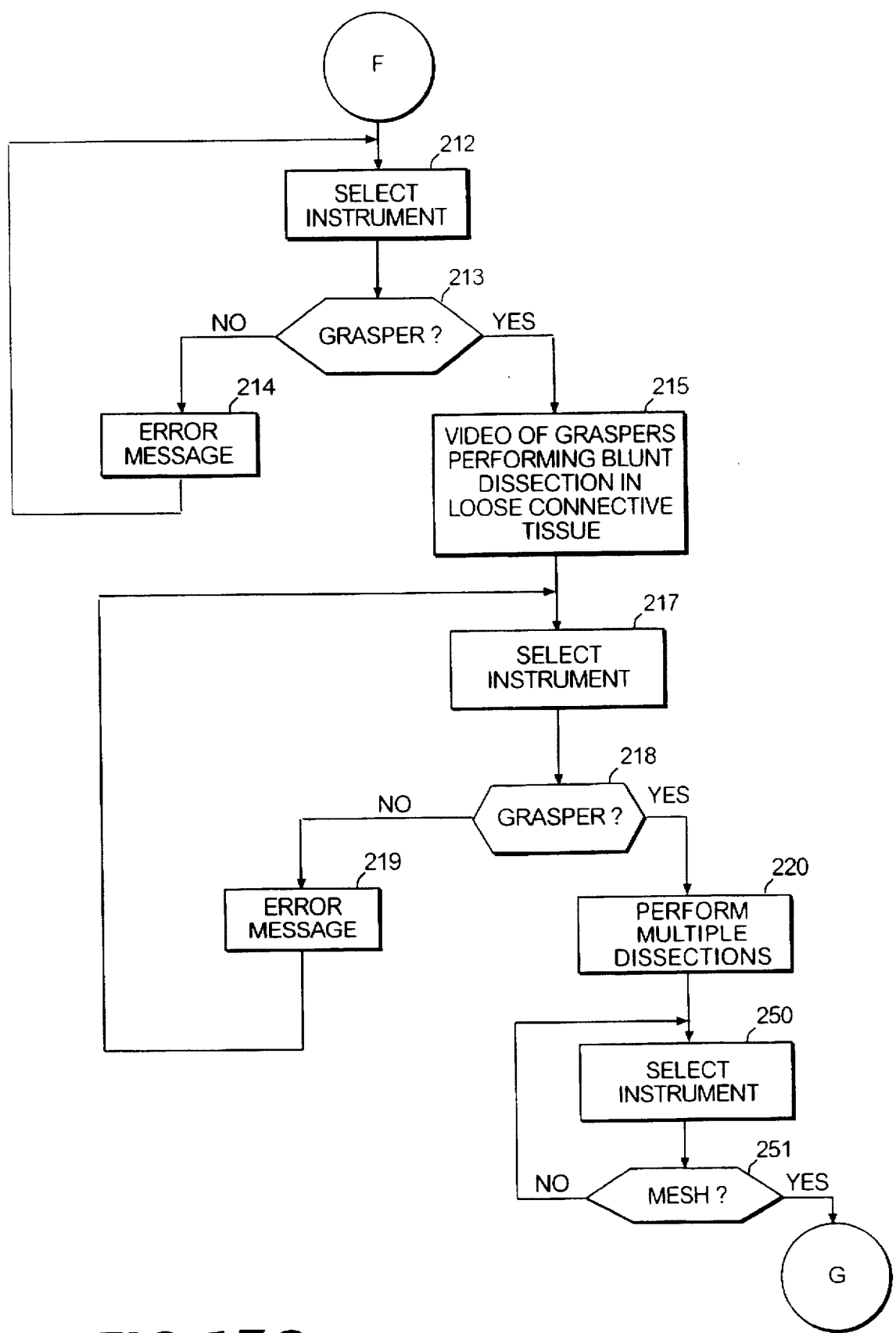
Figure 13H:
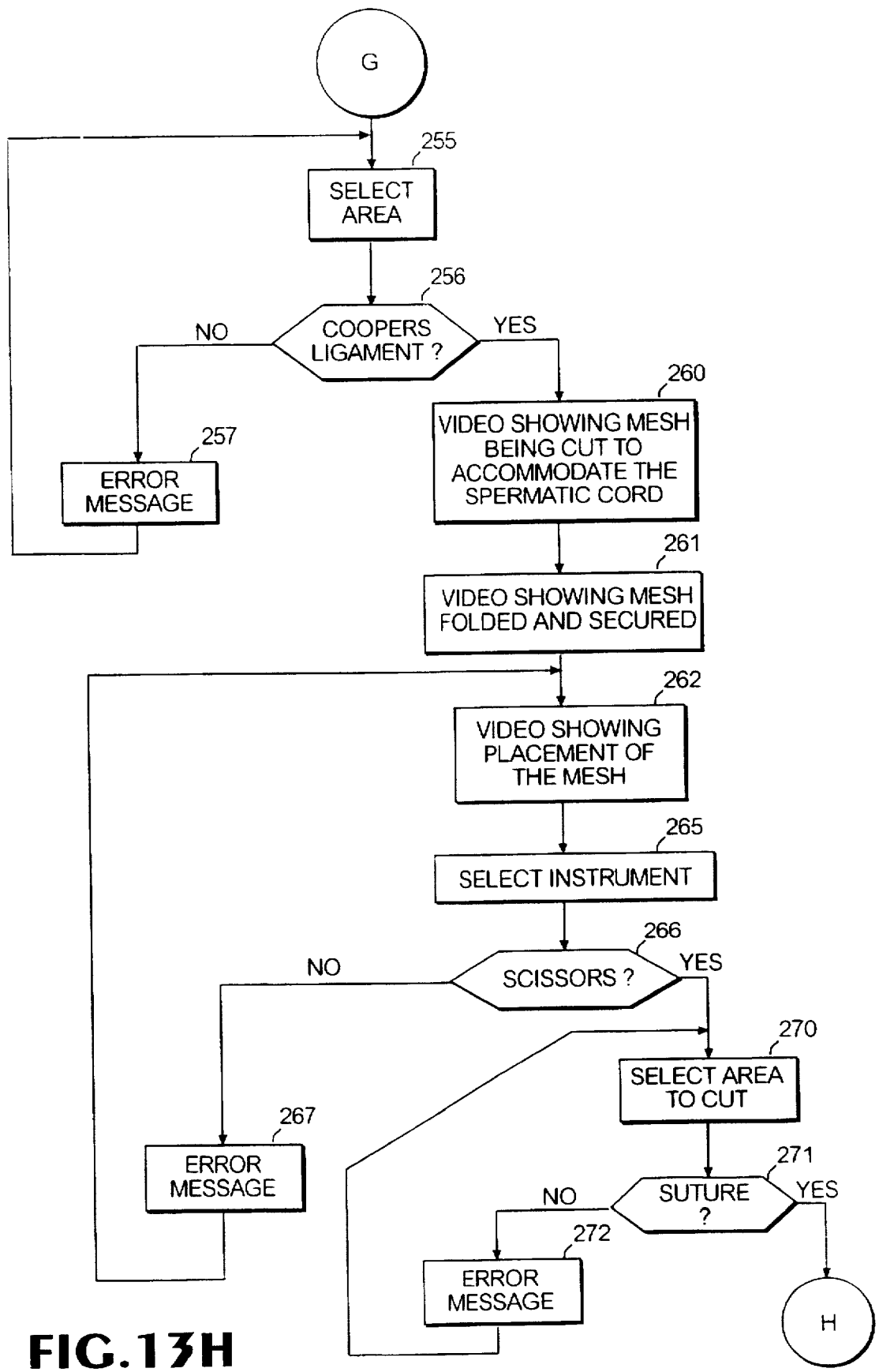
Figure 131:
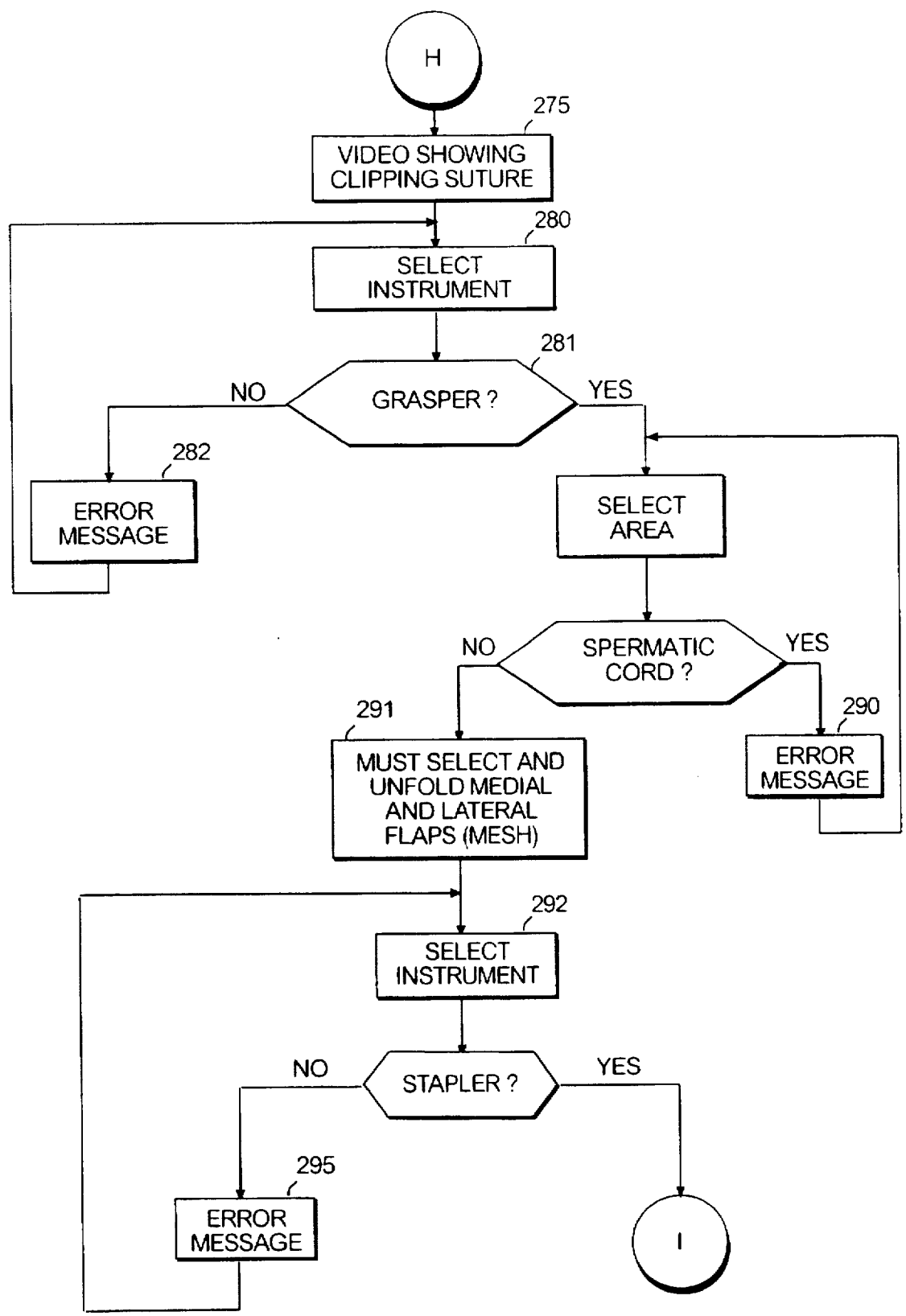
Figure 13J:
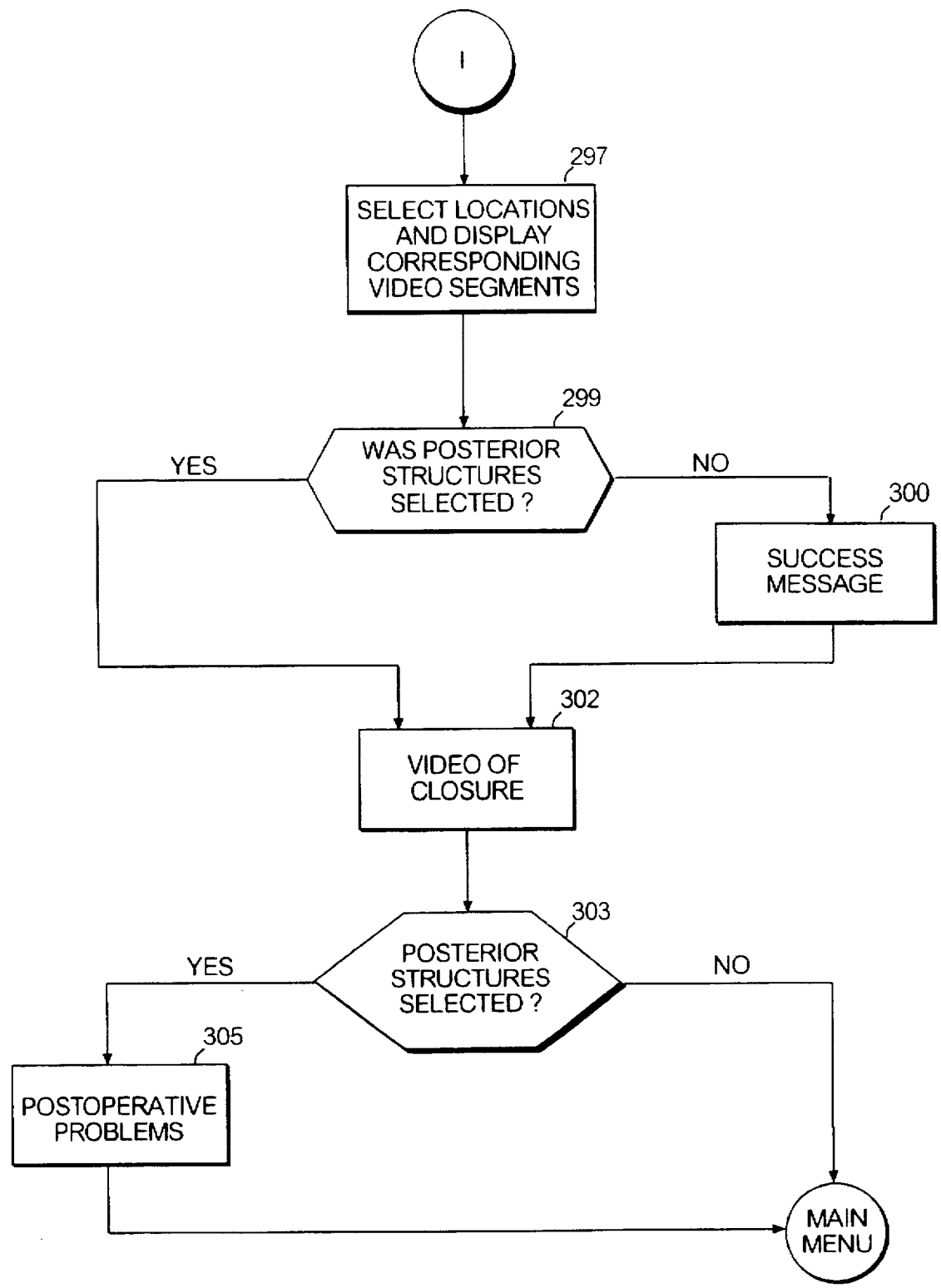
Figure 14F:
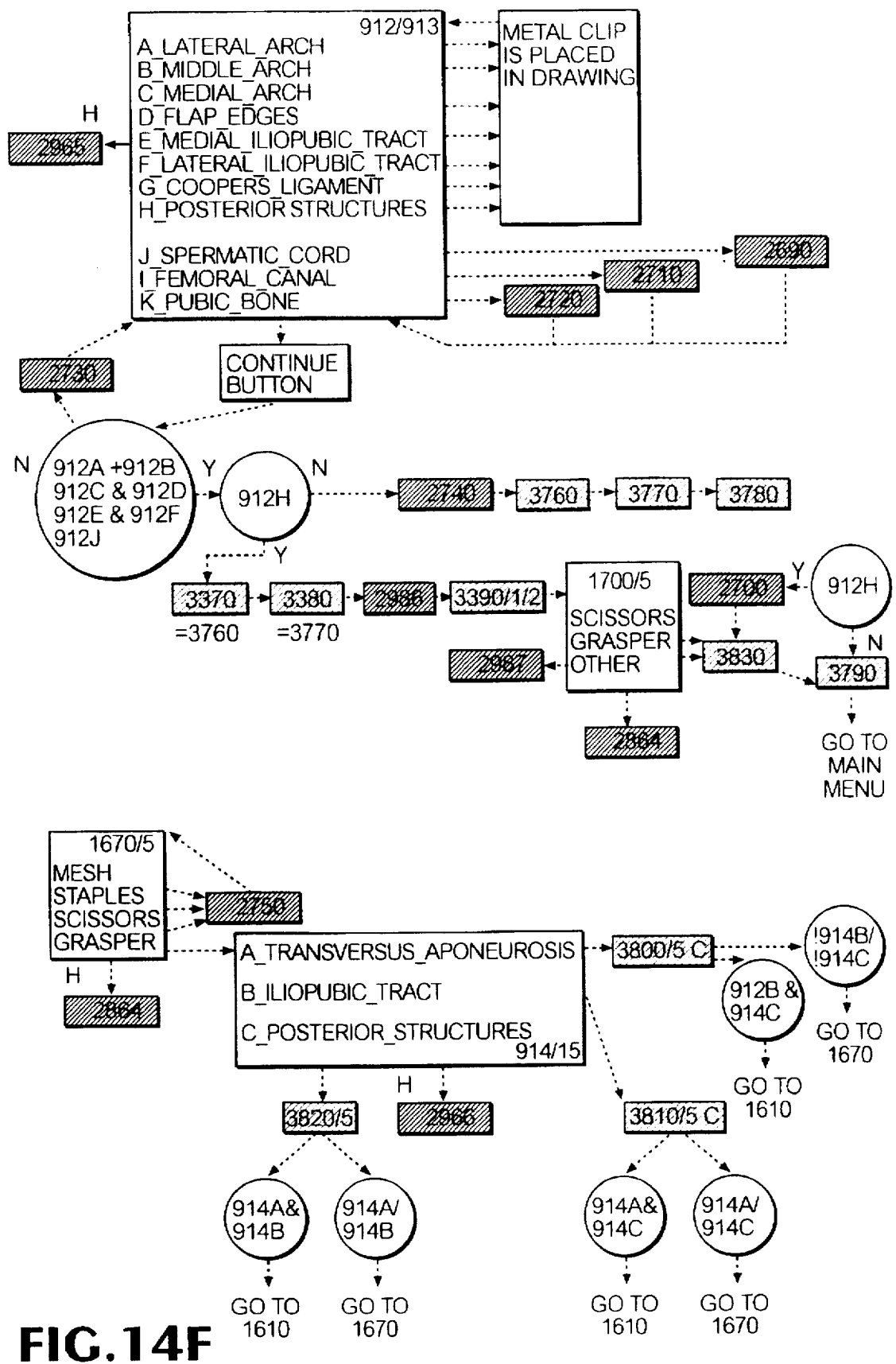
Figure 14G:
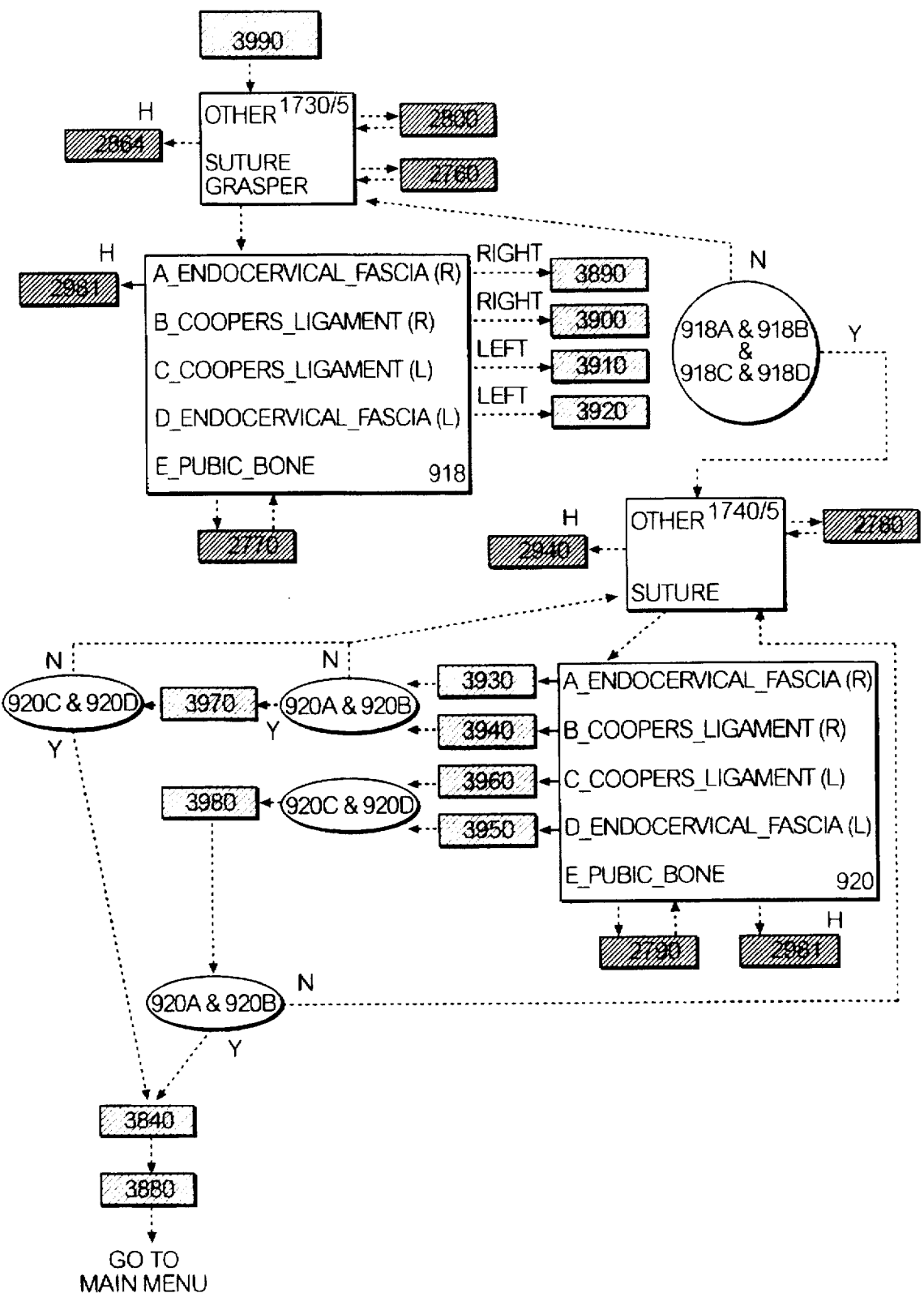

Beginning at FIG. 13A, the user is first prompted to enter various items of information (step 135), including whether the procedure is to be an Origin or GSI procedure, whether it is to be performed on the lefthand or righthand side of the patient, whether it is a direct or indirect procedure, and whether the patient is of normal body fat, or obese, or whether the patient has had previous surgery. It will be appreciated, that various pitfalls or obstacles in the surgical process will vary depending upon the patient's body type. Once these and, potentially, other preliminary items of information are selected, the system proceeds to step 136, where the interactive surgical procedure begins. The illustrated embodiment, exemplified in the flowchart of FIGS. 13A–13J assumes the following preliminary items of information: Origin, Lefthand side, direct, and normal body fat. For purposes of illustrating the preferred embodiment, it is not believed to be necessary to assume and describe the preferred embodiment in connection with all potential preliminary items of information.

In keeping with the description, at step 136, the illustrated embodiment requests the user to select a medical instrument to be used to initiate the procedure. In this regard, a screen such as that shown in FIGS. 9B and 9C is presented to the user, wherein a list of medical instrument is presented and the user is prompted to select an instrument from a list of instruments. In performing an extraperitoneal herniorrhaphy, a scalpel is the first medical instrument to be used. If, at step 137, the system detects that the user selected an instrument other than the scalpel, it proceeds to step 138 wherein it presents an error screen like that of FIG. 6A and 6B. In the error window of this screen, an instructor appears and instructs the user that he has made an incorrect choice, and that the user must first make an incision prior to beginning the operation. Control is then returned to step 136 where the user is again prompted to select a medical instrument for the next step in the surgical procedure. If the user properly selects the scalpel, then the system proceeds to step 140, where a video screen like that of FIGS. 7A and 7B is presented. In this display, a video window displays a segment of video illustrating the proper manner in which to make the initial incision. While the video segment is being displayed, the user is instructed by way of the status panel 66 about the proper way of making the incision (as illustrated in the video window). In this regard the user is instructed that "a vertical incision is made in the interior umbilicus. This will hide the scar and give adequate exposure to the next step. This allows for improved cosmesis without sacrificing exposure." The instruction may be simultaneously presented to the user by way of a speaker 13 (FIG. 1). In this way, the user receives the benefit of both the sight and sound, having a video displaying the correct manner for the procedure in connection with verbal instruction as to the proper manner of executing the procedure.

By way of the control panel 86 (see FIG. 7A) at the bottom of the video window 85, the user may replay the entirety or any portion of the video segment. In this way, a user may review a particular step several times before proceeding to the next step of the procedure. Advantageously, this allows the user to achieve a greater comfort and understanding of particularly tricky steps before proceeding with the remainder of the procedure.

Once the user is ready to proceed to the next step in the procedure, he may do so by clicking the Continue icon 63 (see FIG. 3A). Thereafter, the user is instructed to select a medical instrument for use in the next step of the surgical procedure (step 145). At step 141, the system determines whether the user selected the hemostat as the instrument for use in the next step. If not, an error message is presented at step 142 which informs the user he has made an incorrect choice and that he must first dissect the subcutaneous tissue in order to expose the anterior fascia. Thereafter, the user is again prompted to select an instrument from a list for the next step in the surgical procedure (step 145). If the user properly selects the hemostat at step 141, the system proceeds to step 143, where it displays a video segment, within a video window, illustrating the proper manner of performing a blunt dissection. Contemporaneous with the video display, the user is instructed via status window 66 and/or speaker 13 that blunt dissection is performed by spreading the subcutaneous tissue; that adequate exposure of the anterior fascia is necessary; and that the use of S-shape retractors can greatly aid in exposure and visualization of the fascia.

Once the video segment of the blunt dissection has been displayed, and the user wishes to proceed to the next step, the user may select the Continue option 63 from the control panel 60 (see FIG. 3A) and the system proceeds to step 150, where the user is instructed to select the appropriate medical instrument for the next step in the procedure. If the user fails to select the scalpel, (step 151) he is instructed in step 152 that he has made an incorrect choice, and that the anterior fascia must be incised before continuing with the procedure. Thereafter the system returns to step 150 where again the user is asked to select a medical instrument. If, however, the user selects the scalpel, then the system proceeds to step 153, which displays a video segment illustrating the proper manner to incise the anterior fascia. At the same time, the user is instructed by a status window 66 and/or speaker 13 that the anterior fascia is sharply divided (incised) for one centimeter. The user is further instructed that care must be taken to avoid the deeper structures and to avoid cutting the peritoneum below.

Once the user instructs the system to continue, at step 154 the user is instructed to again choose a medical instrument for carrying out the next step in the procedure. If the user selects neither the balloon nor the finger (step 155), the system proceeds to step 156 which instructs the user that he has made an incorrect choice, and that he must first bluntly dissect the preperitoneal space with his finger. Thereafter, the system returns to step 154 to again prompt the user to select the appropriate medical instrument. If the user selects the balloon, the system proceeds to step 158 which instructs the user that he has again made an incorrect choice and that failure to first bluntly dissect the preperitoneal space will result in an incorrect placement of the balloon with the rectus muscle. Again, control is thereafter returned to step 154 and the user is instructed to select the appropriate instrument. If, after step 155 the user properly selects the finger as the appropriate medical instrument, then a video segment (step 159) is displayed illustrating the proper manner of performing a blunt, finger dissection of the preperitoneal space. At the same time the user is instructed by a status window and/or speaker that it is important to clear the space between the rectus muscle anteriorly and the facia posteriorly. The user is further instructed that by palpating the rectus muscle with the finger, the correct plane of dissection is ensured.

As will be appreciated from the ensuing discussion, the balloon is the appropriate instrument in the next step of the medical procedure. It may, however, be a common error among students or untrained surgeons to omit the finger dissection step. Anticipating at step 155 that the balloon may accordingly be selected as the next instrument, a separate error message at 158 has been designed to specifically instruct the user on the importance of the finger dissection, prior to the selection and placement of the balloon. It should be further appreciate that, in addition to the various messages presented in this illustrated embodiment, that a variety of other messages may be provided to anticipate common errors among students or surgical trainees, and instruct them accordingly.

In keeping with the description, after the finger dissection has been illustrated and the user has instructed the system to continue with the next step, the user is prompted at step 160 to select the appropriate instrument for the next step of the procedure. As mentioned, the appropriate instrument for the next step is the balloon. If the user selects an instrument other than the balloon or scalpel, he is instructed that he has made an incorrect choice and that the balloon should first be inserted (step 165). If the user selects the scalpel, then a video segment is displayed showing improper intra-abdominal placement of the balloon (step 166). At the same time the user is instructed that the use of the scalpel at this point in the procedure has caused the peritoneum to be incised, resulting in intra-abdominal placement of the balloon. The user is further instructed that once the peritoneum is violated proper balloon placement is difficult. Therefore, the peritoneum should be closed and a separate dissection on the other side of the linea alba should be performed (step 168). At this point, the system returns to step 145.

This illustrates another aspect of the preferred embodiment. Just as in any medical procedure, where unexpected errors arise, the invention may be programmed to simulate random and unexpected errors. In this regard, step 169 evaluates whether to insert a random error. Thus, even though the user may have properly selected the use of the balloon at step 164, the system may nevertheless illustrate improper balloon placement. In this regard, if step 169 indicates that a random error is to be displayed, the system proceeds to step 170 wherein a video segment illustrates improper balloon placement. At the same time the user is instructed that due to the obese nature of the patient, the balloon has been inadvertently placed into the peritoneum. Again, the system proceeds to step 168 where the user is instructed to close the peritoneum and begin a separate dissection on the other side of the linea alba.

It should be appreciated that this particular random error will only be generated in the event that the user had selected to operate on an obese patient. However, it should be further appreciated that similar random errors may be placed throughout the various steps of the procedure to better illustrate potential problems and how to deal with those problems at all points in the procedure.

If the random error were not generated at step 169, then the system proceeds to step 172. At this point, the program flow is dependent upon the preliminary items selected by the user. As previously mentioned, the illustrated embodiment assumes that the user selected a patient of normal body fat and an origin (as opposed to a GSI) procedure. In this regard, it is not deemed necessary, in order to illustrate the preferred embodiment of the invention, to map out the extraperitoneal herniorrhaphy procedure for the various patient types and procedures (e.g., direct vs. indirect, left vs. right, and origin vs. GSI). Suffice it to say that any selection other than a patient of normal body fat and an origin procedure, the invention would proceed to step 173. In the illustrated embodiment, and assuming normal and origin selections, the system proceeds to step 174, where a video segment is displayed illustrating the proper manner of balloon insertion. At the same time, the user is instructed that the balloon is inserted with the central canula in place, and that the balloon should slide easily into the pubic tubricle. The user is further instructed that the inner canula is removed and a laparoscope is inserted, and that the balloon will be inflated under the direct visualization provided by the laparoscope. Once this video segment has displayed and the user has instructed the system to continue, then the system proceeds to step 175.

At step 175, the user is instructed to select the appropriate instrument for use in the next step of the medical procedure. If the user fails to select the pump (step 176), then the user is instructed that he has made an incorrect choice and that the balloon must first be inflated in order to dissect the preperitoneal space (step 177). If, at step 176, the user properly selects the pump then a video segment is displayed illustrating the attachment of the hand pump and the insertion of the laparoscope (step 178). At the same time, the user is instructed that the hand pump is connected and the laparoscope is inverted. Once the video segment has been displayed and the user has instructed the system to continue, the system proceeds to step 180. At step 180 the user is requested to enter the proper number of pumps (i.e., number of depressions of the hand pump bulb) for proper inflation. In the preferred embodiment, the user effects a single pump by, for example, clicking the mouse button. After each click of the mouse, the image window (see FIGS. 7A and 7B) illustrates the effect of the pump by showing a slight inflation of the balloon.

If the user fails to adequately inflate the balloon, then the user is instructed that he has not performed adequate pumping, which will obscure the structures making the dissection difficult (step 182). If, on the other hand, the user over-inflates the balloon, the user is instructed that he has over-inflated the balloon and it has exploded, and that he must now remove any loose balloon debris from the cavity before terminating the procedure. Indeed, the user is instructed (step 184) that he may continue the case but that all small pieces of the balloon should be removed before the end of the procedure. In either case the procedure will proceed to the next step wherein the balloon is properly inflated.

At step 185, the user is instructed to select the appropriate medical instrument for performing the next step in the procedure. If the user selects any instrument other than the balloon trocar (step 186), the user is instructed that he has made an incorrect choice and to try again (step 187). Thereafter, the system returns to step 185 and the user is again requested to select the medical instrument for the next procedure. If the user properly selects the balloon trocar, then a video segment is displayed illustrating the proper manner for inserting the balloon trocar. At the same time, the user is instructed by way of the status window and/or speaker that the 10 millimeter balloon trocar is placed through the fascial incision. The user is further instructed that after the balloon is inflated, the flexible sealing device is locked into place, and the trocar is then ready for use. Moreoever, the user is advised that the maximum CO2 pressure should not exceed 12 millimeters of mercury, to avoid excessive postoperative subcutaneous emphysema (step 188).

Once the user has instructed the system to continue with the procedure, the system instructs the user to select the medical instrument for use in the next step of the procedure (step 189). As will be described, the next step in the procedure is to make a 5 millimeter incision near the pubis. Anticipating, however, that users may often improperly select either the trocar, the dissector, or the hemostat from the lift, separate error messages are provided for each such improper selection. For example, if a user selects either the hemostat or the trocar, the system instructs that this is an incorrect choice and that the user must first make an incision prior to placing the trocar (step 190). If the user improperly selects the dissector, then the system instructs the user that he has made an incorrect choice and that he cannot use the dissector or grasper until placing a trocar (step 192). If, however, the user properly selects the scalpel from the list of medical instruments (step 193), then the system displays a video segment showing the proper manner for making the incision. Since the purpose of the incision is to provide an opening for insertion of a 5 millimeter trocar, the user is instructed (contemporaneous with the video display) that a 5 millimeter vertical incision is made just superior to the pubis (step 194).

The system then proceeds to step 195, where it instructs the user to select the appropriate medical instrument for use in the next step of the procedure. As mentioned above, the next step involves the insertion of a 5 millimeter trocar through the just-made vertical incision. If, however, the user selects any instrument other than the 5 millimeter trocar, he is instructed that he has made an incorrect choice and to try again. Indeed, if the user incorrectly selects the 12 millimeter trocar from the list, he is instructed at step 197 that he has made an incorrect choice and that it is best to place the 5 millimeter trocar as the inferior port (the 12 millimeter trocar being used later as the superior port). If, however, the user properly selects the 5 millimeter trocar, then a video segment is displayed illustrating the proper insertion of the trocar (step 199). At the same time the user is instructed that the 5 millimeter trocar is inserted under direct vision. In the preferred embodiment, the first portion of the video segment of step 199 illustrates an external view of the trocar insertion, switching to an internal view (as taken through a laparoscope) during the latter portion of the video segment. In an alternative embodiment, it may be preferred to present two video windows on the display screen 50 showing simultaneous internal and external views.

Once step 199 is complete the system proceeds to step 200, wherein the user is prompted to select the appropriate medical instrument for the next step in the procedure. As will be described, the next step in the procedure is to create an incision for insertion of the 12 millimeter trocar. Therefore the appropriate medical instrument to select is the scalpel. In the event that the user selects any instrument other than the scalpel, he is instructed that he has made an incorrect choice and that he must first make an incision prior to placing the trocar (step 202). Thereafter, the system returns to step 200 and the user is again prompted to select an instrument. Upon properly selecting the scalpel (step 201), the system displays a video segment illustrating the proper manner for making the incision. At the same time, the user is instructed that a 12 millimeter incision is created in the midline, midway between the umbilicus and the pubis (step 205).

Thereafter, the system proceeds to step 206 and the user is instructed to select a medical instrument for performing the next step in the procedure. Since the next step involves the insertion of the 12 millimeter trocar, if any instrument is selected from the list, other than the 12 millimeter trocar, the user is instructed that he has made an incorrect choice. Indeed, if the user selects the 5 millimeter trocar at this point, he is instructed at step 207 that it is best to place a 12 millimeter trocar as the superior port. If the user has properly selected the 12 millimeter trocar (step 208), then the system proceeds to step 210, which displays a video segment illustrating the proper manner for inserting the 12 millimeter trocar. At the same time, the user is instructed that the 12 millimeter trocar is inserted under direct vision. Nevertheless, as in step 199, the first portion of the video segment illustrates the procedure from an external view while the latter portion of the video segment illustrates the procedure from an internal view taken through a laparoscope. Again, in an alternative embodiment, it may be desired to present two video windows illustrating simultaneous internal and external views of the trocar insertion.

Thereafter, the system proceeds to step 212, and the user is requested to select the appropriate medical instrument for the next step in the procedure. At this point in the procedure, the user is to begin performing endoscopic dissections. Therefore, the appropriate instrument is the grasper. If the user selects any instrument other than the grasper (step 213) then the user is instructed (at step 214) that he has made an incorrect choice, and that he has completed the preparation of the preperitoneal space and is ready to now proceed to the endoscopic dissection. Thereafter the system returns to step 212 and the user is again requested to select an appropriate medical instrument. If, at step 213, the user properly selects the grasper, the system displays the video segment displaying the proper use of the grasper to perform a blunt dissection in the loose connective tissue (step 215). At the same time the user is instructed that once inside the preperitoneal space, the loose tissue is divided by using blunt dissection, and that this allows all structures of the left inguinal canal to be identified.

Figure 10:
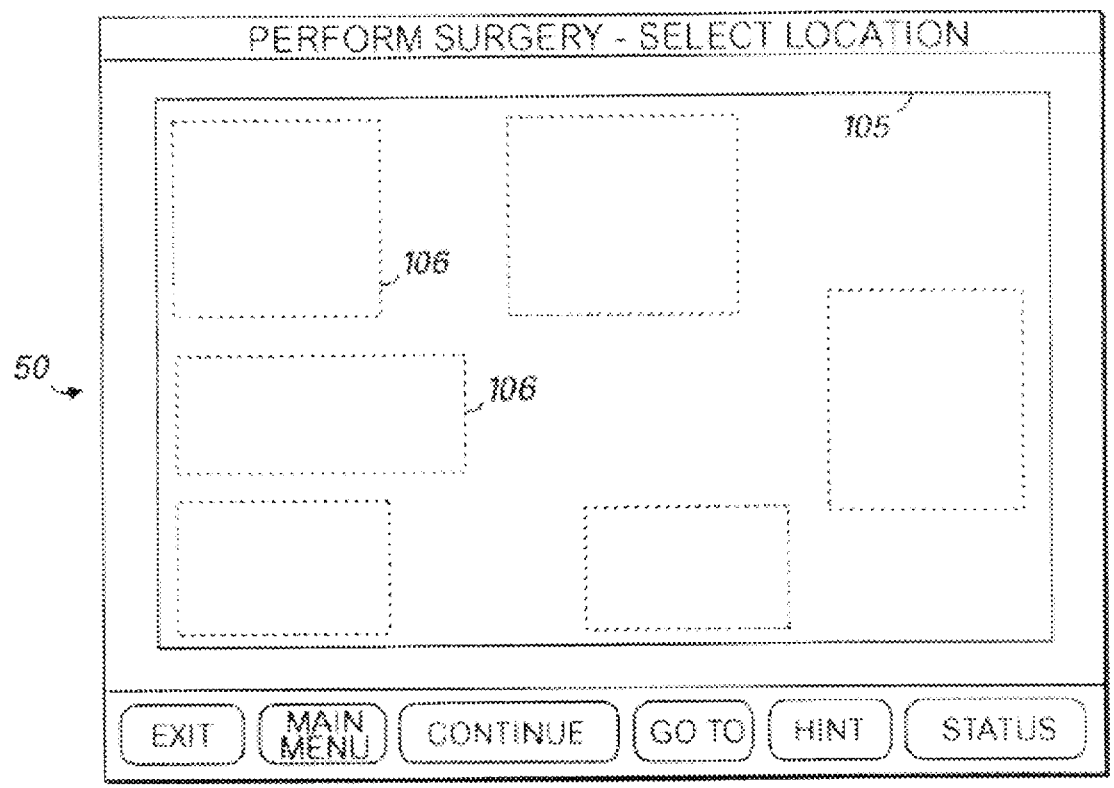
FIG. 10 is a diagram illustrating a computer screen display, in accordance with a select location option in accordance with the preferred embodiment.

Thereafter, the system proceeds to step 217 and the user is again instructed to select the appropriate medical instrument for performing the next step in the procedure. The upcoming steps entail a variety of tissue dissections by using the graspers. Therefore, if the user fails to select the grasper (step 28), then an appropriate error message is presented at step 219 and the system again returns to 217 to instruct the user to select the appropriate medical instrument. In this regard, if the user selects either the scissors, stapler or mesh, the system instructs that the inguinal dissection must first be completed before using any of these instruments. If, however, the user properly selects the graspers, then a video display screen 50, like that of FIG. 10, is presented.

In this regard, a window 105 is provided to display a digitized photographic image, as taken through a laparoscope, of the internal area for dissection. The user is requested to select the appropriate areas or locations at which the dissections are to be performed. In the preferred embodiment, a help mechanism is provided wherein the user may depress the "alt" key, for example, and the system will display "hot spots". In this regard, the system illuminates rectangular windows 106 (see FIG. 10) which highlight those areas that the user may select for dissection. In the extraperitoneal herniorrhaphy, these hot spots include: (1) the spermatic cord, (2) coopers ligament, (3) illiopubic tract, (4) femoral triangle, (5) transversus aponeurosis, (6) pubic bone, (7) lateral dissection, and (8) inferior epigastric vessels.

It will be appreciated by those skilled in the art, that not all of the foregoing areas should be dissected. Indeed, dissection of the femoral triangle is dangerous and should be avoided at all times.

One by one, as the user selects each of the above-listed areas for dissection, the system (at step 220) displays a video segment illustrating the proper manner to perform the dissection. In this regard, as the video displays dissection of the spermatic cord, the user is instructed that the spermatic cord is bisected free from the surrounding tissue. As the video segment illustrating the dissection of coopers ligament is displayed, the user is instructed that care should be taken to avoid injury to the femoral vessels. Similarly, as the video segment of the dissection of the illiopubic tract is displayed, the user is instructed that the illiopubic tract medial to the cord is exposed and clean. The user is further instructed that hemostasis is important as bleeding can be profuse from the lateral obturator vein shown in the video. As the video displays the dissection of the transversus aponeurosis, the user is instructed that dissection of the aponeurotic arch is performed by bluntly removing the overlying fat. Upon selecting the pubic bone area, the user is instructed that the pubic bone can be easily identified and that no further dissection should be necessary. Upon selecting the inferior upper gastric vessels, the user is admonished that dissection of the inferior upper gastric vessels can cause them to fall and make lateral dissection difficult. Finally, when the user selects lateral dissection, commensurate with the display of the video segment, the user is instructed that lateral dissection has begun immediately posterior to the upper gastric vessels, and that the cord is mobilized away from the lateral wall.

It should be appreciated from the foregoing that, although the illustrated embodiment presents eight potential areas for dissection, only five should be selected, avoiding dissection of the femoral triangle, the inferior epigastric vessels and the pubic bone.

After the user has selected the lateral dissection option and the video segment illustrating the mobilization of the cord is displayed, a new photographic image is displayed on the screen, and the user is again requested to select areas for dissection. As before, the user may request help by depressing the "alt" key, wherein various hot spots are illuminated to identify the areas of the transversus aponeurosis, the illiopubic tract, and the posterior structures. The user is required to utilize the graspers for dissection of each of these three areas. On selecting dissection of the transversus aponeurosis, a video segment is displayed illustrating the proper manner for the dissection, and the user is instructed that the lateral portion of the aponeurotic arch is exposed by bluntly removing the overlying fat. Upon selecting the area of the illiopubic tract, commensurate with the video segment displaying the proper technique for dissection, the user is further instructed that the illiopubic tract lateral to the cord is identified and cleaned. Finally, upon selecting the area of the posterior structures, and commensurate with the video segment display, the user is instructed that the cutaneous nerves can be identified posterior to the illiopubic tract on the lateral side. The user is further instructed that this step is not necessary to the final repair, since no staples should be placed in this area.

Like the lateral dissection described immediately above, when the user selects the spermatic cord for dissection, after the video segment previously described, a new video display screen is presented, showing a photographic image of the area immediately surrounding the spermatic cord. At this time the user is requested to identify the areas surrounding the cord for dissection. This includes the area posterior to the cord as well as dissection of the spermatic cord itself. Upon selecting the posterior cord area, a video segment is displayed illustrating the proper manner of dissection, and the user is instructed that dissection is performed posterior to the cord in order the completely encircle it. The user is further instructed that a large window is necessary to accommodate the mesh inserted later, but that care must be taken to avoid injury to the femoral vessels. Upon identifying the spermatic cord itself for dissection, when performing a direct extraperitoneal herniorrhaphy, a video segment is displayed illustrating the proper manner for the procedure, and the user is instructed to ensure there is no indirect hernia, and the peritoneal reflections should be identified. The user is further instructed that if a lipoma of the cord is identified, that it may be reduced.

The foregoing description, briefly describing various dissections to be performed using the graspers has been presented for illustration, and the detailed steps described therein are not deemed necessary for an understanding of the broader aspects of the present invention. Indeed it will be appreciated by those skilled in the area of laparoscopic surgical procedures that a number of variants of the foregoing procedure may be defined by the software. In this regard, additional pitfalls may be imbedded within the program to better illustrate and educate users on common errors encountered in the various procedures of an extraperitoneal herniorrhaphy. Similarly, the user may be required to identify with greater detail the various location for dissection. The system may be further modified to intersperse questions to the user in a format similar to that presented in the quiz section. Therefore, in addition to merely identifying medical instruments for use in the next step of a procedure, or identifying a location for performing certain operations, a user may also be asked very specific and particular questions involving the upcoming step (or a previously performed step) in a medical procedure.

It should further be noted that in the step denoted as step 220 of the preferred embodiment, after each dissection is performed the system returns to step 217 and again requests the user to identify the appropriate medical instrument for the next step in the procedure. It is not until after the user has instructed the system to perform dissections on the coopers ligament, the illiopubic tract, the transversus aponeurosis, lateral dissection (including the transversus aponeurosis, the illiopubic tract and the posterior structures), and the spermatic cord (including dissection posterior to the cord and dissection of the cord itself), that the user is permitted to select any medical instrument other than the graspers.

However, once all of the foregoing dissections have been performed, the system proceeds to step 250 and the user is requested to select the appropriate medical instrument for the next step in the procedure. If the user selects either the scissors or the stapler, he is obstructed and he has selected an incorrect medical instrument and is again instructed to select another instrument. If the user selects the graspers, the system will proceed through the dissection routine described in connection with step 220. However, the user will find that upon designating any area for dissection, he will be instructed that that area has already been dissected. If, however, at step 251 the user properly selects the mesh as the next medical instrument, the system proceeds to step 255. Here, the system again presents a photographic image, internal to the patient, and requests the user to select an area for operation. At this point, the user should designate coopers ligament as the appropriate area (step 256). If the user selects any other area, the system will instruct the user that while he has correctly chosen to use the mesh at this time, that the mesh should initially be placed medial to the spermatic cord (step 257). If, however, the user appropriately selects the area of coopers ligament at step 256, then a video segment is displayed (step 260) illustrating the mesh being cut to accommodate the spermatic cord. At the same time, the user is instructed that a keyhole is cut into the mesh to accommodate the spermatic cord and noting the lateral placement of the keyhole. A second video segment is displayed, illustrating the proper manner to fold the mesh. Commensurably, the user is instructed that the mesh is folded and secured to itself by using any dyed suture material (step 261). Thereafter, a third video segment is displayed (step 262) illustrating the placement of the mesh. At this time, the user is instructed that the folded mesh is placed through the window posterior to the spermatic cord.

After displaying these three video segments, the systems requests the user to select the appropriate medical instrument for the next step in the procedure (step 265). If the user fails to select the scissors (step 266), the system provides an appropriate error message at step 267, and again requests to select the appropriate medical instrument. For example, if the user selects the stapler at this point, the system will instruct that the user cannot use the stapler until the mesh is unfolded and in place. If the user correctly selects the scissors at step 266, he is then requested to select the appropriate area to cut (step 270). At this time, a photographic image is displayed and the user selects the appropriate area by using, for example, the mouse to identify the area. The various options include the lateral flap, the spermatic cord, the medial flap, and the suture. If, at step 271, the user selects any area other than the suture, he is instructed that although he has correctly chosen to use the endoscopic scissors, he must use them only on the suture to avoid damage to the mesh or injury to the cord. Thereafter, the user is again (at step 270) requested to select the area to cut. If the user properly selects the suture area, the system displays a video segment (at step 275) displaying the proper manner to clip the suture. At the same time, the user is instructed that the suture is cut and removed, which will allow the mesh to be unfolded.

Thereafter, the system proceeds to step 280 and the user is again requested to select the appropriate instrument for the next step in the procedure. If the user fails to select the grasper (step 281), he is instructed that he has made an incorrect choice (step 282) and is again requested to select the appropriate instrument. If the user properly selects the grasper as the instrument for use in the next step, a photographic image of the internal area is displayed, and the user is requested to identify the appropriate area for operating upon with the graspers. In the preferred embodiment, the choices presented to the user include the lateral flap, the medial flap, and the spermatic cord. The user must select (although order is irrelevant) both the lateral flap and medial flap. If the user selects this spermatic cord, he is instructed that this is an improper choice (step 290) and is again requested to select an appropriate area. Upon selecting the areas of the lateral and medial flap, video segments are displayed illustrating the proper manner for using the graspers to unfold each of these areas (step 291).

Thereafter, the system proceeds to step 292 and the user is requested to select the appropriate instrument for the next step of the procedure. If the user selects any instrument other than the stapler, the user is instructed at step 295 that he has made an incorrect choice. If, however, the user properly selects the staple, then the system proceeds to step 297, and requests the user to select the appropriate locations for stapling. Again, the system displays a photographic image of the internal area to be stapled (See FIG. 10) and requests the user to identify particular locations by, for example, using the mouse as previously described. In this regard, the areas identifiable within the photographic image include (1) the lateral arch, (2) the middle arch, (3) the medial arch, (4) the flap edges, (5) the middle illiopublic tract, (6) the lateral illiopublic tract, (7) coopers ligament, (8) the posterior structures, (9) the spermatic cord, (10) the femoral canal, and (11) the pubic bone. Readily appreciated by those skilled in the art, a staple will need to be placed in each of the above-listed areas, with the exception of the spermatic cord, the femoral canal, the posterior structures, and the pubic bone. Indeed, if the user selects the pubic bone area, he is instructed that it is difficult and unnecessary to place staples into the pubic bone and therefore it is not recommended. Similarly, if the user selects the femoral canal, he is instructed that staples should never be placed in this area. Finally, if the user selects the area of the spermatic cord, he is instructed that staples should not be placed in proximity to the cord in avoid to avoid damage to the vas deferens. To the individual selection of each of the remaining areas, the system responds by illustrating the placement of staples in the various areas.

In the illustrated embodiment, the system permits the user to select the posterior structures as a stable location, as there is no immediate problem or danger in doing so. After the user has inserted all requisite staples, the system evaluates whether the user sutured the posterior structures (step 299). If not, a message is presented to the user that the procedure has been successfully performed. Thereafter, and regardless of whether the posterior structures was selected, a video segment is displayed illustrating the proper removal of both the 5 millimeter and 12 millimeter trocars. At the same time, the user is instructed that the fascia is closed in the umbilicus as well as in the 12 millimeter trocar site. The video then displays the closure of the skin and incisions and the placement of steri-strips (step 302).

If the posterior structures were not sutured (step 303), then the extraperitoneal herniorrhaphy procedure is complete, and successful completion is noted and the program returns to the Main Menu. If, however, the posterior structures were sutured, then (at step 305), the user is informed that the patient complains of medial thigh pain and parasthesias. The system further instructs the user that after a twoweek course of anti-inflammatory medication, the patient's pain worsens necessitating a diagnostic laparoscopy (step 305). During this procedure, a video segment is displayed illustrating the removal of the staple. At the same time, the user is instructed that the staple is obviously lateral and posterior to all other staples. The user is further instructed that the procedure is achieved by opening the peritoneum with scissors and using graspers to remove the staple. Thereafter the program ends by returning to the Main Menu.

It should be appreciated that, in addition to the program flow described above, the program flow may be interrupted, if the user: requests help, instructs the system to return to the main menu, requests the system to go to a specified step, or instructs the system to exit from the program. It should be further appreciated that the foregoing example has been presented for purposes of illustrating only, and that a variety of variants, even in the performance of the extraperitoneal herniorrhaphy, may be provided. Indeed, the example presented herein assumed a direct, origin procedure on a patient of normal body fat (see step 135). Therefore, even in the performance of an extraperitoneal herniorrhaphy, to be complete, the various other options could be detailed. However, it is deemed that such exhaustive detail of a single example is not necessary to illustrate the present invention, since the claimed invention is independent of the particular medical procedure being conducted. In this regard, and as previously mentioned, the broader concepts of the present invention are directed to the features of interactivity as opposed to any specific medical procedures.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims with interpreted in accordance with the breadth to which they are fairly and legally entitled.

IV. Guide to Interpreting State Diagram

FIGS. 14A–14G comprise a state diagram that illustrates various software states. In addition to the flowchart presented in FIGS. 13A–13J, which track through a portion of the state diagram, the following describes some basic guidelines to interpreting the state diagram of FIGS. 14A–14G.

First, the rectangular boxes are shaded; some are white, some are lightly shaded, and others are more heavily shaded, as illustrated in the Key at the top of FIG. 14A. The white boxes generally indicate a state. wherein a user must input a response/choice among several options. Arrowed lines pointing away from these boxes indicate advancement to the next state. depending upon the user's response/choice. In this regard. the arrowed lines that most closely align with a particular item in the box are associated with that selection. For example. the box at 1050 on page 1 presents three user choices: "Other". "Knife". and "Balloon". If the user selected an option other than "Knife" or "Balloon". then the state would advance to the darkly shaded rectangular box denoted as 2180. If the user selected "Knife" the state would advance to the lightly shaded box denoted as 3430. And. if the user selected "Balloon" the state would advance to the lightly shaded box 3060.

Arrowed lines labeled "H" reflect the advancement to the state pointed to by the arrow. if the user requested help from that (originating) state. For example. the arrowed line exiting from the bottom of box 1050. labeled "H". and leading to darkly shaded box 2900. advances the program to that state if the user requested help (i.e.. "Hint"while in state 1050. Moreover. boxes (states) that have only one exiting arrowed line are states that. after completion. automatically advance to the next state.

The three and four digit numbers (e.g.. XXX. 1XXX. 2XXX. and 3XXX). while representative a given state. identify particular code addresses. Addresses less than 2000 (e.g. XXX and 1XXX) are generally associated with white, user choice. states. The 2XXX addresses are generally associated with either error or help/hint states (darkly shaded boxes). The 3XXX addresses are generally associated with states that display a prerecorded video segment (lightly shaded boxes).

Table I (below) lists the 2XXX and 3XXX addresses in the left-hand column. To the right of the listed address, text is provided that is presented to the user on a display screen in a status window. Some of the states are listed as 3XXX/Y (interpreted as 3XXX or 3XXY). This is a shorthand way of distinguishing states between left and right-handed procedures. The state is 3XXX for left-handed procedures and 3XXY for right handed procedures. For example. on page 5. state 3680/5 is state 3680 for left-handed procedures and 3685 for right-handed procedures.

Circular elements in the diagram indicate decisional states. The decisional criteria are presented in the circular element. In this regard. "A+B" or "A & B" are both interpreted as "A AND B" (logical AND). "A|B" i s interpreted as "A OR B". Similarly "!A+B" is interpreted as "NOT A AND B". To illustrate. in FIG. 14E. the arrowed line exiting from state 3530 leads to three circular states. The first includes the condition "904B+902A". the second includes the condition "904B+!902A" and the third includes the condition "!904B". The numbers 902A and 904B indicates selections within states 902 and 904. For example. state 902 includes selections A. B. and C. while state 904 includes selections A and B. It will be appreciated that only one of the three conditions will be satisfied. If the first is satisfied (904B AND 902A). then the system advances to state 1610.

TABLE 1

| | |
|---|---|
| 2010 | In obese patients, care must be taken in balloon placement to avoid entry into the peritoneum. If inflation is difficult or resistance is met, it is advisable to remove the balloon and continue dissection under direct visualization. |
| 2020 | Previous lower abdominal surgery is considered a relative contraindication due to scar tissue in the extra peritoneal space. |
| 2030 | This is an incorrect choice. You must make an incision prior to beginning the operation. Please try again. |
| 2040 | This is an incorrect choice. You must dissect the subcutaneous tissue in order to expose the anterior fascia. Please try again. |
| 2050 | This is an incorrect choice. You must bluntly dissect the pre-peritoneal space with your finger before continuing. Please try again. |
| 2060 | If the balloon bursts, you may continue the case, but remember to remove the small pieces of the balloon before the end of the procedure. Let's continue. |
| 2070 | You have not performed adequate pumping This will obscure the structures making the dissection difficult. Please continue. |
| 2080 | Once the peritoneum is entered, it is important to make a separate incision in the anterior fascia to enter the correct plane. |
| 2090 | This is an incorrect choice. You must insert a trocar before continuing. Please try again. |
| 2110 | This is an incorrect choice. You must make an incision prior to inserting a trocar. Please try again. |
| 2120 | This is an incorrect choice. You cannot use the grasper until placing a trocar. Please try again. |
| 2130 | This is an incorrect choice. You must make an incision to place the trocars. Please try again. |
| 2140 | This is an incorrect choice. You must insert a trocar before continuing. Please try again. |
| 2150 | This is an incorrect choice. You must remove the sheath before inflating the balloon. |
| 2160 | This is an incorrect choice. You must deflate the balloon before removing it. Please try again. |
| 2170 | This is an incorrect choice. You must remove the balloon before removing the insertion rod. |
| 2180 | This is an incorrect choice. It is at this time that the balloon should be inserted. Please try again. |
| 2190 | This is an incorrect choice. You must inflate the balloon to dissect the pre-peritoneal space. Please try again. |
| 2200 | This is an incorrect choice. You must incise the anterior fascia to continue. Please try again. |
| 2210 | This is an incorrect choice. You must first remove the protective sheath. Please try again. |

TABLE 1-continued

| | |
|---|---|
| 2220 | This is an incorrect choice. You must first inflate the balloon. Please try again. |
| 2230 | This is an incorrect choice. You must first deflate the balloon. Please try again. |
| 2240 | This is an incorrect choice. You must first remove the balloon. |
| 2250 | This is an incorrect choice. You must remove the insertion rod next. |
| 2260 | Remember to be careful inflating the balloon in patients with previous abdominal surgery. |
| 2270 | Over inflation of the balloon in a patient with previous surgery can lead to serious complications. Because of the scar tissue, the peritoneum, bladder, and even bowel can be injured during dissection. A foley catheter is recommended, especially in these patients, since a small tear in the bladder might only be identified by gas in the foley bag. |
| 2280 | same as 2260 |
| 2290 | same as 2270 |
| 2300 | At this point you have successfully dissected the extra peritoneal space, established a working field and have access to the instruments. It is now time to identify your anatomic landmarks. |
| 2310 | same as 2110 |
| 2320 | same as 2120 |
| 2330 | same as 2130 |
| 2340 | same as 2140 |
| 2350 | same as 2110 |
| 2360 | same as 2120 |
| 2370 | same as 2130 |
| 2380 | same as 2140 |
| 2390 | same as 2210 |
| 2400 | same as 2110 |
| 2410 | same as 2120 |
| 2420 | same as 2130 |
| 2430 | same as 2140 |
| 2440 | same as 2070 |
| 2450 | This is an incorrect choice. You must remove the protective sheath before inflating the balloon. |
| 2460 | same as 2220 |
| 2470 | This is an incorrect choice. You must first secure the trocar to the fascia before removing the insertion rod. Please try again. |
| 2480 | This is an incorrect choice. You must secure the trocar to the fascia before continuing. Please try again. |
| 2490 | This is an incorrect choice. You have completed the preparation of the preperitoneal space and are ready to complete the endoscopic dissection. |
| 2500 | same as 2490 |
| 2510 | You have selected the endoscopic grasper as the next instrument. This indicates that you are ready to begin the inguinal dissection and hernia repair. You will need only 4 instruments for the remainder of the operation. The endoscopic grasper, the endoscopic stapler, the endoscopic scissors, and the prosthetic mesh. Use the on-screen toolbar to change instruments, then click on the video screen to indicate where the action should take place. |
| 2530 | This is incorrect. You must complete the inguinal dissection before using the mesh, stapler, or scissors. Please try again. |
| 2540 | same as 2530 |
| 2550 | same as 2530 |
| 2560 | You have correctly chosen to use the mesh at this time. However, the mesh initially must be placed medial to the spermatic cord. Please indicate this by clicking on cooper's ligament with the mesh tool. |
| 2570 | This is incorrect. You must first place the mesh before continuing. |
| 2580 | This is incorrect. It is best to place a 5 mm trocar as the inferior port. |
| 2590 | This is incorrect. It is best to place a 12 mm trocar as the superior port. |
| 2600 | You have incorrectly chosen to use the graspers here. You must first cut the sutures with the endoscopic scissors before continuing. Please try again. |
| 2610 | You cannot use the staples until the mesh is unfolded and in place. |
| 2620 | The mesh is already in place, please try again. |
| 2630 | You have correctly chosen to use the endoscopic scissors. However, you must use them only on the suture to avoid damage to the mesh or injury to the cord. Please try again. |
| 2640 | same as 2620 |
| 2650 | This is incorrect. You must use the graspers to unfold the mesh one flap at a time. |
| 2660 | Cord dissection has already been performed Please try again. |
| 2670 | same as 2620 |
| 2680 | This is incorrect. You must now use the stapler to affix the mesh in place. |
| 2690 | Staples should not be placed. in proximity to the cord in order to avoid damage to the vas deferens. To secure the flap edges together, click on the edges of the mesh. Let's continue. |
| 2700 | Your patient suffers from an interior thigh pain. You decide to explore the patient. |
| 2710 | Staples should never be placed in the area of the femoral canal. Please try again. |
| 2720 | It is difficult and unnecessary to place staples into the public bone. |

TABLE 1-continued

| | |
|---|---|
| | Therefore, we do not recommend it. Please continue. |
| 2730 | You have not yet affixed the mesh in all the proper places. Please continue. |
| 2740 | congratulations, you have successfully performed laproscopic hernia repair using the totally extraperitoneal approach. |
| 2750 | same as 2550 |
| 2760 | You must dissect further before suturing. |
| 2770 | It is unnecessary to expose the public bone unless you are unsure of the anatomy. |
| 2780 | You are ready to suture the suspension. |
| 2790 | It is both painful and unnecessary to place sutures in the public bone. |
| 2800 | This is an incorrect choice. You must use the grasper to complete the preperitoneal dissection. Please try again. |
| 2840 | This is an incorrect choice. You must suture cooper's ligament to the endocervical fascia. Please try again. |
| 2850 | same as 2790 |
| 2861 | You should choose the hemostat. |
| 2862 | You should choose the scalpel. |
| 2863 | Use your finger at this time. |
| 2864 | Use the grasper at this time. |
| 2865 | Use the handpump now. |
| 2866 | Choose the 5 mm trocar next. |
| 2870 | Choose the 12 mm trocar next. |
| 2880 | Use the balloon trocar next. |
| 2900 | Use the balloon dissector next. |
| 2910 | Choose the scissors next. |
| 2930 | Use the stapler next. |
| 2940 | Use the suture next. |
| 2941 | Click on the suture now to cut it. |
| 2950 | Click the handpump a total of 4 times to inflate the balloon. |
| 2951 | Do not continue pumping after resistance is met. |
| 2959 | Use the mesh now. |
| 2960 | Click on the syringe a total of 3 times to inflate the balloon. |
| 2961 | same as 2864 |
| 2962 | You must complete the dissection of the spermatic cord, cooper's ligament, the illiopubic tract, the transverse arch; and the lateral structures. Once that is complete, use the mesh tool and click posterior to the tool. |
| 2963 | You must dissect both posterior to the cord, and the cord itself. |
| 2964 | You must click on the vas deferens and the sac. |
| 2965 | Click on the screen to staple the mesh to the indicated structures. Avoid stapling the spermatic cord and femoral canal. Please push the continue button when you are finished. |
| 2966 | Dissect the transverse arch and illiopubic tract to continue. |
| 2969 | Choose cooper's ligament to place the mesh. |
| 2970 | Remove the protective sheath. |
| 2971 | Inflate the balloon next. |
| 2972 | Deflate the balloon next. |
| 2973 | Remove the balloon now. |
| 2974 | Secure the trocar now. |
| 2975 | Remove the insertion rod next. |
| 2978 | Click on each flap on either side of the cord. |
| 2981 | You must expose cooper's ligament and the endocervical fascia bilaterally |
| 2982 | You must suture the endocervical fascia to cooper's ligament on both sides. |
| 2983 | You are unable to reduce the sac. At this point, it is appropriate to carefully divide the sac and endoloop the proximal sac defect. |
| 2984 | same as 2040 |
| 2985 | same as 2200 |
| 2986 | Due to an inappropriately placed staple, your patient developed a postoperative complication. |
| 2987 | This is an incorrect choice. Choose the grasper or the scissors. Please try again. |
| 2988 | Once the peritoneum is violated proper balloon placement is difficult. The peritoneum should be closed and separate dissection on the other side of the linea alba should be performed. |
| 2989 | Remember, the anterior defect in the mesh should be stapled first. Fixing the mesh laterally or medially before this step could make stapling the defect much more difficult. Options to avoid this problem include using an extra piece of mesh as a flap anteriorly to cover the defect, or some surgeons feel it is not necessary to cut a keyhole in the and just fix the mesh to the entire inguinal floor, overlying the cord. |
| 3010 | A vertical incision is made in the inferior umbelicus. This will hide the scar and give adequate exposure to the next step. This allows for improved cosmesis with sacrificing exposure. |
| 3011 | Same as above. |
| 3012 | Same as above. |
| 3020 | Blunt dissection is performed by spreading the subcutaneous tissue. Adequate exposure of the anterior fascia is necessary. The use of S-shaped retractors can aid greatly in visualization of the fascia. |
| 3021 | Same as above. |
| 3022 | Same as above. |

TABLE 1-continued

| | |
|---|---|
| 3030 | The anterior fascia is sharply divided for one centimeter. Care must be taken to avoid the deeper structures. Care must be taken to avoid cutting the peritoneum below. |
| 3031 | Same as above. |
| 3032 | Same as above. |
| 3040 | This is an incorrect choice. Failure to bluntly dissect the preperitoneal space will result in incorrect placement of the balloon within the rectus muscle. Please try again. |
| 3050 | It is important to clear the space between the rectus muscle anteriorly and fascia posteriorly. By palpating the rectus muscle with the finger, the correct plane of dissection is insured. |
| 3051 | Same as above. |
| 3052 | Same as above. |
| 3060 | Due to the obese nature of the patient, the balloon has inadvertently been placed into the peritoneum. Please continue. |
| 3070 | You have overinflated the balloon and it has exploded. You must now remove any loose debris from the cavity. |
| 3080 | The anterior fascia is sharply divided for approx. one centimeter. Care must be taken to avoid the deeper structures. |
| 3081 | Same as above. |
| 3082 | Same as above. |
| 3090 | The 10 mm balloon trocar is placed through the fascial incision. After the balloon is inflated, the flexible sealing device is locked into place. The trocar is then ready for use. |
| 3091 | Same as above. |
| 3092 | Same as above. |
| 3100 | A 5 mm vertical incision is made just superior to the pubis. |
| 3101 | Same as above. |
| 3102 | Same as above. |
| 3110 | A 5 mm trocar is inserted under direct vision. |
| 3111 | Same as above. |
| 3112 | Same as above. |
| 3120 | The locking device is engaged and the outer sheath is removed from the balloon. A gentle back and forth rocking motion facilities the removal. |
| 3130 | The balloon is inflated by attaching saline into the attached reservoir as seen here. A total of 900 mm is used to provide optimal dissection. By using 2 large volume syringes the inflation can be completed quickly. |
| 3140 | The balloon is deflated by attaching the tubing adapter to the wall suction. Remember to disengage the safety clamp before proceeding. |
| 3150 | The balloon is removed by gently pulling on the reservoir tubing. A firm grasp may be required in order to disengage the balloon. |
| 3160 | The trocar is rotated in order to provide fixation to the skin. |
| 3170 | The balloon is inserted with the central canula in place. The balloon should slide easily to the pubic tubricle. The inner canula is removed and a laproscope is inserted. The balloon will be inflated under direct visualization with the laproscope. |
| 3171 | Same as above. |
| 3172 | Same as above. |
| 3180 | The balloon is inserted in the central canula in place. The balloon should slide easily to the pubic tubricle. The inner canula is removed and a laproscope is inserted. The balloon will be inflated under direct visualization with the laproscope. |
| 3201 | The intact balloon dissector device is placed into the extra peritoneal space and advanced to the pubic bone. |
| 3220 | The handpump attachment is connected and the laproscope inserted. |
| 3221 | Same as above. |
| 3222 | Same as above. |
| 3230 | The maximum $CO_2$ pressure should not exceed 12mm of mercury to avoid excessive postoperative subcutaneous emphysema. |
| 3231B | In patients with previous surgery, scar tissue may be encountered and dissection may be difficult. |
| 3232B | In the obese patient, a significant amount of preperitoneal fat may make dissection difficult. |
| 3240 | The intact balloon dissector device is placed into the extra peritoneal space and advanced to the pubic bone. |
| 3250 | The maximum $CO_2$ pressure should not exceed 12 mm of mercury to avoid excessive postoperative subcutaneous emphysema. |
| 3260 | A 5 mm vertical incision is made just superior to the pubis. |
| 3270 | A 5 mm trocar is inserted under direct vision. |
| 3280 | A 12 mm incision is created in the midline midway between the ambilicus and the pubis. |
| 3290 | A 12 mm trocar is inserted under direct vision. |
| 3301 | The locking device is engaged and the outer sheath is removed from the balloon. A gentle back and forth rocking motion facilitates the removal. |
| 3320 | Once the locking device is engaged, the insertion rod is removed. |
| 3350 | The handpump is attached and the balloon is inflated. Distending the balloon slowly will allow for tampinod of small vessels. Click on the handpump to inflated the balloon. |
| 3370 | same as 3360 |

TABLE 1-continued

| | |
|---|---|
| 3380 | same as 3770 |
| 3390 | Your patient complains of medial thigh pain and parasthesias. After a 2 week course of anti-inflammatory medication, the patients pain worsens. You then perform a diagnostic laparoscopy. |
| 3400 | A 12mm incision is created in the midline midway between the ambilicus and the pubis. |
| 3401 | Same as above. |
| 3402 | Same as above. |
| 3410 | A 12 mm trocar is inserted under direct vision. |
| 3411 | Same as above. |
| 3412 | Same as above. |
| 3430 | The use of the knife at this point has caused the peritoneum to be incised and resulted in intrabdominal balloon placement. |
| 3500 | Once inside the preperitoneal space the loose tissue is divided using blunt dissection. In this way all structures of the left inguinal canal can be identified. |
| 3505 | same as 3500 Reversed |
| 3510 | The spermatic cord is dissected free from the surrounding tissue. |
| 3515 | same as 3510 Reversed |
| 3520 | The cremasteric fibers are separated in order to identify the cord structures and to locate the indirect sac. |
| 3525 | same as 3520 Reversed |
| 3530 | The vas deferens is identified here |
| 3531 | A-To ensure there is no indirect hernia, the peritoneal reflection should be identified.<br>B-If a lipoma of the cord is identified, it may be reduced. |
| 3535 | same as 3530 Reversed |
| 3536 | same as 3531 Reversed |
| 3540 | The indirect sac is dissected away from the cord. |
| 3545 | same as 3540 Reversed |
| 3540 | The sac is then completely reduced away from the cord and the internal ring. |
| 3541 | Dissection of the sac away from the cord continues. |
| 3542 | Dissection of the sac away from the cord continues. |
| 3550 | Cooper's ligament is identified and cleaned using blunt dissection. Care is taken to avoid injury to the femoral vessels. |
| 3555 | same as 3550 reversed |
| 3560 | The illiopubic tract medial to the cord is exposed and cleaned. Hemostasis is Important as bleeding can be profuse from the lateral obturator vein seen here. |
| 3565 | same as 3560 reversed |
| 3570 | Dissection in the femoral triangle or triangle of doom is dangerous and should be avoided at all times. |
| 3575 | same as 3570 reversed |
| 3580 | Dissection of the aponeurotic arch is performed by bluntly removing the overlying fat |
| 3585 | same as 3580 reversed |
| 3590 | The pubic bone can easily be identified, but no further dissection should be necessary |
| 3595 | same as 3590 reversed |
| 3600 | The lateral dissection is begun immediately psoterior to the epigastric vessels. The cord is mobilized away from the lateral wall. |
| 3605 | same as 3600 reversed |
| 3610 | The dissection of the inferior epigastric vessels can cause them to fall and |
| 3615 | make lateral dissection difficult. |
| 3640 | Dissection is performed posterior to the cord in order to completely encircle it. A large window is necessary to accommodate the mesh later, however care must be taken to avoid injury to the femoral vessels. |
| 3645 | same as 3645 reversed |
| 3650 | A keyhole is cut into the mesh in order to accommodate the spermatic cord. Notice the lateral placement of the keyhole. |
| 3655 | same as 3650 reversed |
| 3660 | The mesh is folded and secured to itself using any dyed suture material. |
| 3665 | same as 3660 reversed |
| 3670 | The folded mesh is placed through the window posterior to the spermatic cord |
| 3675 | same as 3670 reversed |
| 3680 | The suture is cut and removed. This will allow the mesh to be unfolded. |
| 3685 | same as 3680 |
| 3700 | The medial flap is unfolded. |
| 3705 | same as 3700 reversed |
| 3710 | The medial flap is unfolded. |
| 3715 | same as 3715 reversed |
| 3720 | The lateral is unfolded. |
| 3725 | same as 3725 reversed |
| 3730 | The lateral flap is unfolded. |
| 3735 | same as 3735 reversed. |
| 3760 | All trocars are removed. The fascia is closed in the umbilicus as well as in the 12 mm trocar site. We recommend using interrupted, figure 8, 2–0h, or zero suture. |
| 3770 | The skin incisions are closed and steri-strips are placed. |

TABLE 1-continued

| | |
|---|---|
| 3780 | The patient can now be awakened and taken to the recovery room. |
| 3790 | Your patient recovered and returned to work in six days. |
| 3800 | The lateral portion of the aponeurotic arch is exposed by bluntly removing the overlying fat |
| 3805 | same as 3800 reversed |
| 3810 | The illiopubic lateral to the cord is identified and cleaned. |
| 3815 | same as 3810 reversed |
| 3820 | The cutaneous nerves can be identified posterior to the illiopubic tract on the lateral side. This step, however is not necessary to the final repair, since no staples should be placed in this area. |
| 3825 | same as 3825 reversed |
| 3830 | This staple is obviously lateral and posterior to all other staples. The peritoneum is opened with scissors and graspers are used to remove the staple. |
| 3840 | All ports are removed and the incisions closed. |
| 3850 | Using the grasper, you remove the balloon fragment from inside the pre-peritoneal space. |
| 3880 | A foley catheter may be left in overnight. |
| 3890 | Dissection on the right exposes the endocervical fascia. |
| 3900 | The right cooper's ligament is exposed. |
| 3910 | The left cooper's ligament is exposed. |
| 3920 | Dissection on the left reveals the endocervical fascia. |
| 3930 | With a finger in the vagina, a suture is placed in the endocervical fascia. |
| 3940 | The suture is passed into copper's ligament. |
| 3950 | same as 3930 reversed |
| 3960 | same as 3940 reversed |
| 3970 | An extracorporeal knot is tied to suspend the bladder. |
| 3980 | same as 3970 |
| 3990 | Once inside the preperitoneal space the loose connective tissue is divided using blunt dissection. In this way all structures of the left inguinal canal can be identified. |

What is claimed is:

1. A method for training a user in a medical procedure utilizing an interactive computer system, said medical procedure having a plurality of steps, said method comprising the steps of:
    (a) requesting a user to input information into said computer system relating to a step in the medical procedure;
    (b) said computer system receiving the requested input;
    (c) said computer system interpreting the requested input to determine whether it is correct;
    (d) said computer system displaying a video segment corresponding to the information inputted by the user relating to said step of the medical procedure, if the input is correct;
    (e) said computer system informing the user that the input was incorrect, if the input is incorrect; and
    (f) said computer system periodically generating a random error relating to information inputted by the end user relating to the medical procedure from a set of predetermined errors which may occur in said medical procedure and displaying said random error.

2. The method according to claim 1, further including the step of permitting the user to select a medical procedure from a plurality of medical procedures.

3. The method according to claim 1, wherein the medical procedure is a surgical procedure.

4. The method according to claim 1, further including the step of permitting the user to select from a plurality of medical procedures including laparoscopic surgical procedures of extraperitoneal herniorrhaphy and bladder suspension.

5. The method according to claim 1, wherein step (a) requests information by displaying a list of selectable options relating to the next step of the medical procedure.

6. The method according to claim 1, wherein step (a) requests information regarding a medical instrument for use in the next step of the medical procedure.

7. The method according to claim 6, wherein a visual image of the medical instrument is displayed.

8. The method according to claim 5, wherein the list of options includes a plurality of medical instruments for possible use in the next step of the medical procedure.

9. The method according to claim 8, further including the step of permitting the user to individually highlight potential medical instruments for selection.

10. The method according to claim 9, wherein a plurality of visual images of medical instruments are retrievably stored, the plurality of visual images corresponding to the plurality of medical instruments in the list of options, and further including the step of displaying the visual image of the medical instrument highlighted by the user.

11. The method according to claim 1, further including the step of:
    (g) returning to step (a) to request the user to input information relating to the next step in the medical procedure, wherein:
        (i) the next step is the same as the step from the previous execution of step (a), if the user input was incorrect; and
        (ii) the next step is advance beyond the next step from the previous execution of step (a), if the user input was correct.

12. A computer readable storage medium encoded with a computer program for controlling the operation of an interactive medical training system having a display, said storage medium comprising:
    means for displaying a first video segment on a portion of the display, the first video segment including a portion of a laparoscopic surgical procedure;
    means for displaying a second video segment on the display simultaneously with the first video segment;
    said second video segment comprising an alternative view of the same portion of the laparoscopic surgical procedure shown in the first video segment;

means for requesting input from a user relating to a step in the laproscopic surgical procedure;

means for receiving the input; and means responsive to the input for interpreting the input, the interpreting means being operative to inform a user whether the input was correct; and means for periodically generating a random error relating to information inputted by the user relating to a step in the laproscopic surgical procedure.

13. The computer readable storage medium according to claim 12, wherein the medical training system provides instructive information on surgical procedures.

14. The computer readable storage medium according to claim 13, wherein the medical training system provides instructive information relating to laparoscopic surgical procedures, including extraperitoneal herniorrhaphy and bladder suspension procedures.

15. The computer readable storage medium according to claim 12 further including means for customizing said laparoscopic procedure based upon selected parameters relating to a patient scenario.

16. The computer readable storage medium according to claim 15 wherein said parameters are selected from the group consisting of patient weight related parameters, patient size related parameters or origin or GSI surgical procedure parameters.

* * * * *

UNITED STATES PATENT AND TRADEMARK OFFICE
CERTIFICATE OF CORRECTION

PATENT NO. : 5,791,907

DATED : 8/11/98

INVENTOR(S) : Ramshaw et al.

It is certified that error appears in the above-identified patent and that said Letters Patent is hereby corrected as shown below:

Column 5, line 30, replace "13I" with --13J--.

Signed and Sealed this

Second Day of March, 1999

*Attest:*

Q. TODD DICKINSON

*Attesting Officer*  Acting Commissioner of Patents and Trademarks